(12) United States Patent
House et al.

(10) Patent No.: US 8,870,659 B2
(45) Date of Patent: Oct. 28, 2014

(54) TOURNAMENT MANAGER FOR USE IN CASINO GAMING SYSTEM

(75) Inventors: Larry House, Reno, NV (US); William Brosnan, Reno, NV (US); Paul Neil Hunt, Reno, NV (US); Robert Breckner, Reno, NV (US); Warner Cockerille, Sparks, NV (US)

(73) Assignee: IGT, Las Vegas, NV (US)

( * ) Notice: Subject to any disclaimer, the term of this patent is extended or adjusted under 35 U.S.C. 154(b) by 45 days.

(21) Appl. No.: 13/419,235

(22) Filed: Mar. 13, 2012

(65) Prior Publication Data

US 2012/0172136 A1     Jul. 5, 2012

Related U.S. Application Data

(62) Division of application No. 11/874,097, filed on Oct. 17, 2007, now Pat. No. 8,157,647.

(51) Int. Cl.
*A63F 13/00* (2014.01)
*G07F 17/32* (2006.01)
*G06Q 20/40* (2012.01)
*G06Q 20/36* (2012.01)

(52) U.S. Cl.
CPC ............ *G07F 17/3258* (2013.01); *G07F 17/32* (2013.01); *G06Q 20/401* (2013.01); *G06Q 20/3674* (2013.01)
USPC ............................................. 463/42; 463/29

(58) Field of Classification Search
CPC ... G07F 17/32; G07F 17/322; G07F 17/3225; G07F 17/3244; G07F 17/326; G07F 17/3272; G07F 17/3276; G07F 17/3283
USPC ............................. 463/42, 16, 21, 23, 25, 29
See application file for complete search history.

(56) References Cited

U.S. PATENT DOCUMENTS

| 4,636,951 | A | 1/1987 | Harlick |
| 5,265,874 | A | 11/1993 | Dickinson et al. |
| 5,580,309 | A | 12/1996 | Piechowiak et al. |
| 5,611,730 | A | 3/1997 | Weiss |

(Continued)

OTHER PUBLICATIONS

International Search Report sent Jan. 23, 2009 for PCT Application No. PCT/US2008/080186.

(Continued)

*Primary Examiner* — Damon Pierce
*Assistant Examiner* — Jeffrey Wong
(74) *Attorney, Agent, or Firm* — Foley & Lardner LLP

(57) ABSTRACT

Various techniques are disclosed for operating a gaming device of a casino gaming network. In at least one embodiment, the gaming device includes a tournament manager and a first meter. In at least one embodiment, the first meter is operable to: receive a first meter update request for changing meter state information and/or meter data associated with the first meter; determine whether at least one condition exists for denying the first meter update request; and/or prevent execution of the first meter update request in response to a determination that at least one condition exists for denying the first meter update request. In at least one embodiment, the gaming device is operable to: receive a request from an entity for initiating start of a first game at the gaming device; obtain approval from the tournament manager for starting the first game at the gaming device; and/or prevent the first game from starting at the gaming device in response to detecting that the tournament manager has not approved start of the first game at the gaming device.

20 Claims, 13 Drawing Sheets

(56) References Cited

U.S. PATENT DOCUMENTS

| | | | |
|---|---|---|---|
| 6,039,648 A * | 3/2000 | Guinn et al. | 463/16 |
| 6,607,441 B1 | 8/2003 | Acres | |
| 6,916,244 B2 | 7/2005 | Gatto et al. | |
| 7,727,071 B2 | 6/2010 | Giobbi | |
| 2002/0039923 A1 * | 4/2002 | Cannon et al. | 463/42 |
| 2003/0228907 A1 | 12/2003 | Gatto et al. | |
| 2004/0180721 A1 | 9/2004 | Rowe | |
| 2005/0043088 A1 | 2/2005 | Nguyen et al. | |
| 2005/0043089 A1 | 2/2005 | Nguyen et al. | |
| 2005/0043094 A1 | 2/2005 | Nguyen et al. | |
| 2005/0170893 A1 | 8/2005 | Muir et al. | |
| 2005/0210323 A1 | 9/2005 | Batchelor et al. | |
| 2006/0040732 A1 | 2/2006 | Baerlocher et al. | |
| 2007/0060321 A1 | 3/2007 | Vasquez et al. | |
| 2007/0060365 A1 | 3/2007 | Tien et al. | |
| 2008/0254883 A1 | 10/2008 | Patel et al. | |

OTHER PUBLICATIONS

Written Opinion sent Jan. 23, 2009 for PCT Application No. PCT/US2008/080186.

Office Action dated Jun. 29, 2011 issued in U.S. Appl. No. 11/874,097.

Notice of Allowance and Allowability Notice with Interview Summary and Examiner's Amendment dated Dec. 13, 2011 issued in U.S. Appl. No. 11/874,097.

Allowed Claims dated Dec. 13, 2011 issued in U.S. Appl. No. 11/874,097.

* cited by examiner

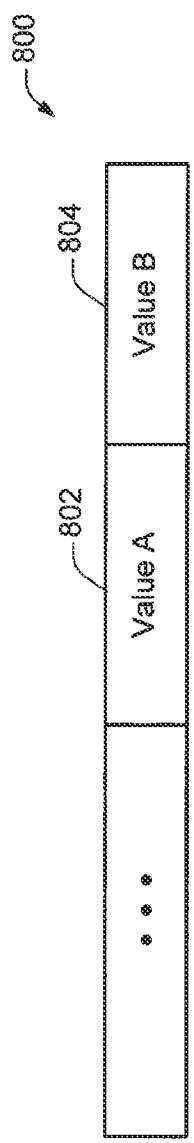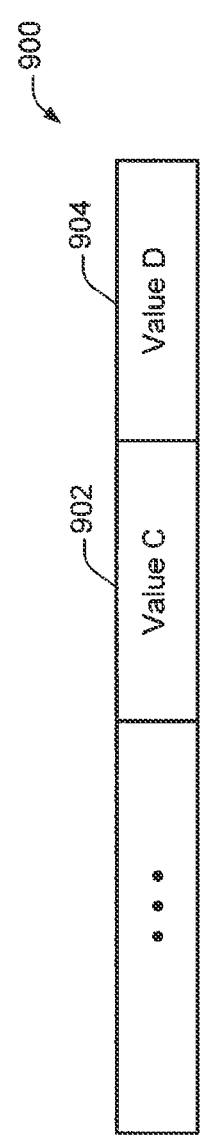

TOURNAMENT MANAGER FOR USE IN CASINO GAMING SYSTEM

CROSS-REFERENCE TO RELATED PATENT APPLICATIONS

This application is a divisional application of co-pending U.S. patent application Ser. No. 11/874,097, filed on Oct. 17, 2007, entitled "TOURNAMENT MANAGER FOR USE IN CASINO GAMING SYSTEM," which is incorporated herein by reference in its entirety for all purposes.

BACKGROUND OF THE INVENTION

Casinos and other forms of gaming comprise a growing multi-billion dollar industry both domestically and abroad, with electronic and microprocessor based gaming machines being more popular than ever. A gaming entity that provides gaming services may control gaming devices that are globally distributed in many different types of establishments. For example, gaming machines may be placed in casinos, convenience stores, racetracks, supermarkets, bars and boats. Further, via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known.

In a typical casino-based electronic gaming machine, such as a slot machine, video poker machine, video keno machine, or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is enabled to operate in this manner because it is placed typically in a location that is monitored (e.g., a casino), the gaming machine hardware and software components are secured within a locked cabinet and the gaming machine includes a security system for detecting fraud or theft attempts.

Because gaming machines can be operable to accept, store, dispense and/or award large sums of money, gaming machines are often the targets of theft attempts. Thus, besides including a security system, gaming software and gaming hardware are designed and/or selected to resist theft attempts and include many security features not present in personal computers or other gaming platforms. For example, a hardware-based security method for preventing illegal software modification is to store gaming software on an unalterable memory, such as an on EPROM, a read-only CD/DVD optical disc or a read-only disk memory with write capability disabled. As another example, a software-based security method for preventing/detecting illegal software modifications is to execute authentication routines that compare information stored and programs executed on the gaming machine against known and trusted information. The trusted information and authentication routines can be stored in a trusted memory location such as a verified EPROM on the gaming machine.

A gaming entity may provide gaming services to tens of thousands of users. For instance, a single land-based casino may include thousands of gaming machines. Player's gaming interests are constantly changing and the effort associated with providing fresh content to users is quite costly. The ability of a casino operator to maximize their operating profits and keep their customers happy is directly linked to their ability to provide new and desirable gaming content.

One mechanism casino operators have used to promote game play is via tournament game play, where, for example, several different players at different gaming machines may compete against each other during a specified gaming tournament. Typically, in order for a particular gaming machine to participate in tournament play of a specific game, customized game code must be developed for that game and deployed at the gaming machine in order to support play of that game in tournament mode at that gaming machine. Such a process may be quite time consuming, especially as new tournament features are developed, typically necessitating a retrofit on previously customized games to support the new feature(s).

SUMMARY OF THE INVENTION

Various aspects of the present invention are directed to different methods, systems, and computer program products for operating a gaming device of a casino gaming network. In at least one embodiment, the gaming device includes a tournament manager and a first meter. Additionally, in at least one embodiment, the gaming device is operable to control a wager-based game played on the gaming device. In at least one embodiment, the first meter is operable to perform one or more of the following (or combinations thereof): receive a first meter update request for changing meter state information and/or meter data associated with the first meter; determine whether at least one condition exists for denying the first meter update request; and/or prevent execution of the first meter update request in response to a determination that at least one condition exists for denying the first meter update request. Additionally, in at least one embodiment, the first meter is operable to access information stored in memory to determine whether at least one condition exists for denying the first meter update request.

Other aspects of the present invention are directed to different methods, systems, and computer program products for operating a gaming device of a casino gaming network. In at least one embodiment, the gaming device includes a tournament manager and a first meter. Additionally, in at least one embodiment, the gaming device is operable to control a wager-based game played on the gaming device. In at least one embodiment, the gaming device is operable to: receive a request from an entity for initiating start of a first game at the gaming device; obtain approval from the tournament manager for starting the first game at the gaming device; and/or prevent the first game from starting at the gaming device in response to detecting that the tournament manager has not approved start of the first game at the gaming device. In at least one embodiment, the tournament manager may be operable to determine whether or not proper conditions exist for allowing start of the first game at the gaming machine; and prevent the first game from starting in response to determining that proper conditions do not exist for allowing start of the first game a the gaming machine.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 8 shows an example of a meter operation data structure 800 in accordance with the specific embodiment.

FIG. 9 shows an example embodiment of a tournament mode data structure 900 which may be used to indicate different modes of tournament play which have been enabled and/or disabled.

DETAILED DESCRIPTION OF THE PREFERRED EMBODIMENTS

Figure 1:
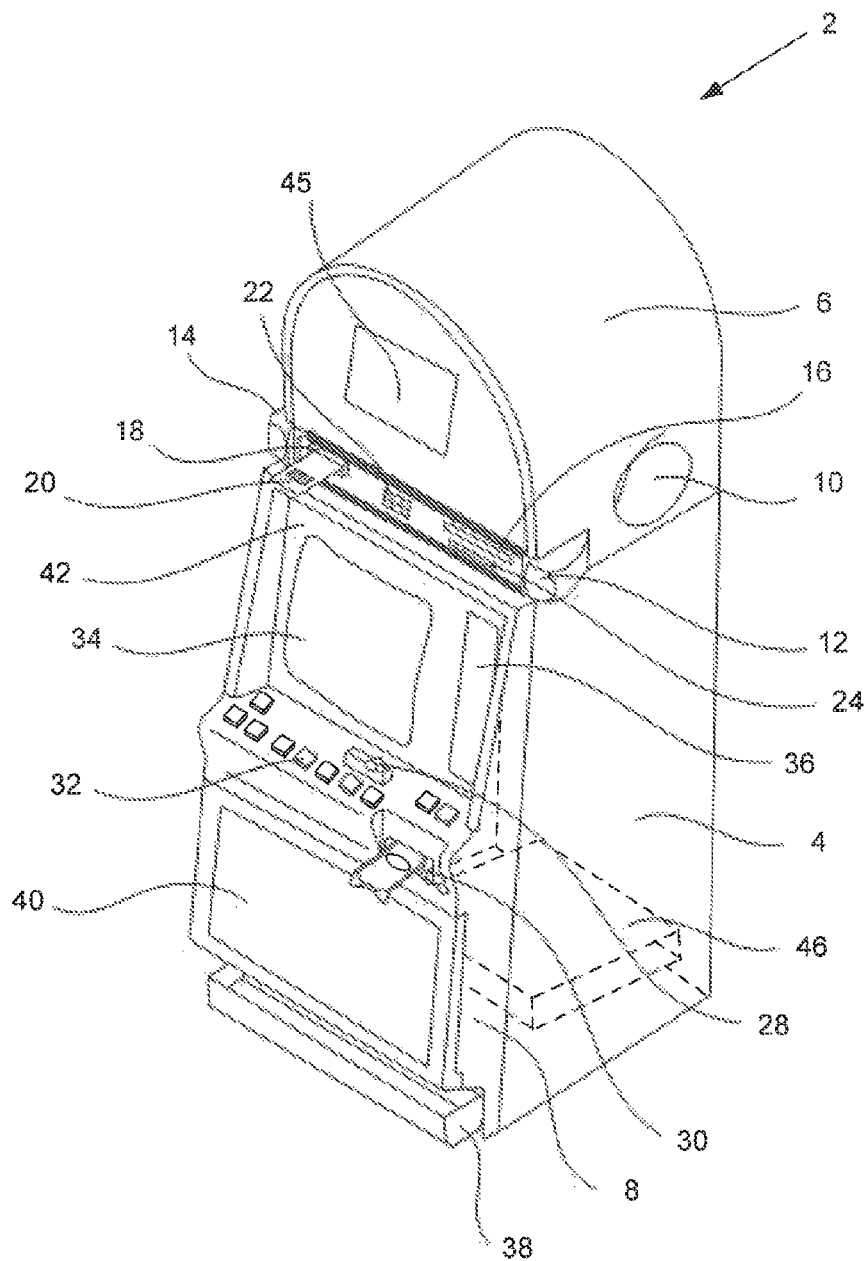
FIG. 1 illustrates a perspective view of one embodiment of a gaming machine.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

The code determines how credits are handled, disables cashout during a tournament, tracks winnings, etc.

Exemplary applications of systems and methods according to at least one embodiment described herein. These examples are being provided solely to add context and aid in the understanding of at least one embodiment described herein. It will thus be apparent to one skilled in the art that the invention may be practiced without some or all of these specific details. In other instances, well known process steps have not been described in detail in order to avoid unnecessarily obscuring at least one embodiment described herein. Other applications are possible, such that the following example should not be taken as definitive or limiting either in scope or setting.

In the following detailed description, references are made to the accompanying drawings, which form a part of the description and in which are shown, by way of illustration, specific at least one embodiment described herein. Although these embodiments are described in sufficient detail to enable one skilled in the art to practice the invention, it is understood that these examples are not limiting, such that other embodiments may be used and changes may be made without departing from the spirit and scope of the invention.

Although at least one embodiment described herein is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Externally-Controlled Interface Processes

In particular embodiments, the gaming devices on the gaming machine may be controlled by software executed by a master gaming controller 46 (see at least FIG. 1) on the gaming machine in conjunction with software executed by a remote logic device (e.g., a remote host, a central server or a central controller) in communication with the gaming machine. The master gaming controller may execute externally-controlled interface (ECI) processes, described in more detail below, that enable content generated and managed on the remote host to be output on the gaming machine. The gaming machine may receive and send events to the remote host that may affect the content output by one or more ECI processes as well as enable an ECI process to be initiated on the gaming machine.

The master gaming controller may be configured to limit the resources that can be utilized by the ECI processes executing on the gaming machine. Specific resource limitations may be predetermined, negotiated with a host device controlling an ECI prior to the execution of the ECI on the gaming machine or combinations thereof. To enforce any established resource limitations, the master gaming controller may constantly monitor resources utilized by the ECI processes and other gaming processes executing on the gaming machine.

The ECI's may be executed while a gaming machine is operable to provide a play of wager-based game of chance (During operation, one or more games and one or more executed simultaneously, one or more games may be executed without execution of an ECI or one or more ECIs may be executed while a game is not being played). Therefore, the resources may be limited to ensure that a gaming experience on the gaming machine is optimal while access to gaming resources is granted to a remote host. The resources allocated to ECI's may be limited for many reasons, such as ensuring the game play experience is adequate or for security purposes, and the examples described herein, which are provided for illustrative purposes only. For instance, the CPU cycles provided to executing ECI processes may be limited to ensure a minimal graphically rendered frame rate is maintained on the gaming machine. As another example, the ECI processes may not be allowed to directly control or access certain devices, such as money handling devices, to prevent the ECI from allowing cash or an indicia of credit to be input or output from the gaming machine.

It should be appreciated that the gaming device resources utilized by the ECI processes include, but are not limited to: graphic resources of the gaming machine (i.e., what graphical real estate is available on the display device without interfering with the graphics of the primary game), audio resources of the gaming machine (i.e., what audio content may be provided by the gaming machine without interfering with the audio of the primary game), timing resources available (i.e., has the primary game ended or is the primary game beginning), and/or CPU processing resources of the gaming machine. In one embodiment, access to such resources may be based on a priority system configured to maximize an optimal gaming experience for each player.

In particular embodiments, the host-controlled ECI processes may be decoupled from the processes used to generate the game of chance played on the gaming machine such that the content output by the host-controlled ECI processes doesn't alter the play of game of chance. Thus, the logic for the game processes may be designed such that information regarding the state or content generated by the ECI processes is not needed to generate the game of chance and/or the game and related processes may not recognize any information produced by the ECI's. The ECI processes may be designed in a similar manner.

An advantage of ECI software and game software decoupled in this manner may be that content may be provided from a remote host that enhances the functionality and features available on the gaming machine. The content can be easily varied with little or no modification to the gaming software resident on the gaming machine. For instance, many features and services on a gaming machine can be provided using a generic ECI that enables access to a display and a touch screen on the gaming machine (e.g., see at least FIGS. 5A and 5B). Externally controlled interfaces, the interaction between a remote host and a gaming machine, embodiments of hardware and software architectures on a gaming machine related to ECI's are described with respect to the following figures.

Gaming Machine

FIG. 1 shows a perspective view of a gaming machine 2 in accordance with a specific embodiment. The gaming devices and gaming functions described with respect to at least FIG. 6 may be incorporated as components of the ECI's described above with respect to at least FIGS. 1 thru 5B and 9A-9D. Further, the gaming devices may be operated in accordance with instructions received from a remote host in communication with the gaming machine. In some instance, a host-controlled process executed on the gaming machine may share a gaming device with a process controlled by the master gaming controller 46 on the gaming machine.

As illustrated in the example of FIG. 6, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28 and a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above.

In one embodiment attached to the main door are a plurality of player-input switches or buttons 32. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with at least one embodiment are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port or a key pad.

As seen in FIG. 6, viewable through the main door is a video display monitor 34 and an information panel 36. The display monitor 34 will typically be a cathode ray tube, high resolution flat-panel LCD, SED based-display, plasma display, a television display, a display based on light emitting diodes (LED), a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on one or more of the display devices may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. Also, these devices may be utilized as part of an ECI provided on the gaming machine. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. The master gaming controller 46 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In another embodiment, the gaming devices on the gaming machine may be controlled by code executed by the master gaming controller 46 (or another logic device coupled to or in communication with the gaming machine, such as a player tracking controller) in conjunction with code executed by a remote logic device in communication with the master gaming controller 46. As described above with respect to at least FIGS. 1A to 5B and 7, 8, 9A-9D, the master gaming controller 46 may execute ECI processes that enable content generated and managed on a remote host to be output on the gaming machine. The gaming machine may receive and send events to a remote host that may affect the content output on an instantiation of a particular ECI. The master gaming controller 46 may be configured to limit the resources that can be utilized by the ECI processes executing on the gaming machine at any given time and may constantly monitor resources utilized by the ECI processes to ensure that gaming experience on the gaming machine is optimal.

Games Played

Many different types of games, including mechanical slot games, video slot games, video poker, video black jack, video pachinko and lottery, may be provided with gaming machines of this present invention. In particular, the gaming machine 2 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the remote host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(s) of one or more of the gaming machines. In operation, the remote host is operable to communicate one or more of the stored game programs to at least one local gaming machine processor. In different embodiments, the stored game programs are communicated or delivered by embedding the communicated game program in a device or a component (e.g., a microchip to be inserted in a gaming media), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the remote host communicating data to the gaming device regarding an upcoming tournament or promotion or any other suitable trigger. After the stored game programs are communicated from the remote host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine.

In particular embodiments, the master gaming controller 46 may provide information to a remote host providing content to an ECI on the gaming machine 2 that enables the remote host to select graphical and audio themes for the ECI content that matches the theme of the game graphics and game sounds currently played on the gaming machine 2.

In one embodiment, the various games available for play on the gaming machine 2 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, pay-table data or information and applicable game rules that relate to the play of the gaming machine. In another embodiment, the games available for play on the gaming machine may be generated on a remote gaming device but then displayed on the gaming machine.

In one embodiment, the gaming machine 2 may execute game software, such as but not limited to video streaming software that enables the game to be displayed on the gaming machine. When a game is stored on the gaming machine 2, it may be loaded from the mass storage device into a RAM for execution. In some cases, after a selection of a game, the game software that enables the selected game to be generated may be downloaded from a remote gaming device, such as another gaming machine.

As illustrated in the example of FIG. 1, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 (e.g., a video LCD display) for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 1. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which at least one embodiment may be implemented. For example, not all suitable gaming machines have top boxes or player tracking features. Further, some gaming machines have only a single game display—mechanical or video, while others may have multiple displays.

Networks

In various embodiments, the remote gaming device may be connected to the host computer via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site remote host as in, for example, a gaming establishment or a portion of a gaming establishment. In another embodiment, the data network is a wide area network (WAN) in which one or more of the gaming machines are in communication with at least one off-site remote host. In this embodiment, the plurality of gaming machines may be located in a different part of the gaming establishment or within a different gaming establishment than the off-site remote host. Thus, the WAN may include an off-site remote host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. In addition, various combinations of gaming devices are possible on the gaming machine. For example, some gaming machine only accept cash, cashless vouchers or electronic fund transfers and do not include coin acceptors or coin hoppers. Thus, those of skill in the art will understand that at least one embodiment described herein can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

Gaming Machine vs. General-Purpose Computer

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming machine is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming machine memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas devices which do not meet the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming machine critical data, although other types of non-volatile memory devices may be employed. These memory devices are typically not used in typical general-purpose computers.

Thus, in at least one embodiment, the gaming machine is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming machine critical information) within a time period of 200 milliseconds (ms) or less. In at least one embodiment, the time period of 200 ms represents a maximum amount of time for which sufficient power may be available to the various gaming machine components after a power outage event has occurred at the gaming machine.

As described previously, the gaming machine may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Thus, for example, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in at least one embodiment are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In at least one embodiment described herein, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with at least one embodiment are described, for example, in U.S. Pat. No. 6,149,522, herein incorporated by reference in its entirety for all purposes.

Game Play

Returning to the example of FIG. 1, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two cards. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play.

In another embodiment, the gaming machine processor or remote host randomly provides the player one or more plays of one or more secondary games. In one such embodiment, the gaming machine does not provide any apparent reasons to the player for qualifying to play a secondary or bonus game. In this embodiment, qualifying for a bonus game is not triggered by an event in or based specifically on any of the plays of any primary game. That is, the gaming machine may simply qualify a player to play a secondary game without any explanation or alternatively with simple explanations. In another embodiment, the gaming machine (or remote host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Multiple Remote Hosts

Figure 2:
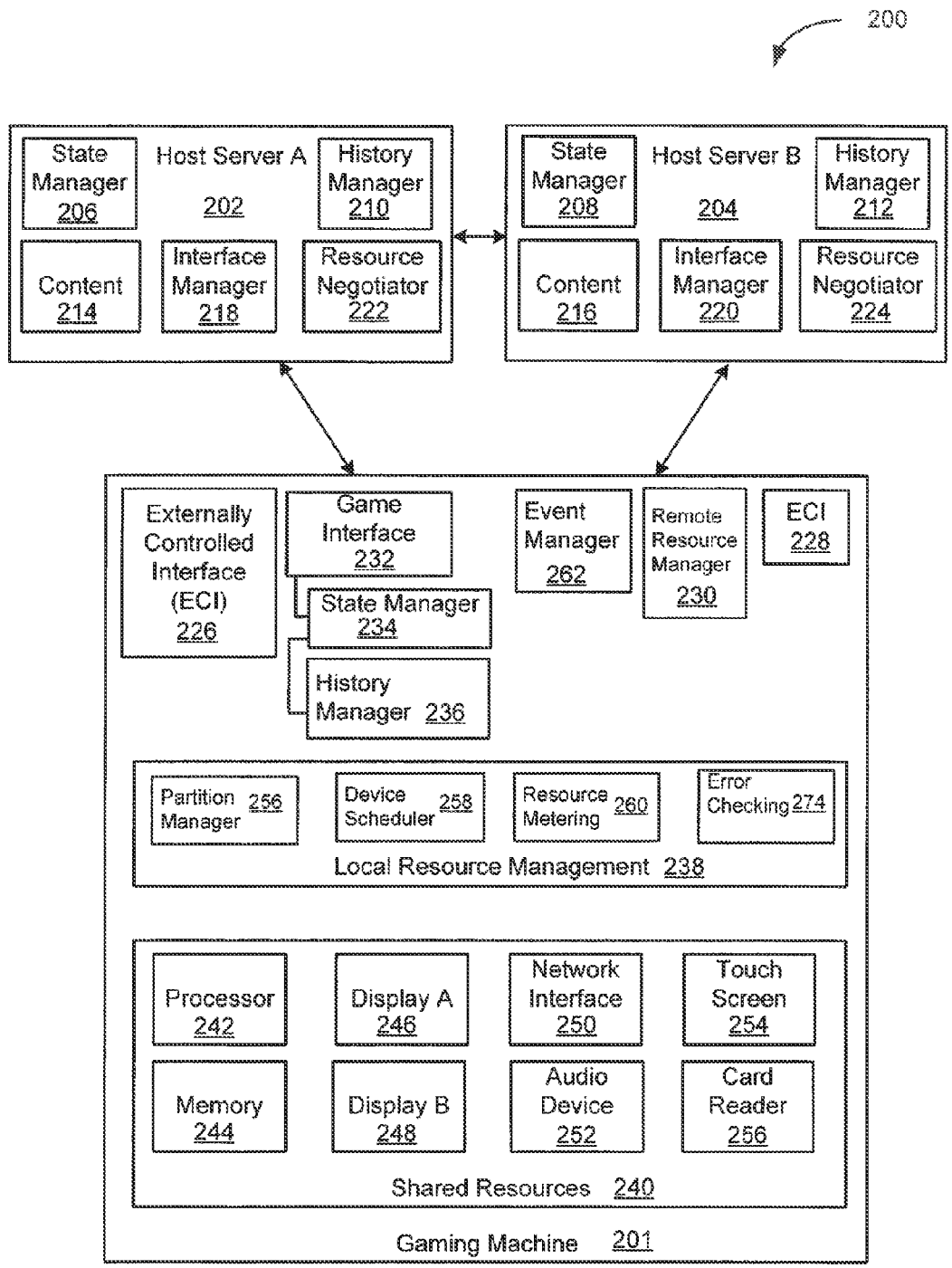
FIG. 2 is a block diagram illustrating an interaction between two hosts and a gaming machine for at least one embodiment.

FIG. 2 is a block diagram illustrating an interaction between two hosts, 202 and 204, and a gaming machine 201 for at least one embodiment. Each host controls an ECI on gaming machine 201. Host 202 controls ECI 226 and host 204 controls ECI 228. The hosts, 202 and 204, may control their respective ECIs, 226 and 228, in an independent or a dependent manner with respect to one another. In the independent case, events generated with respect to the execution of one ECI don't affect the execution of the other ECI. In the dependent case, one or both ECIs may generate events that affect one another. In at least one embodiment described herein, two remote hosts, such as 202 and 204, may share access to a single ECI and may alternately or simultaneously provide content for the ECI. Further, as previously described, the ECIs, such as 226 and 228, may directly share information without routing it through their respective hosts.

Each host includes a state manager, 206 and 208, content, 214 and 216, a history manager, 210 and 212, an interface manager, 218 and 220, and a resource negotiator, 222 and 224. The state manager may maintain a state of the ECI on the gaming machine. In the event of a malfunction on a) the gaming machine, b) the host or c) in the network between the host and the gaming machine. The state manager may be designed to store information that enables the remote host, if it chooses to restore an ECI on the gaming machine 201 to a state proximate to the state immediately prior to an occurrence of the malfunction. In one embodiment, the gaming machine maintains its own state via state manager 234 but not the state of any of the ECIs executing on the gaming machine 201. In other embodiments, the gaming machine may maintain some state information regarding the content displayed in the ECI. For example, the gaming machine may capture frames output to its display that include information from an ECI controlling a portion of the display.

The hosts, 202 and 204, may each provide content to ECIs executing simultaneously on a plurality of gaming machines. The content provided on each gaming machine may be different (e.g., the content may be personalized using information regarding the player at each machine or the hosts may be dynamically responding to events generated on each gaming machine and adjusting content accordingly) and the gaming machines served by each host may be different (e.g., host 202 may provide content to gaming machines A, B and C while host 204 is providing content to gaming machines B, C, D). For each gaming machine that the host provides content via an ECI, the hosts, 202 and 204, may maintain a state of the content. The content, as described above, may comprise data and/or instructions provided as application files that are run and/or parsed by the ECI. The application files may include information/data used by the ECI and commands/instructions for utilizing one or more functions of the ECI. For instance, an ECI may be operable to receive command/instructions in regards to utilizing vector graphic capabilities of the ECI. In addition, when vector graphics are applied, the ECI may be operable to apply edge smoothing the vector-based graphics.

In regards to vector graphics, computers may display graphics in two formats: vector and bitmap. Bitmaps are made up of discrete units called pixels. Each pixel contains a single color. When combined, the variations in pixel color create the patterns that make up an image. Bitmaps contain color information for each pixel in an image plus the dimensions for the image, and transmit images pixel by pixel. To change the size of a bitmap image, i.e., to fit into a display region with different dimensions than the original bitmap. The bitmap image has to be regenerated at the desired dimensions or the image has to be stretched, usually with undesirable results.

By comparison, vector graphics store a series of commands/instructions necessary to create an image using lines and curves. The commands, called vectors, dictate attributes of lines and curves such as thickness, direction, color, and position. A processor associated with the master gaming controller may be utilized to process the commands locally to generate a specified vector image. For instance, the master gaming controller may execute an ECI that is operable to parse vector graphic instructions and generate the image specified by the instructions.

Vector graphics allow for fine detail and may be easily be resized without losing definition. An image generated with vector graphics may be modified by changing the attributes of the lines and curves comprising the image. Vector graphics are best for displaying simple shapes with flat areas of color, such as icons, logos, and cartoon-style drawings. Both vector and bitmap graphics may be drawn on request, but vectors may generally use much smaller file sizes and can be drawn much more quickly. When downloaded, bitmaps are transmitted pixel by pixel, so file size and download time are proportional to an image's dimensions. Vector graphics transmit instructions, which are then carried out by your processor, so that file size and rendering speed are determined by the complexity of the instructions, not the size of the graphic. In various embodiments, various graphical techniques and data may be utilized for providing video content to an ECI including vector graphics, bitmap images, movies, etc.

The state managers, 206 and 208, may each generate information that is sent to their history manager, 210 and 212, for dispute resolution and auditing purposes. In the event of a dispute, for example, a player may dispute an event that happened three games ago on the gaming machine when ECI 226 and ECI 228 were executing. The gaming machine 201 may include logic that enables the gaming machine to contact each host and request information regarding one or more states of the ECI it supported during the disputed game. The host may send the requested information to the gaming machine for display.

To enable for dispute resolution, the gaming machine 201 and the hosts 202 and 204 may exchange information, such as time stamps, game start time, game finish time, ECI start time, ECI finish time, event occurred at time A, etc., that enable content generated by each device and stored by the history manger to be recalled and correlated to one another. This information may be exchanged while the ECI is executing and then again later when requests for stored information are received by one of the hosts.

As an example of state history management and access, the gaming machine 201 may store a start and stop time for each game, whether one or more ECIs were executed during the game and when at least one ECI is executed during a particular game, information needed to contact the host that provided content for the ECI. Thus, the gaming machine 201 may be able to contact one of the remote host and request ECI states during a time period, which corresponds to a particular game. In response, the host may send the requested information to the gaming machine.

The gaming machine 201 may provide a number of shared resources 240 that may be utilized by an ECI, such as 226. For instance, in one embodiment, the gaming machine 240 may be operable to share a) processing resources from a processor, such as 240, b) memory 244 which may comprise volatile memory, such as RAM or non-volatile memory, such as flash memory or a hard drive, c) one or more displays, such as display A 246 or display B, 248, d) one or more communication interfaces, such as a network communication interface 250 or a wireless interface (not shown) that allows the gaming machine to communicate with wireless devices located proximate to the gaming machine 201, e) audio devices 252, such as speakers, amps and signal codecs for processing sound files, f) input/output devices, such as a touch screen 254 or card reader 256.

Prior to launching the ECI, a negotiation may take place between the gaming machines and one or more remote hosts in regards to the resources that may be utilized by the ECI while it is executed on the gaming machine. In one embodiment, when an ECI, such as 226, is shared or controlled by two or more hosts or where each host controls its own ECI but the ECIs share common resources and/or resource limitations based on the combined usage of resources used by the ECIs controlled by each host, a resource negotiation may take place between the two or more hosts to determine what resources are needed by each host. The host-to-host negotiation may allow the hosts to provide content/instructions to a shared ECI or to each of their ECIs in an integrated manner so that each host has enough resources to display their content/instructions on the shared ECI or each of their respective ECIs.

For example, if a first ECI controlled by a first host utilizes display 246 and a second ECI controlled by a second host utilizes display 246 each host may only need a portion of the display 246 rather than the whole display. If one or both hosts try to utilize the entire display then both hosts may not be able to have content displayed via their ECIs simultaneously. But, if the first and the second host agree to share the display by utilizing only a portion of it via a resource negotiation, then the first and second host may be able to display content via their ECIs on the display 246 at the same time. In general, the gaming machine may be the final arbiter of what resources are assigned to each ECI and the host-host negotiations may take place in the context of negotiations with the gaming machine.

In particular embodiments, the resource negotiators 222 and 224 may communicate with the remote resource manager 230 on the gaming machine 201 or each other to determine what resources are available for the ECI that each remote host controls, such as 226 or 228 or for an ECI which the remote hosts share. The one or more remote hosts may use this information to adjust the content that is sent to the gaming machine for its respective ECI. For instance, display 246 and display 248 may be of different sizes. Thus, at some times, a remote host may be provide access to display 246 and provide content to an ECI formatted to be compatible with the resolution of display 246 while at other times display 246 may not be available and the remote host may provide content formatted to be compatible with the resolution of display 248 (The content provided at different times to the displays 246 and 248 may be the same or different content). Further details of resource management are described with respect to at least FIGS. 3A and 3C.

In yet another embodiment, the remote hosts, 202 and 204, may compete for access to resources on the gaming machine. For example, remote host 202 may provide one advertising stream/content and remote host 204 may provide another advertising stream/content. The gaming machine may allow only one advertising stream/content at a time. Thus, the gaming machine 201 may initiate negotiations where access to its resources goes to the remote host, which is the highest bidder.

The gaming machine may notify potential hosts when resources become available and solicit bids for the resources from two or more hosts. In one embodiment, the gaming machine 201 while displaying content from one host may receive a bid for resources from another remote host and switch access to the gaming machine from a first remote host, such as 202, to a second remote host, such as 204, after receiving a better bid for resources from the second remote host 202.

In yet another embodiment, the gaming machine 201 may provide information regarding various resource packages with various costs to potential remote hosts. The cost of a resource package may affect the amount of resources and priority of access of resources afforded to a remote host providing an ECI. For instance, access to a larger portion of a display that is shared may cost more than access to a smaller portion of the display. As another example, access to a display where control of the display is not to be switched to another remote host provided ECI or taken over by the gaming machine for a particular time period may cost more than sharing access to the display with another remote host and allowing the gaming machine to intermittently use the display.

The interface managers, 218 and 220, may be responsible for determining what content to send each ECI and sending the content. Further, the interface managers may be designed to respond to events generated on the gaming machine. For example, when interface manager 218 receives information indicating a touch screen has been activated on the gaming machine via the event manger 262, the interface 218 manager may determine whether the touch screen is activated in a display area that it controls and whether content displayed on ECI 226 needs to be adjusted. As another example, when the interface managers, 218 or 220, receive information regarding the resolution of a particular display and visual content is to be displayed, the interface managers, may select content stored on their respective remote host that is closet to a needed resolution, reformat (if needed) the content, generate new content to fit the resolution of the particular display or locate and/or download needed content from another source, such as another remote host.

In particular embodiments, an ECI and/or remote host may not be granted access to all of the features of the shared resources. For example, when the card reader is operable to read/write data to a card, such as a smart card. The ECI may be allowed to receive data read from a card but not write data to the card. In one embodiment, during the negotiation phase, the gaming machine may provide a) a list of available shared resources, b) features of the shared resources that may be controlled by the remote host directly and/or via an ECI including commands and data formats that allow the features to be utilized, c) under what conditions the features may be utilized, etc.

In one embodiment, the data formats, commands and/or instructions that an ECI or remote host may utilize may be incorporated in a communication protocol that is utilized by both the ECI and/or remote host and gaming machine (or gaming device). In particular embodiment, the commands/instructions that the ECI and the remote host may communicate to the gaming machine, such as to control a device, may be high-level commands that are translated by the gaming machine to low-level instructions that are used to actually perform the operation that is requested. For instance, to spin a bonus wheel coupled to the gaming machine, a remote host and/or ECI may send a "spin wheel" command to the gaming machine. The gaming machine may translate the command to a number of low-level instructions that a stepper motor coupled to the gaming machine to be controlled. In another embodiment, the ECI and/or remote host may be operable to provide low-level instructions that allow a device to be directly controlled. For instance, the ECI and/or remote host may be able to send the low-level instructions for controlling the stepper motor directly to the bonus wheel without needing the gaming machine to translate.

In a particular embodiment, the communications between the gaming machine and the remote host may be separated into two parts. The first part of the communications may include information regarding gaming machine transactions, such as money handling, metering, game outcomes, random number generation, player identification information. In general, the first part of the communications may include information that is generated as a result of game play from a primary game of chance executed on the gaming machine. In one embodiment, the gaming machine transaction information may be communicated using the G2S protocol approved by the Gaming Standards Association (Fremont, Calif.). The second part of the communications between the gaming machine and the remote host may enable the communications between the remote host and the ECI, such as commands, instructions and/or data sent between the remote host and the ECI, which may include content for the ECI to output.

One advantage separating the communications in this manner is that the ECI may be isolated from game play information. When the ECI is isolated from game play information, it may result in a more secure system. The higher level of security is based on the assumption that if a process executing on the gaming machine is unaware of game play information, such as the state of a game, it will be more difficult for the process to affect the game in unacceptable manner. It is noted that although the ECI may not be aware of game play information, as described in the previous paragraph, the remote host may be aware of game play information.

The game play information described in the previous paragraph may be related to information generated as a result of play of a primary game of chance generated on the gaming machine. Further, in some embodiments, the ECI itself may provide the play of games separate from the primary game. Nevertheless, the ECI may not be aware that is providing the play of a game and may be still unaware of any game play information that is generated. From the perspective of the ECI, it is simply outputting content utilizing commands, instructions and data provided by a remote host where the ECI does not distinguish between game related content and non-game related content.

In particular embodiments, the ECI may be operable to process input generated as a result of the play of the game provided by the ECI but may not be operable to distinguish this input from other types of input, i.e., it may not be configured to determine the function associated with the input. For instance, the ECI may be instructed by the remote host to generate a bet button on a touch screen display for a game output utilizing the ECI. The ECI may be operable to receive input from the touch screen and determine that a particular button has been pressed. The ECI may forward this information to the remote host and the remote host may determine that this button corresponds to a bet button. The ECI may be unaware the button for a bet has been pressed or activated, i.e., it is unaware of the function of the button.

In particular embodiments, when an ECI and/or remote host is access or control is prohibited for one or more resources, such as utilizing a peripheral device or utilizing one of the features of the peripheral device coupled to the gaming machine, and the ECI and/or remote host generates an instruction that tries to utilize or control the resource, then the gaming machine may respond in various manners. For example, in one embodiment, if the device or device feature the ECI and/or remote host is trying to access or control is not critical, then the gaming machine may simply ignore the command or instruction and possibly notify the device that it is trying to perform a function that is not available to it. For instance, the ECI and/or remote host may send instructions to a gaming machine to flash lights when this function is not available to it, and the gaming machine may simply ignore the instructions.

In another embodiment, the ECI and/or remote host may try to access or control a critical device in a manner that is prohibited. For instance, ECI or remote host could try to send a command to a printer to print a cashless ticket of a particular value, which is not allowed. In some possible responses, the gaming machine may 1) log the event, 2) terminate the connection with the ECI, 3) enter a tilt state or 4) combinations thereof. Some details of tilt handling that may be utilized with various embodiments are described in U.S. Pat. No. 6,890,259, entitled, "Modular Tilt Handling," which is incorporated by reference and for all purposes.

In particular embodiments, the available resources that may be utilized by a remote host as part of an ECI may vary from gaming device to gaming device. For example, a casino-type gaming machine with random number generation capability may have more capabilities that may be utilized in an ECI than a portable hand-held device. Further, in other embodiments, the capabilities of a gaming device, such as gaming machine 201, that may be offered to a remote host for utilization may vary depending on the remote host. For example, some remote hosts may be more trusted than other remote hosts and thus may be afforded greater access to devices on the gaming machine than other remote hosts.

During operation of an ECI, the gaming machine may check the resources utilized by an ECI to determine whether the resources utilized by the ECI are in compliance with limits established for the ECI, such as during the negotiation phase. The gaming machine 201 may utilize its local resource management 238 including the partition manager 256, the device scheduler 258 and the resource metering 260 on the gaming machine 201 to check the resource utilization of one or more ECIs individually or a group of ECIs in combination against resource allocations for each individual ECI or the group of ECIs. When resource allocation for an ECI is exceeded, a number of remedial actions may be taken. For instance, when CPU resources are exceeded, the ECI may be denied further CPU cycles and the display characteristics of the ECI may slow down and become jerky. Further, the gaming machine may notify the ECI that it has it exceeded it resource requirements. As another example, when resources are exceeded, the gaming machine may terminate a session with the remote host and stop execution of the ECI on the gaming machine. The execution of the ECI may be stopped permanently or may be stopped temporarily until more resources become available on the gaming or until the remote host adjusts the content of the ECI.

As examples, an ECI may exceed its allocated resources because the gaming machine downwardly adjusted the resources available to the ECI after the start of an ECI session or because the remote host didn't correctly estimate an amount of resources it needed. In response to learning it is exceeding resources it has been allocated on the gaming machine, the remote host, such as 202 or 204, may adjust their content to consume less resources on the gaming machine. In particular embodiments, the remote hosts, such as 202 and 204, may be operable to dynamically adjust the content that is sent to the gaming machine for utilization by an ECI after a session has been initiated (at the start of the session an initial resource allocation may be specified) 1) to satisfy changing resource allocations on the gaming machine, which may change, and thus, to prevent it from exceeding its resource allocation.

Since the manner in which an ECI and/or remote host may be allowed to access or utilize a gaming machine may vary, such as from one remote host to another, from one time to another and different gaming machine may have different capabilities (e.g., a gaming machine may have different capabilities than a portable), the gaming machine may include logic for checking instructions and/or data received from an ECI and/or remote host to comply with their access privileges. For example for illustrative purposes only as a communication protocol doesn't have to be utilized, when the instructions and/or data are codified in a communication protocol, the gaming machine may first check to see whether the instructions and/or data is a recognized part of the protocol. Then, even if the instructions and/or data is part of the protocol, the gaming machine may not offer the capability requested, thus compatibility of instructions and/or data with the gaming machine capabilities may be checked (At the negotiation phase, the instructions and/or data that the gaming machine is capable of utilizing, which may be a subset of the instructions and/or data that may be communicated as part of the communication protocol may be established.) Then, the instructions and/or data may be checked against the access privileges for the particular ECI and/or remote host. For each remote host and its associated ECI, information regarding resource access privileges may be stored (The information may have been generated at the negotiation phase or at some other time). The privilege and/or error checking may be performed by the privilege checking logic 274 in the local resource management 238.

Resource Allocation

Figure 3A:
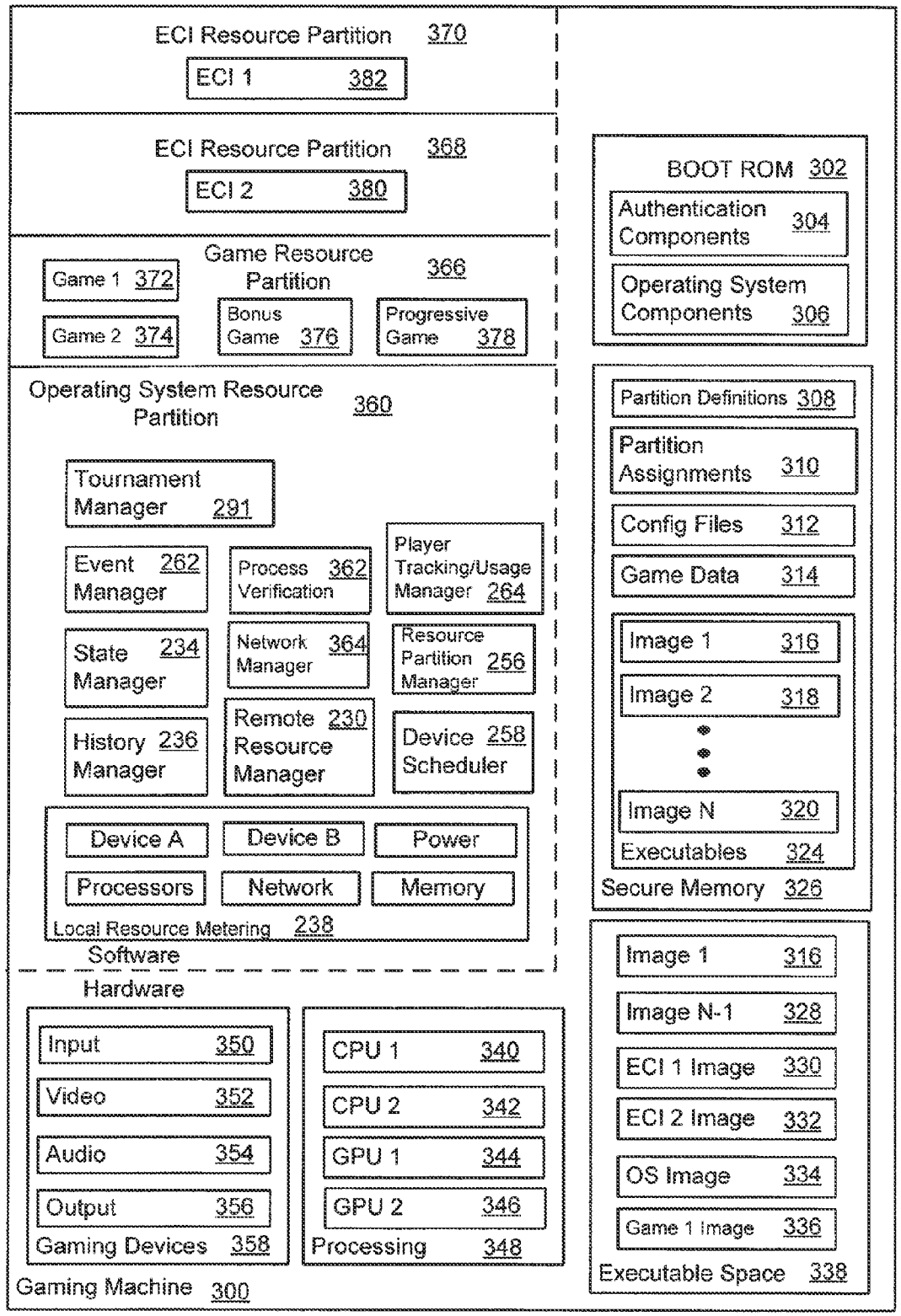
FIGS. 3A-C are block diagrams showing hardware and software components and their interactions on a gaming machine for at least one embodiment.
Figure 3B:
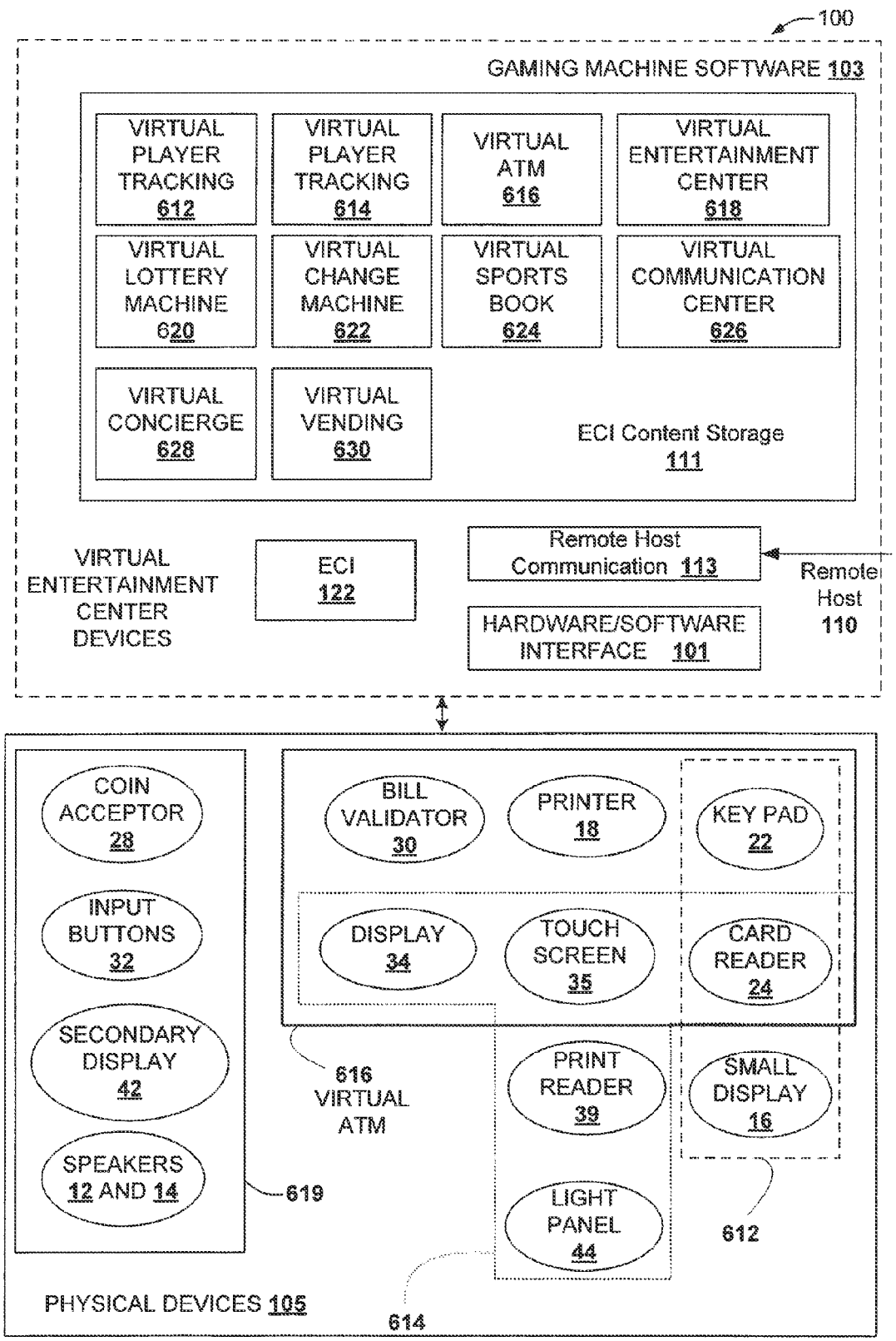
Figure 3C:
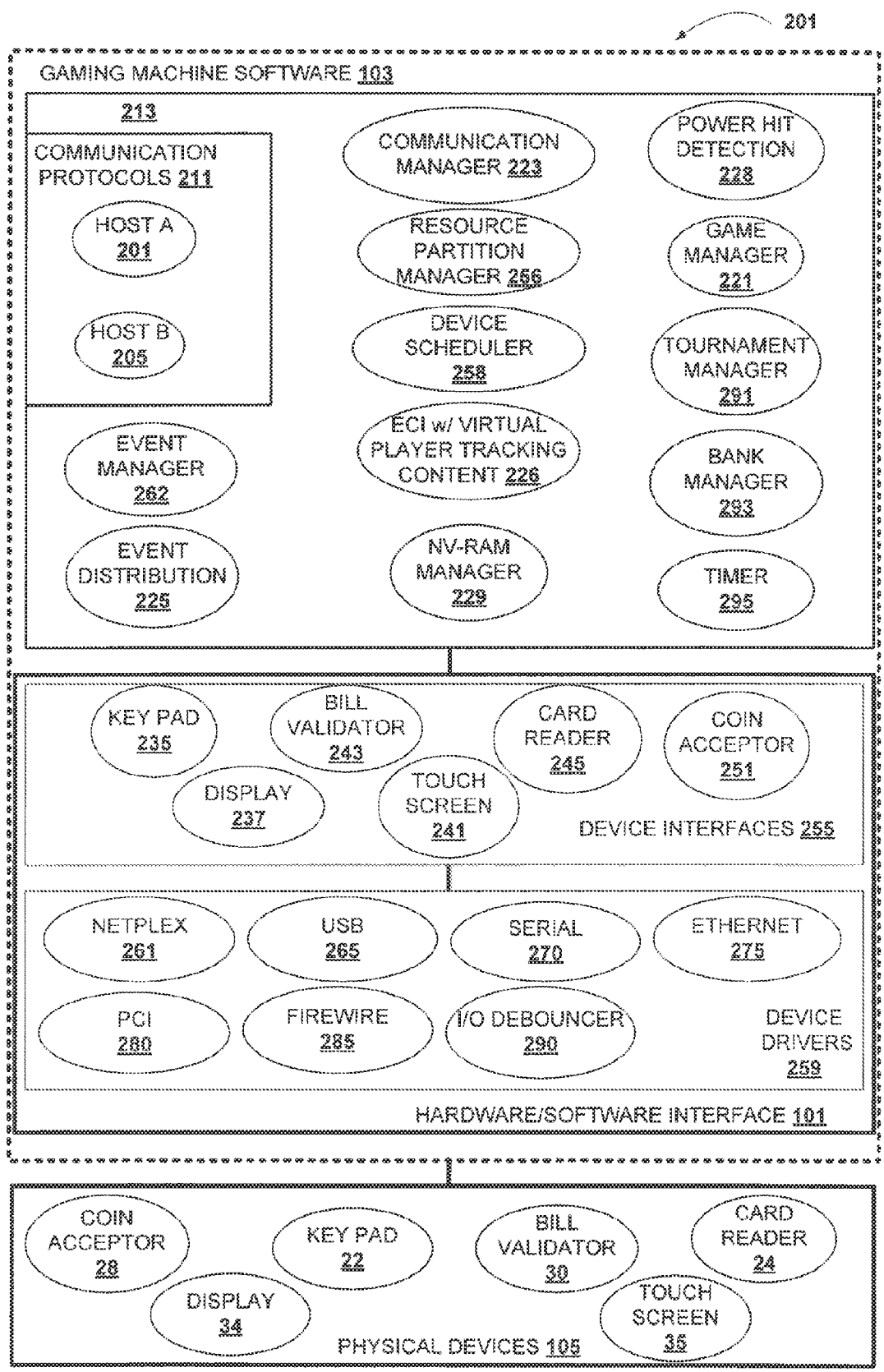

FIGS. 3A to 3C is a block diagram showing hardware and software components and their interactions with respect to example embodiments of gaming machines. In at least one embodiment described herein, the operating system may maintain "resource partitions." A resource partition may be logical abstraction implemented in the operating system logic that enables the operating system to monitor and limit the resources used by all of the process or process threads executing in each resource partition. At any given time, a resource partition may include one or more member processes or member process threads. For example, in at least one embodiment described herein, a QNX operating system (Ottawa, Canada) may be employed. With QNX, each thread of execution may be individually assigned to a different resource partition. Thus, one process may have several threads each running in different partitions. In general, the operating system may be a POSIX compliant operating system, such as Unix and Linux variants, Windows™ NT, 2000, XP, Vista, etc.

Resource partitioning is one example or aspect of virtualization. Virtualization is the process of presenting a logical grouping or subset of computing resources so that they can be accessed in ways that give benefits over the original configuration. In particular, virtualization may provide techniques for hiding the physical characteristics of computing resources from the way in which other systems, applications, or end users interact with those resources. These techniques may include making a single physical resource (such as a server, an operating system, an application, or storage device) appear to function as multiple logical resources; or it can include making multiple physical resources (such as storage devices or servers) appear as a single logical resource. Virtualization may refer to the abstraction of resources in many different aspects of computing and may include virtual machines and systems management software. Thus, the examples of resource partitioning and other virtualization examples are provided for illustrative purposes only and are not intended to limit the invention to virtualizations providing only resource partitioning or the other examples of virtualization mentioned herein.

As noted above, threads may be assigned to different partitions in at least one embodiment described herein. A thread may be short for a thread of execution. Threads are a way for a program to split itself into two or more simultaneously (or pseudo-simultaneously) running tasks. Threads and processes differ from one operating system to another, but in general, the way that a thread is created and shares its resources may be different from the way a process does.

Multiple threads may be executed in parallel on many computer systems. This multithreading may be provided by time slicing, where a single processor switches between different threads, in which case the processing is not literally simultaneous, for the single processor is only really doing one thing at a time. This switching can happen so fast as to give the illusion of simultaneity to an end user. For instance, a typical computing device may contain only one processor, but multiple programs can be run at once, such as an ECI for player tracking alongside an a game program; though the user experiences these things as simultaneous, in truth, the processor may be quickly switching back and forth between these separate threads. On a multiprocessor system, threading can be achieved via multiprocessing, wherein different threads can run literally simultaneously on different processors.

In at least one embodiment described herein, multiprocessor systems with multiple CPUs may be used in conjunction with multiprocessing. For example, an ECI process or ECI thread may be executed on one or more CPUs while a game is executed on one or more different CPUs. In a particular embodiment, in a multiprocessor system, CPU accessibility may be limited according to the application. For instance, ECIs may be only executed on certain processors and games on other processors. The ECIs may be prevented from utilizing processors dedicated to executing games or other applications.

Threads are distinguished from traditional multi-tasking operating system processes in that processes are typically independent, carry considerable state information, have separate address spaces, and interact only through system-provided inter-process communication mechanisms. Multiple threads, on the other hand, typically share the state information of a single process, and share memory and other resources directly. As noted above, threads of the same process may be assigned to different resource partitions. Context switching between threads in the same process may be typically faster than context switching between processes.

In general, the term, "process" refers to a manipulation of data on a device, such as a computer. The data may be "processed" in a number of manners, such as by using logical instructions instantiated in hardware, by executing programming logic using a processor, or combinations thereof. Thus, a "process" for the purposes of this specification may describe one or more logical components instantiated as hardware, software, or combinations thereof that may be utilized to allow data to be manipulated in some manner. Therefore, the terms "process" and "process thread" as described are provided for the purposes of clarity only and are not meant to be limiting.

Four resource partitions, 360, 366, 368 and 370 are illustrated in FIG. 3A: an operating system resource partition 360 that includes processes (or process threads) executed by the operating system; a game resource partition 366 from which game processes (or process threads) are executed; an ECI resource partition 382 from which a first ECI process 382 (or ECI process thread) may be executed; and an ECI resource partition 368 from which a second ECI process 380 (or ECI process thread) may be executed. As noted above, resource partitioning may be performed at the process level, the process thread level, or combinations thereof.

In one embodiment, resource partition definitions 308, such as resources allocated to each resource partition and processes that are enabled to execute in each partition (e.g. partition assignments 310), may be stored in the secure memory 326. Data stored in the secure memory may have been authenticated using the authentication components 304 stored on the Boot ROM 302. When a process is launched by the operating system, it may check to see which resource partition to assign the process using the partition assignments 310, which may include a list of processes that may be executed in each partition. In one embodiment, some processes may be assigned to more than one resource partition. Thus, when the resources associated with a first resource partition are being fully utilized, the process may be executed from a second resource partition with available resources.

In another embodiment, the partition assignment information may be stored with each executable image, such as images, 316, 318 and 320. When a process or process thread is launched, the operating system may determine which partition to assign the process or the process thread (In general, each process will have at least one process thread). With this method, new executable images may be downloaded to the gaming machine from a remote device that are not listed in the partition assignments 310 and still be assigned to a resource partition.

In a particular embodiment, the operating system may only allow one ECI process or ECI process thread to execute in a partition at one time. In other embodiments, a plurality of ECI processes may be executed from a single partition at one time. When only a single ECI process is allowed to execute from a partition at one time, the amount of resources available to the ECI process occupying the partition may be more predictable. This type of architecture may be valuable when ECIs are provided from two or more different hosts simultaneously where each remote host doesn't necessarily know the resource requirements utilized by an ECI from another remote host. When two or more ECIs are allowed to occupy a single partition and execute simultaneously, the resources provide to each ECI, respectively, may be more vary more if each respective ECI is competing for a limited amount of resources.

The resource competition may be become more acute when the resources needed by two or more ECIs are near or greater than one or more resources (e.g., CPU cycles or memory) provided in a partition. In some embodiments, the gaming machine may prioritize resource utilization by each ECI process. For instance, an execution priority may be assigned to each ECI process executing in a resource partition such that based on the priority one ECI process is favored over another ECI process when they are both competing for resources.

The priority assigned to each ECI process may be based on another factors. A priority to resources may be assigned to an ECI process based upon its function. For instance, an ECI for providing a bonus interface may be given a higher priority to resources than an ECI for providing advertising. In another embodiment, a priority may be assigned to an ECI process in accordance with a price paid to allow the ECI process and its content to be presented on the gaming device. In general, prioritization for utilizing resources is another way of providing virtualization on a gaming device.

Resources that may be monitored and limited for each partition include but are not limited CPU usage, memory usage, such as RAM usage, NV-RAM usage, disk memory usage, etc., GPU (graphics processing usage), network bandwidth, sound card usage and access to gaming devices, such as displays, audio devices, card readers, bill validators (e.g., as described with respect to FIG. 2, for some resource partitions, for security purposes, access to certain devices, such as bill validators and cashless devices, or device features may not be available). Resources that may be monitored on the gaming machine 300 include the executable space 338, the processing devices 348, the gaming devices 358 and the secure memory 326. The local resource metering process 238 may monitor resource usage for each partition. In FIG. 3A, the local resource metering process 238 is shown monitoring, device A, device B, network bandwidth usage, processor usage of processors, 340 and 342, power usage, and memory usage.

The local resource metering process 238 may report information to the resource partition manager 256. In particular embodiments, based upon limits placed on each resource partition, the resource partition manager 256 may prevent new processes from executing in a particular resource partition or may even terminate certain processes to free up resources processes executing in other partitions. For example, if the output of the game on the gaming machine 300 is less than optimal because of the resources utilized by the ECI 380 or ECI 382, the gaming machine may suspend execution or terminate execution of one or both of the ECI 380 or ECI 382.

In one embodiment, prior to enabling a remote host to control an ECI on the gaming machine 300 and based on its resource partitioning system, the gaming machine 300 may notify the remote host of information regarding the resources it may have available to use while the ECI it wishes to control is executing on the gaming machine 300. In one embodiment, the remote resource manager 230 may report this information to the remote host. In another embodiment, the gaming machine may broadcast its available resources to a plurality of remote hosts that may control an ECI on the gaming machine 300. These messages may be broadcast at regular intervals and change depending on a current resource utilization on the gaming machine.

The resource information may include information regarding an upper limit of resources that may be available (e.g., a maximum of 10% CPU usage, 100 MB of RAM), a lower limit of resources that may be available (e.g., a minimum of 5% CPU usage, 50 MB of RAM, no audio capabilities), a prediction of a range of resources that may be available over time (e.g., at least 400×300 pixel window with periodic access to a 1600×1200 pixel window and at least 4 channels of 32 channel sound card with periodic access to all channels), a prediction of platform performance based on the available resources (e.g., an output frame rate of 25 frames per second at 60 Hz screen refresh rate using 16 bits of color). An upper and lower limit of resources may be provided because the resources available on the gaming machine may change with time while an ECI is executing.

Additional partitioning information may include a display mode, such as a translucent overlay of the game screen or a display location (e.g., left third of the display screen). Further, information sent to the remote host may include game theme, graphics and sound information currently executing on the gaming machine 300. The remote host may utilize this information to customize content for an ECI executing on the gaming machine 300 that is thematically consistent with a game executing on the gaming machine 300.

In addition, the gaming machine may send file information to the remote host information regarding files, such as application files executed by an ECI, stored in the resource partitions. The files may have been previously downloaded from the remote host or a different remote host at an earlier time. One or more files or information/data/commands within the one or more files may be of use to the remote host and thus, the remote host may structure a download based on the file information. For instance, the remote host may download files/data/content that is only needed in addition to the files/data/content already stored on the gaming machine.

In response to the resource information it receives from the gaming machine, the remote host may determine whether the resources are adequate to output the content it wishes to present on the gaming machine via the ECI. In some embodiments, the remote host may adjust the content to output via the ECI to account for the available resources. For instance, when resources are limited, pre-rendered images, 2-D graphics, or vector-based graphics may be used instead of dynamically rendered 3-D graphics. As another example, if network traffic is high, such that the network bandwidth is limited, the remote host may reduce the amount of data sent to gaming machine. Details of graphical related apparatus and methods that may be utilized in at least one embodiment are described with respect to U.S. Pat. No. 6,887,157, filed Aug. 9, 2001, by LeMay, et al., and entitled, "Virtual Cameras and 3-D gaming environments in a gaming machine," which is incorporated herein and for all purposes.

In a particular embodiment, the remote host may request additional resources than the gaming machine 300 has said are available. In response, the gaming machine 300 may temporarily create a resource partition, such as 370 or 368, or another type of virtualization (e.g., a virtual machine) that enables the remote host to access the additional requested resources while the ECI is executed. In other embodiments, the resources available on the gaming machine may not be suitable for the content that the remote host has available and the remote host may decide not to control an ECI, such as 382 or 380.

One advantage of using a virtualization, such as resource partitions, may be that a remote host in control of an ECI on a gaming machine may be enabled to control of resources while guaranteeing adequate game performance. A gaming machine operator always wants a game player to be presented with a quality game experience including presentations with desirable graphics and sounds. If providing access to gaming machine resources via an ECI results in an excessive degradation of the game experience (e.g., the graphics become jagged or jumpy), then sharing of gaming resources using an ECI would not be desirable. New gaming machine are becoming increasingly powerful in their capabilities. The use of ECIs in combination with resource partitioning enables under-utilized gaming machine resources to be used in an effective manner while insuring that a quality game experience is always is provided to a game player.

Another advantage of using a virtualization, such as resource partitions, may be that testing requirements related to the development of game software and ECI software may be simplified. One method of ensuring a quality game experience is maintained on a gaming device while a game process for generating a game is executing on the gaming device while one or more ECI processes are executing is to extensively test the one or more ECI processes and game process under a variety of conditions. Testing every possible ECI process in combination with one or more possible ECI process in conjunction with every different game variation quickly becomes very unattractive in terms of both cost and time.

Using virtualization, where the maximum resources allowed to be utilized by one or more ECI processes are prevented from exceeding a set limit, the gaming software for generating a game on the gaming machine may be tested where a maximum resource utilization allowed for the one or more ECI processes is simulated while the game is being executed. The game may be tested under a variety of operational conditions, such as when it is using a maximum number of CPU cycles or graphic processor cycles, to ensure that the generated game is adequate at the maximum resource utilization condition allowed for the one or more ECI processes. After the testing, it may be concluded that the game performance will be adequate for any combination of one or more ECI processes using up to the maximum allowable resources for the ECIs. Thus, new ECI processes may be developed after the game is released without having to test the performance of the game in combination with each new ECI.

In addition, each ECI process may be tested to determine whether they perform adequately under various resource conditions up to the maximum resources allowed for a single ECI on a gaming device. This process may allow ECI developers to develop and test ECIs and associated content that are appropriate for different resource ranges up to the maximum allowed resources without needing to test them in combination with each possible game. Further, the developer may develop multiple ECIs and associated content to perform a particular function using different amount of resources with the knowledge that each ECI will perform adequately after testing. For example, a first ECI may use vector graphics to provide an animation, which requires less memory and allows for a faster download time, as compared to a second ECI that uses pre-rendered bitmaps to provide the animation where the function of the first and second ECI are the same.

As described above, in regards to virtualization, at least one embodiment described herein is not limited to resource partitioning. Other examples of virtualization that may be employed in at least one embodiment are described as follows. Via Intel's Virtualization Technology (or the corresponding AMD technology), these microprocessor vendors have introduced features in their micro-architectures that may improve the processor's ability to run multiple operating systems and applications as independent virtual machines. Using this virtualization technology, one computer system can appear to be multiple "virtual" systems. Thus, in various embodiments, a gaming environment utilizing virtual gaming machines where the operating systems may vary from virtual gaming machine to virtual gaming machine may be employed. In a particular embodiment, a virtual gaming machine may use a core of a multi-core processor.

A virtual gaming machine may use a virtual machine monitor (VMM) A virtual machine monitor may be a host program that allows a single computer to support multiple, identical execution environments. All the users may see their systems as self-contained computers isolated from other users, even though every user is served by the same machine. In this context, a virtual machine may be an operating system (OS) that may be managed by an underlying control program.

Low interrupt latency, direct access to specialized I/O, and the assurance that a VMM won't "time slice away" the determinism and priority of real-time tasks may be important for a real-time virtual gaming machine used in a gaming environment. In at least one embodiment described herein, the combination of multi-core CPUs and Intel VT or a related technology may be used to build a real-time hypervisor based on dynamic virtualization.

A real-time hypervisor may be a VMM that uses hardware virtualization technology to isolate and simultaneously host general-purpose operating systems and real-time operating systems. Unlike a static virtualization, the dynamic virtualization implemented by a real-time hypervisor may use an "early start" technique, to take control of the hardware platform. Thus, operating systems may only be allowed to "boot" only after the real-time hypervisor has constructed a virtual machine for them. The guest operating system may be associated with a particular game provided by a software provider. Thus, in at least one embodiment described herein, a gaming platform may support games provided by multiple software vendors where different games may be compatible with different operating systems.

In the processors that include Intel VT an overarching operating-mode has been added, called VMX root, where a hypervisor executes with final control of the CPU hardware. A hypervisor that uses Intel VT may intercept key supervisor-mode operations executed by any software operating outside of VMX root without requiring a prior knowledge of the guest OS binaries or internals. Using this Intel VT hardware assist for virtualization, one may build a hypervisor VMM that hosts protected-mode operating systems executing in ring 0 without giving up control of key CPU resources. Also, Intel VT provides a way for the VMM to implement virtual interrupts.

In at least one embodiment described herein, static and dynamic virtualization may be used. Nevertheless, two advantages to building a multi-OS real-time system by using dynamic virtualization rather than static virtualization may be: first, a wide range of operating systems, both general-purpose and real-time, may be supported and, second, the boot sequence for each guest OS may be under the control of the hypervisor. The second advantage means it may possible, in at least one embodiment described herein, to restart one guest OS while other guest operating systems continue to run without interruption.

TenAsys provides an example of a hypervisor that may be used in at least one embodiment described herein. The hypervisor may be capable of supporting the demands of a Real-time operating system (RTOS) while simultaneously hosting a general-purpose operating system (GPOS), like Windows or Linux. The hypervisor may enhance real-time application responsiveness and reliability in a "multi-OS, single-platform" environment, by providing control over interrupt latency and partitioning of I/O resources between multiple guest operating systems.

In various embodiments, the hypervisor may be used to distinguish between resources that may be multiplexed by the VMM and those that are exclusive to a virtual machine. For example, When user interface I/O is not associated with time-critical events, input devices like the keyboard, mouse, console, disk, and an enterprise Ethernet interface may be multiplexed and shared between all virtual machines. However, hardware that is specific to a real-time control application, such as a video capture card, fieldbus interface, or an Ethernet NIC designated for communication with real-time I/O devices, may not be multiplexed between virtual machines. Using the hypervisor, specialized real-time I/O may be dedicated to its real-time virtual machine, so the RTOS and application using that I/O can maintain real-time determinism and control.

In one embodiment of a VMM some or all of the memory in each virtual machine may be swapped to disk, in order to more efficiently allocate limited physical RAM among multiple virtual machines. In another embodiment, a real-time hypervisor may be used to guarantee that each real-time virtual machine is locked into physical RAM, and is never swapped to disk. This approach may be used to insure that every real-time event is serviced consistently, with deterministic timing. In yet another embodiment, the hypervisor may be used to dedicate a core in a multi-core processor to a virtual machine, such as a virtual gaming machine.

FIG. 3B is a block diagram of a gaming machine 100 including hardware and software components in accordance with a specific embodiment. The gaming machine 100 may include RNG software or the gaming machine 100 may be a terminal in a central determination system where the random numbers are generated remotely from the gaming machine or combinations thereof (see at least FIGS. 6 and 7 for more possible gaming machine/device embodiments). ECIs that may be used in conjunction with various gaming devices coupled to the gaming machine to provide gaming services on the gaming machine 100 under control of a remote host are described. The ECI's may be a component of gaming machine software 103 and may be executed as processes by a gaming operating system on the gaming machine 100 (see at least FIGS. 1A and 4).

In one embodiment, the gaming operating system is part of the master gaming controller of the gaming machine. The master gaming controller also controls the play of a game of chance on the gaming machine 100. In another embodiment, logic devices separate from the master gaming controller, such as a logic device on a player tracking unit, may also be used to execute the ECI processes.

In one such embodiment, a player tracking unit including a logic device executing an operating system and coupled to the gaming machine may also be used to host ECI processes controlled by remote host including a remote logic device. That is, the gaming machine disclosed herein may be associated with or otherwise integrated with one or more player tracking systems. In this embodiment, the gaming machine and/or player tracking system tracks the player's gaming activity at the gaming machine. In one such embodiment, the gaming machine and/or associated player tracking system timely tracks when a player inserts their player tracking card to begin a gaming session. In at least one embodiment, it may also timely track when a player removes their player tracking card when concluding play for that gaming session. In another embodiment, rather than requiring a player to insert a player tracking card, the gaming machine may utilize one or more portable devices carried by a player, such as a cell phone, a radio frequency identification tag, or any other suitable wireless device to track when a player begins and ends a gaming session. In another embodiment, the gaming machine may utilize any suitable biometric technology or ticket technology to track when a player begins and ends a gaming session.

During one or more gaming sessions, the gaming machine and/or player tracking system tracks any suitable information, such as any amounts wagered, average wager amounts, and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In another such embodiment, the remote host maintains or keeps track of the play and/or other activity on or relating to the gaming machines in the gaming system. In one embodiment, the remote host keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming machine includes a separate coin-in, wager meter or pool which tracks the total or partial coin-in or wagers placed at that gaming machine. It should be appreciated that the player playing a designed gaming machine may change during this tracking and that this tracking can be independent of the specific player playing the designated gaming machine. It should be further appreciated that the wagers placed may be tracked in any suitable compatible or comparable manner such as credits wagered (i.e., if all of the system gaming machines are of the same denomination) or monetary units (e.g., total dollars or other currency) wagered. It should be further appreciated that tracking in monetary units may account for gaming machines having multi-denominations and/or for gaming machines of different denominations and/or gaming machines which accept different currencies.

Via the remote host communication 113, the ECI 124 may receive content from a remote host 110. As described with respect to at least FIG. 2, a first ECI may receive content from a first remote host and a second ECI may receive content from a second remote host. In a particular embodiment, the content received from the remote host 110 comprises video and/or audio content that may be output on display devices, such as 16, 34, and 42 and audio devices, such as 12 and 14, coupled to the gaming machine 100. Further, the remote host 110 may send via the remote host communication 113 instructions for controlling the physical devices 105 and also receive input from the physical devices 105. The remote host 110 may send via the remote host communication 113 content/instructions to the ECI and instructions for controlling one or more of the physical devices 105. The instructions for the physical devices 105 from the remote host 110 may be routed from the remote host communication to the hardware/software interface 101 and then to the physical devices 105.

A program, such as an Adobe™ flash player or compatible player, may be used to output content received from the remote host. The program may be used to output content for a number of different game services, such as player tracking, ATM, communications, lottery, concierge, reservations and entertainment. In some embodiments, the gaming machine may not store content related to a particular ECI. After the ECI is launched, the ECI may loaded into a memory device or a protected memory space on the gaming machine 100, then the gaming machine 100 may load content received from the remote host directly into volatile memory. After the ECI is terminated, the downloaded content associate with the ECI may be lost and the volatile memory used by the ECI may be assigned to other processes. In one embodiment, streaming of information, such as video and audio information, may be employed.

In one embodiment, the memory device of the gaming machine includes, but is not limited to, random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming machine disclosed herein. In one alternative embodiment, part or all of the program code and/or operating data described above can be stored in a detachable or removable memory device, including, but not limited to, a suitable cartridge, disk, CD ROM, DVD, flash memory, or USB memory device.

In another embodiment, the content associated with a particular ECI may be loaded into volatile memory but may also be stored to a non-volatile memory, such as disk memory or flash memory. In FIG. 3B, content related to a number of ECI's is stored on the gaming machine and illustrated as ECI content storage 111. An advantage of this approach is that when a remote host provides a game service multiple times on the gaming machine 100, the host may be able to use some content previously stored on the gaming machine and thus, reduce a size of a download that is needed to provide the game service.

Storage of previously used ECI content, such as ECI content storage 111, may lead to additional communications between the remote host 110 and the gaming machine 100. For example, the remote host 110 and the gaming machine 100 may comprise logic that enables the remote host 110 to 1) determine and validate the ECI content 111 stored on the gaming machine 100 and 2) direct the ECI 122 to load content from the ECI content storage 111. The ECI 122 may load content storage 111 in combination with content received directly from the remote host 111 to provide a game service.

In another example, the remote host 110 and/or the gaming machine 100 may comprise logic that determines what content to save to the ECI content storage 111 and what content to delete from the ECI content storage 111. In one embodiment, content may be deleted from the ECI content storage 111 when a storage limit is reached. In another embodiment, content may be deleted when it becomes old or outdated. The remote host may send information to gaming machine that prioritizes what content to delete first. Thus, for example, when a storage limit is reached, the gaming machine may delete content with a lower priority prior to deleting content with a higher priority. In another example, stored content may relate to upcoming events that may eventually pass or linked to a holiday period that may pass. As another example, the stored content may be simply changed to maintain player interest. In yet another example, the gaming machine track a last time content was utilized or a frequency of utilization and delete content items that were last used a long time ago versus recently used content items or delete content items that are used more frequently before deleting content items used less frequently.

ECI Applications

Examples stored ECI content include but are not limited to 1) virtual player tracking 612 and 614 which may be used to provide player tracking services, 2) a virtual Automatic Teller Machine (ATM) 616 which may enable the gaming machine to provide fund transfers and monetary account management, 3) a virtual entertainment center 618 which may enable the gaming machine to provide one or more entertainment services besides game play to the game player, 4) a virtual lottery machine 620 that may enable a player to purchase a lottery ticket of some sort at the gaming machine, 5) a virtual change machine 622 that may enable a player to obtain change at a gaming machine, 6) a virtual sports book 624 that may enable a player to make a wager on an event at the gaming machine, to monitor events, to receive results and to cash out a winning event ticket, 7) a virtual communication center 625 that may enable a player to a) communicate with other game players, other individuals or a casino host, b) send and receive e-messages and/or c) locate other players, 8) a virtual concierge 628 that enables a player to a) learn about and obtain various hotel/casino, restaurant, entertainment and travel services and b) make reservations, 9) a virtual vending machine 628 that enables a player to purchase various vending items at the gaming machine and 10) a virtual kiosk (not shown) that enables for a) Internet enabled services, such as web-browsing, b) registration services such as for a loyalty program and c) comping and prize redemption associated with a loyalty program. As is described above, the ECI content doesn't have to be permanently stored on the gaming machine and may be received directly from the remote host 110 and stored temporarily in a non-volatile memory, such as a RAM while the ECI 124 is executed. Additional applications that may be adapted to provide embodiments using ECIs on a gaming machine are described with respect to U.S. Pat. No. 6,712,698, titled, "Game Service interfaces for Player Tracking Touch Screen Display," originally filed, Sep. 20, 2001, U.S. Pat. No. 6,942,574, entitled, "Method and Apparatus for Providing Entertainment Content on a Gaming machine," originally filed Sep. 19, 2000 and U.S. Pat. No. 6,997,803, entitled, "Virtual Gaming Peripherals for a gaming machine, originally filed Mar. 12, 2002 each of which are incorporated herein by reference and for all purposes.

The virtual vending machine 628 may enable a gaming machine to dispense items directly to the player, enable the player to order an item, which is brought to the player or sent to the player, or dispense a media that is redeemable for the item. In addition, the virtual vending machine 628 may be used to redeem or order prizes or merchandise. The virtual player tracking ECI's, 612 and 614, may be used to provide player tracking services. Addition details of player tracking services that may be incorporated into an ECI are described in co-pending U.S. application Ser. No. 09/642,192, filed Aug. 18, 2000, by LeMay, et al. and entitled, "Virtual Player Tracking and Related Services," which is incorporated herein in its entirety and for all purposes.

As described above, the ECI may output its content to a combination of gaming devices in the physical gaming devices 105 to provide a gaming service and present its content. In one embodiment, the ECI process may control or issue commands to devices and the remote host controlling the ECI may also issue commands to physical devices in conjunction with the ECI. Four examples of gaming device combinations are shown for illustrative purposes. The device combinations utilized by an ECI and a remote host may vary according to the gaming devices available on a particular gaming machine.

As an example of device combinations that may be used with an ECI and a remote host 110, the remote host may control the virtual ATM ECI 616 in conjunction the bill validator 30, the printer 18, the key pad 22, the display 34, the card reader 24, and the touch screen 35 to provide ATM services. The card reader 22 may be used to accept an ATM card. The key pad 22 may be used to enter a pin number. The bill validator 30 may be used to accept cash or printed tickets with a cash value. Funds entered into the gaming machine may be transferred to a bank account. The display 34 and the touch screen 35 may be used to display and select various ATM services. The printer 18 may be used to provide receipts and print cashless tickets, which may be used for game play in other gaming machines.

A virtual sports book ECI 624 and the virtual lottery machine ECI 620 may also provide services using the combination of devices described for the virtual ATM ECI 616. However, the context in which the devices are used may be different. For instance, the printer 18 may be used to print a lottery ticket for the virtual lottery machine 620 and a wager ticket for the virtual sports book 164 instead of a receipt. Also, the display 34 and touch screen 35 may be used to display and make lottery and sports bets selections instead of ATM selections. Logic residing on the remote host 110 may enable it determine the context the device is being used.

As another example, a virtual entertainment center peripheral ECI 618 may control a payment or coin acceptor 28, input buttons 32, the secondary display 42 and speakers 12 and 14 to provide entertainment sources to a player. In one embodiment, the virtual entertainment center ECI 618 may act as a musical video jukebox. Using the input buttons 32, a player may select musical videos, which are output on the secondary display 42 and speakers 12 and 14. In another embodiment, the player may be able to select a musical format, which is output on speakers 12 and 14. In yet another embodiment, the player may be able to watch a sporting event on the secondary display while playing a game on the gaming machine. In some cases, the player may be required to deposit money via the payment acceptor 28 to use the virtual entertainment center.

In yet another embodiment, a player may be enabled to win or purchase entertainment content and then download the entertainment content to a portable device carried by the player. An interface for communicating with the portable device, such as a wireless interface, may be coupled to the gaming machine to enable the download to the portable device. In another example, the player may receive a voucher valid for the entertainment content that is redeemable at another location.

In yet another example of a gaming service provided by an ECI, a virtual player tracking ECI, such as 612 and 614, may be used to provide player tracking services. Different combinations of gaming devices may be used to provide the same gaming service. For instance, the first virtual player tracking ECI 612 uses the key pad 22, the card reader 24, and the small display 16 to provide player tracking services. In another embodiment, instead of the small display 16, a portion of the large display 34 may also be used to output player tracking information.

To start a player tracking session, as described above, the player may insert a player tracking card in the card reader 24, enter a PIN number using the key pad 22, and receive player tracking information via the small display 16. The second virtual player tracking ECI 614 uses the display 34, the touch screen 35, the card reader 24, a finger print reader 39, and a light panel 44. To start a player tracking session, the player may insert a player tracking card in the card reader 24, provide finger print information via the print reader 39, and receive player tracking information via the display 34. Using the touch screen 35, the player may be able to select choices from player tracking service menus and interfaces displayed on the display 34, enter a PIN, or provide other alphanumeric input. The light panel 44 may be used to convey operational information to a player. For example, the light panel may change color or flash when a player has inserted their player tracking card incorrectly in the gaming machine.

In one embodiment, one or more ECI processes described above are available to non-player tracking carded players. In one such embodiment, the gaming system provides one or more ECI processes to a non-carded player and informs the player of the different ECI processes that would become available to the player if the player were to obtain a player tracking card. In one embodiment, the gaming system enables the player to enroll in the player tracking system at the gaming machine.

In at least one embodiment described herein, one or more ECI processes and game play processes on the gaming machine may share the same gaming device. For instance, the card reader 24 may be used by the virtual ATM ECI 616, the first virtual player tracking peripheral 612 and the second virtual player tracking peripheral 614. As another example, the bill validator 30 may be used by the virtual ATM peripheral 616 and by the master gaming controller on the gaming machine.

Traditionally, gaming devices have not been shared by different software elements or processes executing on the gaming machine and the functions of a particular gaming device have been fairly limited. For example, card readers on gaming machine are typically used only to read player tracking information from player tracking cards. Further, the card readers have been in player tracking units with a separate logic device from the master gaming controller that provide control and have not been accessible to a master gaming controller on the gaming machine. As another example, the bill validator 30 is typically used only to insert credits into the gaming machine. Thus, conflicts between different gaming processes wishing to use a gaming device at the same time have not generally had to be considered on gaming machines.

Since a given gaming device may be shared by multiple software entities, the context in which a given device is being used may be important. For example, a player tracking session may be usually initiated when a player inserts a player tracking card into the card reader 24. When a card is inserted into the card reader 24, one of the virtual player tracking peripherals (e.g., 612 or 614) may detect the insertion of the card and initiate the player tracking session. When the virtual ATM peripheral 116 is active, the player may insert an ATM card into the card reader 24 to begin ATM services (inserting the card may also activate the ATM peripheral if it is not active). Thus, one possible scenario using the card reader 24 is that the player has requested an ATM service, the virtual ATM peripheral 116 may be given control of the card reader 24, and the virtual ATM peripheral 116 is waiting for the player to insert an ATM card into the card reader 24. If the player mistakenly inserts a player tracking card into the card reader 24, the virtual ATM peripheral 116 may generate an error because the player tracking card is not an ATM card. In another embodiment, the gaming system disclosed herein may enable credits to be downloaded from a player's account via a player tracking card (and utilizing a designated pin specific to that player). When the virtual ATM peripheral 116 and the virtual player tracking peripheral (112 or 114) may be operating simultaneously, logic on the gaming machine may be required to determine in the situation described above whether a player tracking session is to be initiated or an error is to be generated.

In a particular embodiment, an ECI process executing on the gaming machine may be limited to only outputting video and/or audio content. For instance, the ECI may be limited to outputting only video content on a portion of display 34 and audio content on speakers 12 and 14. In another example, the ECI may be limited to outputting only video content on a portion of display 34.

Operating System

In general, when a gaming device is shared by two or more entities, such as two or more ECI's or an ECI and another gaming process executed on the gaming machine, and when situations occur where the two or more entities may want to simultaneously use the same shared gaming device, shared gaming device logic may be required to arbitrate control of the shared gaming device. In traditional gaming machines, arbitrating control of a shared gaming device is generally not an issue because most gaming devices are usually either controlled by a single process or used for a single purpose. Control of the shared gaming device may be determined according to the context in which the device is being used. For instance, using the payment acceptor 28 in the context of entering credits to the gaming machine may be given priority over using the coin acceptor in the context to make change using the virtual change machine 622 or to purchase items from the gaming machine using the virtual vending machine 628. Device scheduling and resource management are described with respect to at least FIGS. 2 and 3A.

FIG. 3C is a block diagram illustrating further details relating to the hardware and software shown in FIG. 3B for at least one embodiment. An exemplary software architecture including a number of processes that may be executed by the operating system 213 are shown. The ECI w/virtual player tracking content 226 is a "process" executed by an operating system 213 residing on the gaming machine. In a particular embodiment, a protected "process" may be defined as a separate software execution module that is protected by the operating system and executed by a logic device on the master gaming controller 224. When a process, including the ECI 226, is protected, other software processes or software units executed by the master gaming controller can't access the memory of the protected process. A process may include one or more process threads associated by the process.

The operating system 213 used to implement the gaming software architecture of at least one embodiment may be one of a number of commercially available operating systems, such as QNX by QNX Software Systems, LTD of Kanata, Ontario, Canada which is Unix-like, Windows NT, 2000, XP, Vista by Microsoft Corporation of Redmond, Wash. or Linux or a Linux variant, such as by Redhat, Durham, N.C., which is an open source Unix based operating system. Different operating systems may use different definitions of processes. In QNX, the processes are protected. With other operating systems, a "process" may be dedicated logic that is executed. Using different operating systems, many different implementations of different embodiments are possible and the embodiments described herein are not limited to the constraints of a particular operating system.

A few details of the processes that may be executed on gaming machines of at least one embodiment are as follows. The NV-RAM manager 229 controls access to the non-volatile memory on the gaming machine. By using the NV-RAM manager 229, the gaming processes may share the non-volatile memory resource at the same time. Thus, the non-volatile memory usage is optimally used which may lower the costs associated with adding new functions to the gaming machine. In some embodiments, ECI processes may be prevented from accessing non-volatile memory for security purposes in other embodiments the ECI processes may be enabled to send and receive information stored in a non-volatile memory on the gaming machine.

In at least one embodiment, Tournament Manager 291 may be configured or designed as a local or remote process which is operable to exert control over other selected processes running at the gaming machine and/or gaming system in order, for example, to create a "tournament mode" without games having to be aware of it. In one embodiment, a Tournament Manager of a gaming machine (e.g., server-based gaming machine and/or a non server-based gaming machine) may be operable to allow any compatible game (e.g., games which are compatible for play in non-tournament mode at the gaming machine) to operate in tournament mode at the gaming machine without any custom adaptations to such games. Thus, for example, in one embodiment, a Tournament Manager of an advanced video platform (AVP) based gaming machine (e.g., server-based enabled gaming machine) may be operable to allow any AVP game (e.g., server-based game) to operate in tournament mode without any custom adaptations to that game.

In at least one embodiment, the term "gaming system" may be used to describe a system of components, devices, processes, and/or other components which, collectively, may be used to enable play of a wager-based game. In at least one embodiment, a gaming system may include a plurality of individual gaming machines (e.g., server-based gaming machines), at least some of which have been configured or designed to participate in tournament game play with other gaming machines in the gaming system.

In at least one embodiment, the play of a particular game at a gaming machine (or gaming system) in either tournament mode or non-tournament mode may be transparent to that game. One advantage of such a feature is that it eliminates the necessity to write customized code for each game in order to allow play of that game to be supported in tournament mode. An additional advantage relates to the backward compatibility of the tournament play techniques described herein. For example, the transparent nature of the various tournament related techniques described herein allows for one or more non-customized games (e.g., games which have not been specifically configured or designed for tournament play) to be used for tournament game play at the gaming machine/gaming system, even in situations where the game has not been specifically configured or designed for tournament play.

According to specific embodiments, tournament manager 291 may be operable to control or manage different types of features and/or processes relating to the gaming machine (and/or relating to other devices in the gaming system). In at least one embodiment, such features and/or processes may include, but are not limited to, one or more of the following (or combinations thereof):

enabling/disabling tournament mode;
    starting/stopping tournament play sessions;
    suspending/resuming tournament play sessions;
    generating tournament event information;
    posting tournament event information for dissemination to other components and/or processes at the gaming machine (and/or gaming system);
    defining tournament mode type (e.g., credit mode, time mode, or both)
    monitoring for selected tournament session events/conditions;
    approving/denying requests to initiate play of a new game at the gaming machine (and/or gaming system);
    managing selected gaming machine meter operations/activities;
    managing selected gaming machine timer operations/activities;
    approving/denying tournament-related requests based on host ID;
    etc.

For example, in at least one embodiment, the tournament manager may be operable to manage information relating to one or more of the following tournament-related meters:

games won in current tournament session;
    games played in current tournament session;
    credits wagered in current tournament session;
    credits won in current tournament session;

remaining credits in current tournament session (e.g., in one embodiment, the tournament manager may use a configuration item value initially, and may subsequently use current tournament meter data such as that accessible from the bank or bank manager 293);

last game win;

last game wager;

session started (e.g., true or false);

session ended (e.g., true or false);

tournament game (e.g., whether current game is allowed to be played in tournament mode. In one embodiment, this may be determined when tournament mode is enabled using configuration information);

etc.

In some embodiments, the tournament manager 291 may be operable to control or manage various types of tournament-related information such as, for example, one or more of the following types of information (or combinations thereof):

Information relating to combination state(s) of special key combinations. For example, in at least one embodiment, tournament manager 291 may be operable to manage combination states of special jackpot key combinations such as, for example, one or more of the following (or combinations thereof):

i) Jackpot key+deal button push (e.g., may result in reset tournament session);

ii) Jackpot key+change button push (e.g., may result in exit tournament mode); and/or iii) other pre-defined key combinations and/or other pre-defined input data detected at the gaming machine.

Information relating to initial session credits.

Information relating to initial session duration (time).

Information relating to tournament lock (e.g., data relating to reason(s) why tournament is locked).

Information relating to tournament mode (e.g., data relating to whether credit and/or time mode(s) are enabled/disabled).

Information relating to host id (e.g., data relating to identity of the host(s) that started/ended/reset the tournament).

Etc.

In at least one embodiment, the tournament manager 291 may accomplish at least some of its management/control responsibilities via a variety of different mechanisms. For example, one such mechanism includes updating data stored in one or more data structures which may be accessed by various components/processes for controlling (e.g., enabling/disabling) specific features, operations and/or other functionalities. For example, in at least one embodiment, the tournament manager may update information stored in the gaming machine system memory (e.g., NV-RAM) which is utilized by selected meters (such as, for example, one or more AVP meters). In at least some embodiments, selected meters at a gaming machine may be configured or designed to utilize one or more data structures (e.g., each meter may include a bitfield) which may be used to store information defining one or more "freeze conditions" which are used to block all or specific types of meter updates. Additional details relating to this feature are described below, for example, with respect to FIGS. 7-9 of the drawings.

Another mechanism which may be used by, the tournament manager 291 for accomplishing at least some of its management/control responsibilities may include notifying other components/processes of the gaming machine (and/or of the gaming system) of relevant event information, which may be used by the such components/processes to perform specific actions (such as, for example, enabling/disabling specific features, operations and/or other functionalities) in response to the event information. According to specific embodiments, communication of the event notification may be implemented via direct communication (e.g., between the tournament manager and a component/process) and/or may be implemented via an event notification mechanism (such as, for example, via event manager 262 and/or event distribution 225). For example, in at least one embodiment, as described in greater detail below, the tournament manager may notify the bank manager (e.g., 293), via event manager 262, about information relating to tournament mode enable/disable events. In response, the bank manager may take appropriate action to store and/or configure tournament play and non-tournament play credits at the gaming machine.

Bank manager 293 may be operable to manage and/or control actions and/or information relating to various financial-related transactions such as, for example: money transactions, credit transactions, accounting transactions, etc., which may occur at a given gaming machine. In one embodiment, the bank manager may be operable to manage all (or selected) changes of state relating to money and/or credit transactions at the gaming machine. In at least some embodiments the bank manager may be operable to manage various accounting transactions. Additionally, in at least some embodiments, the bank manager may be operable to monitor and/or manage money and/or credit transactions at the gaming machine to ensure that such transactions comply with specified rules and/or regulations which may govern various different gaming jurisdictions.

Timer 295 may be operable to manage timer events relating to tournament and/or non-tournament play. In at least one embodiment, timer 295 may be operable to generate tournament related event information (such as, for example, tournament timer expiration events) which may be distributed to other processes/components of the gaming machine (and/or gaming system). In one embodiment, time 295 may be configured or designed as a power hit tolerant timer (e.g., implemented in NV-RAM) which may be operable to provide timer pulses and/or stop watch functionality to update a "seconds" property which can be utilized by game code and/or other components/processes. In at least one embodiment, the timer may be configured or designed to generate an event upon detecting the occurrence of one or more events or conditions, such as, for example, when a specified timer value has been reached or exceeded. In other embodiments, timer 295 may be implemented using hardware, software, and/or some combination thereof.

Other processes that may be considered part of the operating system include, but are not limited to, a communication manager 223, a partition manager 256, an event manager 262, a game manager 221, a power hit detection process 228, a device scheduler 258, and an ECI process 226, which for illustrative purposes provides player tracking content. The player tracking ECI process 226 in conjunction with logic executed on a remote host may be used to provide player tracking services using the card reader 24, the key pad 22, the finger-print reader 39, and the light panel 44 as described with respect to FIG. 3B.

The device scheduler 258 may be used to arbitrate control and manage the usage of one or more shared devices on the gaming machine. A "shared device" may refer to a physical device on the gaming machine that may be used in different contexts for multiple purposes. For instance, the display 34 may be used to output the results of a game of chance generated on the gaming machine via the game manager 221 and may be used to output player tracking content from player tracking ECI 226. The game manager process 221 and the ECI 226 may at times use the display 34 at the same time to control a varying portion of the display including a control of the entire display area. The device scheduler 258 may be used to determine which process under what circumstances is given access to how much of the display 34.

As described above with respect to FIG. 3C, the device scheduler 258 process may arbitrate requests, in particular concurrent requests, to use a shared gaming device, such as the display 34, from the different gaming processes executed by the gaming operating system or requests from processes executed on a remote host and determine which entity is given access to the shared gaming device, based on priority settings. For example, processes related to the output of the game of chance may be given a higher priority than ECI processes. Thus, when the game manager 221 needs control of the entire display 34, the ECI process 226 may lose access to the display 34 or may not be given access to the display in the first place.

In a particular embodiment, player inputs may affect access to a shared device. In one embodiment, an input switch or other type of input mechanism may be provided on the gaming machine that enables an ECI to be displayed or hidden. Thus, when a player actuates the switch, the gaming machine may allow or not allow the ECI to access the shared display. The gaming machine may have a default position, such as to allow an ECI to be generated or not generated in response to a player input, which may be changed by an input received on the gaming machine. The gaming machine may return to the default position after certain events, such as but not limited to the credits reaching zero on the gaming machine, a player tracking card being inserted/removed, determining that a player playing the gaming machine has changed, or after a time period has expired.

In some instance, the gaming machine may override the player's selection not to provide the ECI. For instance, when input has been provided that indicates the player doesn't wish to see the ECI, the gaming machine may allow an ECI to access particular resources, such as a display, intermittently, such as in response to certain events. Thus, briefly or for some time period, the gaming machine may allow the ECI to generate its interface and then after the time period is expired, not allow the ECI to generate its interface. For instance, after a cash out request, the gaming machine may allow an ECI that provides promotional credits that may keep the player playing to be displayed even though an input had previously been received at the gaming machine indicating that the player didn't wish to see an ECI.

The device scheduler 258 may also include logic for determining when to route information received from a physical device 105 via the hardware/software interface 101 to a remote host. For example, after an ECI process is launched and access is granted to a portion of touch screen display, input from the touch screen corresponding to the portion of the display controlled by the ECI may need to be routed to a host remote. Although, as previously noted with respect to at least FIGS. 1A-1C, the ECI may also include information handling capabilities that allow it to process and route information received from one of the physical devices.

In FIG. 3C, raw data received from a device, such as the touch screen 35 or card reader 24, may be posted as an event to the event manager 262 via a device driver in 259 for the touch screen or card reader and a device interface 255, such as a touch screen device interface 241 or card reader interface 245. As an example, the device scheduler 258 may see the event and determine that touch screen input has been received and post an event indicating that this information is to be copied and sent to a remote host. The communication manager 223 may see the event posted by the device scheduler 256 and send the information to a remote host using an appropriate communication protocol 211. For example, a remote host A may communicate using the host A protocol 203 while a remote host B may communicate using the host B protocol 205. The gaming devices of at least one embodiment may be operable to implement wireless and wired protocols of both a proprietary nature (e.g., Netplex, which is an IGT proprietary protocol) or non-proprietary nature (USB, Wi-Fi, IEEE 1394-compatable, Ethernet as well as protocols approved by the Gaming Standards Association-GSA, Fremont, Calif., such as SAS, G2S or S2S).

The device scheduler 262 may incorporate logic of varying degrees of complexity to route information received from an input device to a remote host. For example, in one embodiment, after an ECI has been instantiated and its relation to one or more devices determined, the scheduler 262 may check to determine whether input has been received from the one or more devices of interest to the remote host. When input is received from one or more devices of interest to the remote host associated with the ECI, such as the touch screen input described in the preceding paragraph, the input may be routed to remote host.

After the remote host receives the input, it determines whether the input is of interest and what response to make. For example, the remote host may not control the portion of the display from which the input was received and, thus, determine a response is not necessary. On the other hand, as described with respect to at least FIGS. 1A to 1C, the remote host may determine that the input is from an area on the display controlled by the remote host via the ECI, then send new content to the ECI to displayed on the gaming machine and/or additional instructions to the ECI control what content it is to output (e.g., the content may have already been downloaded to the gaming machine that is needed for output in response to the touch screen input and the remote host may instruct the ECI to output it).

In addition to sending content and/or instructions to the ECI 226 in response to receiving input from a physical device, the remote host may send instructions to the gaming machine that affect its operation. The remote host may send an event that is routed via the event manager 262 to one or more other processes. For example, the remote host may send an instruction to add credits to the gaming machine, which may cause a credit meter to increment and a display of the credits to be adjusted. As previously described, with at least respect to FIG. 2, the gaming machine may provide logic (not shown) for checking whether the remote host is allowed to provide a particular event. For example, all remote hosts may not be allowed to increment credits on the gaming machine. In another embodiment, the remote host may send an event that triggers a feature in a game to be unlocked, which affects the output of the game on the game interface. The game manager 221 may receive this information via the event manager 262 and event distribution.

As noted above, the device scheduler 258 or some other process executing on the gaming machine, may include more complex logic for determining what information received from a physical device to route to the remote host. For instance, for each device of interest to the remote host, the device scheduler 258 may have the capability to examine the input information and determine whether it of interest to the remote host. For example, the device scheduler may be able to determine whether the touch screen input is in the area controlled by the host and only route input received from this area. In another example, the remote host may be providing player tracking services but not ATM services, thus when a player tracking card is inserted into the card reader 24, the device scheduler 258 may determine that it is a player tracking card and route it to the remote host. When a credit card is inserted into the card reader 24, the device scheduler 258 may determine, the card is credit card and not route the information to the remote host.

In a particular embodiment, for each shared gaming device, a separate device scheduler process 258 may be used to arbitrate control of the shared gaming device, assess information received from the shared gaming device and direct the information to other processes and host devices. As another example, a device scheduler process 258 may be used to arbitrate control of multiple shared gaming devices. In general, a gaming machine may include multiple device scheduler processes that each manage one or more shared gaming devices.

As described in more detail below, the device scheduler 258 may listen to and respond to game events passed through the event manager 262 and event distribution 225 and more specifically to events that are requests for any of its known contexts to enter or exit. A context may be described as a situation defined in logic where a process may request control of a particular shared gaming device. A process, (which, for example, may include one or more process threads) may generate contexts for more than shared gaming device. For instance, the ECI process 226 in conjunction with processes with its associated host may generate contexts for the display 34, the touch screen 35, the card reader 24, and the light panel 44. The display 34, the touch screen 35, the card reader 24, and the light panel 44 may all be shared gaming devices. There are at least two circumstances under which the shared device manager 115 may grant control of the shared gaming device: 1) the current context is finished using the shared gaming device or 2) a higher priority context requires access to the shared gaming device.

Event based requests are one method of controlling access to a shared gaming device. Another method is arbitrated requests that are sent directly to a device scheduler 258 or a similar process. In at least one embodiment, event based request, arbitrated request or combinations thereof may be used.

The display 34 is one example of a gaming device that may also be a shared gaming device. Contexts that may request access to the display screen 34 include but are not limited to: a) a menu context that displays machine menu for maintenance situations, b) a tilt context that displays tilts including hand pays for tilt situations, c) a game context that displays regular game play, bonus games and cash outs, d) an attract context that displays attract menus in attract situations, and e) a main menu context that displays a game selection menu and other game service menus available on the gaming machine. The contexts for the display 34 may be generated by various gaming processes active on the gaming machine. For instance, in one embodiment, game service menu contexts may be generated by one or more ECIs, such as the player tracking ECI process 226. As another example, the game manager process 226 may generate the game context. Thus, the display 34 may be a device that may be shared multiple times. A practical limit may be applied to the display 34 or any other shared gaming device to keep the resource from being entirely exhausted.

The contexts described above for the display 34 may be prioritized. In one embodiment, the priorities for the display may be prioritized in descending order from highest to lowest, as the machine menu context, the tilt context, the game context, bonus game context, ECI context, the attract context and the main menu context. When the display is divided into different areas all or a portion of the contexts listed above may apply. For instance, the tilt context may apply for all areas. Thus, when the gaming machine enters a tilt state the tilt context may take over the entire display including all areas in which the display has been sub-divided. As another example, certain games or bonus games may use the entire screen at certain times and may be given priority over an ECI context or attract context for the portion of the screen used by the ECI context. In other embodiments, the game context and bonus game context may use a dedicated portion of the display 34 and may not compete with the ECI context for display resources.

In general, the priorities assigned to contexts for a shared gaming device are fixed. However, variable priorities may also be used for some contexts of the shared gaming device. As an example, the priorities of attract mode contexts generated by different ECIs may be increased or decreased as a function of time to emphasize a particular game service. Thus, a priority for an attract mode context for a particular game service provided by an ECI may be increased at particular times such that the attract mode context is displayed more often than other attract mode contexts generated by other ECI processes during the time when its priority is increased. For example, an attract mode context that enables a patron to make a dinner reservation or an entertainment reservation may be emphasized more by increasing its priority in the early afternoon or at other times when the patron may desire these services.

Returning to FIG. 3C, the gaming machine software 201 may comprise communication protocols 211, an event manager 262 and event distribution 225, device interfaces 255, device drivers 259, the game manager 221 which interfaces with gaming processes used to generate the game of chance, game resources such as a power Hit Detection Manager 229, which monitors gaming power, the NV-RAM manager 229 and the communication manager 223, which may be used by other processes, the ECI's, such as ECI 226, the device scheduler process 258 that arbitrates control of one or more shared gaming devices, and the resource partition manager 256, which monitors resource usage by different resource partitions as described with respect to FIG. 3A.

The software modules comprising the gaming machine software 201 may be loaded into memory of the master gaming controller 46 (see at least FIGS. 3A and 6) of the gaming machine at the time of initialization of the gaming machine. The game operating system (OS) may be used to load and unload the gaming software modules from a mass storage device on the gaming machine into RAM for execution as processes on the gaming machine. The gaming OS may also maintain a directory structure, monitor the status of processes, and schedule the processes for execution. During game play on the gaming machine, the gaming OS may load and unload processes from RAM in a dynamic manner. The gaming OS, associated processes, and related gaming data may be authenticated and/or verified at the gaming machine. Details of the authentication method and apparatus that may be used with at least one embodiment are described in U.S. Pat. Nos. 5,643,086, 6,149,522, 6,620,047, 6,106,396, by Alcorn, et, al., each of which is incorporated by reference and for all purposes. Details of software verification methods that may be used with at least one embodiment are described in U.S. Pat. No. 6,685,567, entitled, "Process verification," filed Aug. 8, 2001, which is incorporated herein by reference and for all purposes.

The NV-RAM manager 229 may be a protected process on the gaming machine to maintain the integrity of the non-volatile memory space on the gaming machine. All access to the non-volatile memory may be through the NV-RAM manager 229 via a defined API. During execution of the gaming machine software 100, the non-volatile manager 229 may receive access requests via the event manager 262 from other processes, including a resource partition manager 256, a game manager 221, an ECI process 226, and one or more device interfaces 255 to store or retrieve data in the physical non-volatile memory space. Other software units that request to read, write, or query blocks of memory in the non-volatile memory are referred to as clients.

The device interfaces 255, including a key pad 235, a display 237, a card reader 245, a coin acceptor 251, a bill validator 243, and a touch screen 241, are software units that provide an interface between the device drivers and the gaming processes active on the gaming machine. The device interfaces 255 may receive commands from virtual gaming peripherals requesting an operation for one of the physical devices. For example, in one context, the player tracking ECI process 226 may send a command to the display interface 237 requesting that a message of some type be displayed on the display 34. The display interface 237 sends the message to the device driver for the display 34. The device driver for the display communicates the command and message to the display 34 enabling the display 34 to display the message. When the display 34 may be controlled by more than one gaming process (e.g., the game manager 221 may use the display 34 to present the game of chance), the device scheduler 258 or a similar process may assign a priority to the context generated by the player tracking ECI process 226 and grant control of the display 34 to the context depending on whether the display 34 is currently in use. If the display 34 is in use, the device scheduler 258 may determine whether the current context using the device should be switched out for the context generated by the player tracking ECI process 226.

The device interfaces 255 also receive events from the physical devices. In general, events may be received by the device interfaces 255 by polling or direct communication. The solid black arrows indicate event paths between the various software units. Using polling, the device interfaces 255 regularly communicate with the physical devices 105 via the device drivers 259 requesting whether an event has occurred or not. Typically, the device drivers 259 do not perform any high level event handling. For example, using polling, the card reader 245 device interface may regularly send a message to the card reader physical device 24 asking whether a card has been inserted into the card reader.

Using direct communication, an interrupt or signal indicating an event has occurred, may be sent to the device interfaces 255 via the device drivers 259 when the physical devices need to communicate information. For example, when a card is inserted into the card reader, the card reader 24 may send a "card-in message" to the device interface for the card reader 245 indicating a card has been inserted which may be posted to the event manager 262. The card-in message may be an event. Other examples of events which may be received from one of the physical devices 105 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot, 13) Abandoned card, and 14) touch screen activated.

Typically, the event may be an encapsulated information packet of some type posted by the device interface. The event has a "source" and one or more "destinations." Each event contains a standard header with additional information attached to the header. The additional information may be typically used in some manner at the destination for the event.

As an example, the source of the card-in game event may be the card reader 24. The destinations for the card-in game event may be a bank manager (not shown), which manages credit transfers to the gaming machine, the communication manager 223, and the player tracking ECI 226. The communication manager 223 may communicate information read from the card to one or more devices located outside the gaming machine, such as a remote host. When the magnetic striped card is used to deposit credits into the gaming machine, the bank manager may prompt the card reader 24 via the card reader device interface 255 to perform additional operations. When the magnetic striped card is used to initiate a player tracking session, the player tracking ECI 226 or a remote host may prompt the card reader 24 via the card reader device interface 255 to perform additional operations related to player tracking Since multiple contexts may be applied to the card-in event, a device scheduler, such as 258, may be used to determine which context is granted control of the gaming device. For example, the device scheduler 258 may grant control of the card reader to either bank manager 222, the ECI 226 or the remote host (not shown).

An event may be created when an input is detected by one of the device interfaces 255. Events may also be created by one process and sent to another process. For example, when the device scheduler 258 grants control of one shared gaming device to a context, an event may be generated. Further, as previously described, events may also be generated from entities located outside the gaming machine. For example, a remote host may send an event to the gaming machine, via the communication manager 223. The events may be distributed to one or more destinations via a queued delivery system using the event distribution software process 225. However, since the game events may be distributed to more than one destination, or simply broadcast to the processes executing, the events differ from a device command or a device signal which is typically a point to point communication such as a function call within a program or inter-process communication between processes.

Since the source of the event, which may be a device interface or a remote host outside of the gaming machine, is not usually directly connected to destination of the event, the event manager 262 acts as an interface between the source and the one or more event destinations. After the source posts the event, the source returns back to performing its intended function. For example, the source may be a device interface polling a hardware device. The event manager 262 processes the game event posted by the source and places the game event in one or more queues for delivery. The event manager 262 may prioritize each event and place it in a different queue depending on the priority assigned to the event. For example, critical game events may be placed in a list with a number of critical game transactions stored in the NV-RAM as part of a state in a state-based transaction system executed on the gaming machine.

After the event manager receives an event, the event may be sent to event distribution 225 in the gaming system 213. Event distribution 225 broadcasts the event to the destination software units that may operate on the event. The operations on the events may trigger one or more access requests to the NV-RAM via the NV-RAM manager 229. Further, when one or more software units may request control of a shared gaming device in response to the event, then a device scheduler, such as 258, may be used to arbitrate the request.

As another example of event processing, when a player enters a bill into the gaming machine using the bill validator 30, this event may arrive at the bank manager after the event has passed through the device drivers 259, the bill validator device interface 240, the event manager 262, and the event distribution 225 where information regarding the event such as the bill denomination may be sent to the NV-RAM manager 229 by the event manager 262. After receiving the event, the bank manager evaluates the event and determines whether a response is required to the event. For example, the bank manager 222 may decide to increment the amount of credits on the machine according to the bill denomination entered into the bill validator 30. Further, the bank manager 222 may request control of the bill validator. When the bill validator 30 is a shared gaming device, the device scheduler 258 may arbitrate the request to use the bill validator 30. Thus, one function of the bank manager software and other software units that are executed as processes on the gaming machine may be as an event evaluator.

More generally, in response to the event, the bank manager or other processes on the gaming machine may 1) generate a new event and post it to the event manager 262, 2) send a command to the device interfaces 255, 3) send a command or information to the remote host via the communication manager using one of the communication protocols, 4) do nothing, or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 262 and then to the NV-RAM manager 229. The polling may require translation of messages from the accounting server or the wide area progressive server using communication protocol translators 211 residing on the gaming machine.

The communication protocols typically translate information from one communication format to another communication format. For example, a gaming machine may utilize one communication format while a remote host providing ECI services may utilize a second communication format. The communication protocols 211 may translate the information from one communication format to another, enabling information to be sent and received from the server.

The power hit detection process 229 monitors the gaming machine for power fluctuations. The power hit detection process 229 may be stored in a memory different from the memory storing the rest of the gaming machine software 103. When the power hit detection software 229 detects that a power failure of some type may be imminent, an event may be sent to the event manger 230 indicating a power failure has occurred. This event may be posted to the event distribution software 225, which broadcasts the message to all of the processes and devices within the gaming machine that may be affected by a power failure. If time is available, the event may also be sent to processes executing on a remote host.

Device interfaces 255 are utilized with the gaming machine software 213 so that changes in the device driver software do not affect the gaming system software 213 or even the device interface software 255. For example, the gaming events and commands that each physical device 105 sends and receives may be standardized so that all the physical devices 105 send and receive the same commands and the same gaming events. Thus, when one of the physical devices 105 is replaced, a new device driver 259 may be required to communicate with the physical device. However, device interfaces 255 and gaming machine system software 213 remain unchanged. When the new physical device requires a different amount of NV-RAM from the old physical device, an advantage of the NV-RAM manager 229 may be that the new space may be easily allocated in the non-volatile memory without reinitializing the NV-RAM. Thus, the physical devices 105 utilized for player tracking services may be easily exchanged or upgraded with minimal software modifications.

The various software elements described herein (e.g., the device drivers, device interfaces, communication protocols, etc.) may be implemented as software objects or other executable blocks of code or script. In a preferred embodiment, the elements are implemented as C++ objects. The event manager, event distribution, software player tracking unit, and other gaming system 213 software may also by implemented as C++ objects. Each are compiled as individual processes and communicate via events and/or interprocess communication (IPC). Event formats and IPC formats may be defined as part of one or more Application Program Interfaces (APIs) used on the gaming machine. This method of implementation is compatible with the QNX operating system.

The operating system and its components have been described in the context of a gaming machine. A master gaming controller 46 on the gaming machine may include the operating system (see at least FIG. 6). Other embodiments may not be so limited. Gaming processes may also be activated by operating systems executed by logic devices different from the master gaming controller on the gaming machine. For instance, a gaming peripheral, such as a player tracking unit mounted to a gaming machine, may include a logic device that executes an operating system. The operating system on the gaming peripheral may be the same or different from the operating system executing on the master gaming controller on the gaming machine.

The gaming peripheral may comprise one or more gaming devices. Like the gaming machine activating a process that controls gaming devices located on the gaming peripheral, the logic device on the gaming peripheral may activate processes that control gaming devices located on the gaming peripheral and the gaming machine. Further, like the gaming machine, the gaming machine may execute ECI processes under control of a remote host. In another embodiment, the gaming peripheral may act as a remote host to an ECI process executed on the gaming machine. For instance, a player tracking unit coupled to the gaming machine may act as the remote host for the player tracking ECI process 226 executed on the gaming machine. In yet another embodiment, the gaming machine may act as a remote host to an ECI process executing on another gaming device, such as another gaming machine.

Remote Host-Gaming Machine Interaction

Figure 4A:
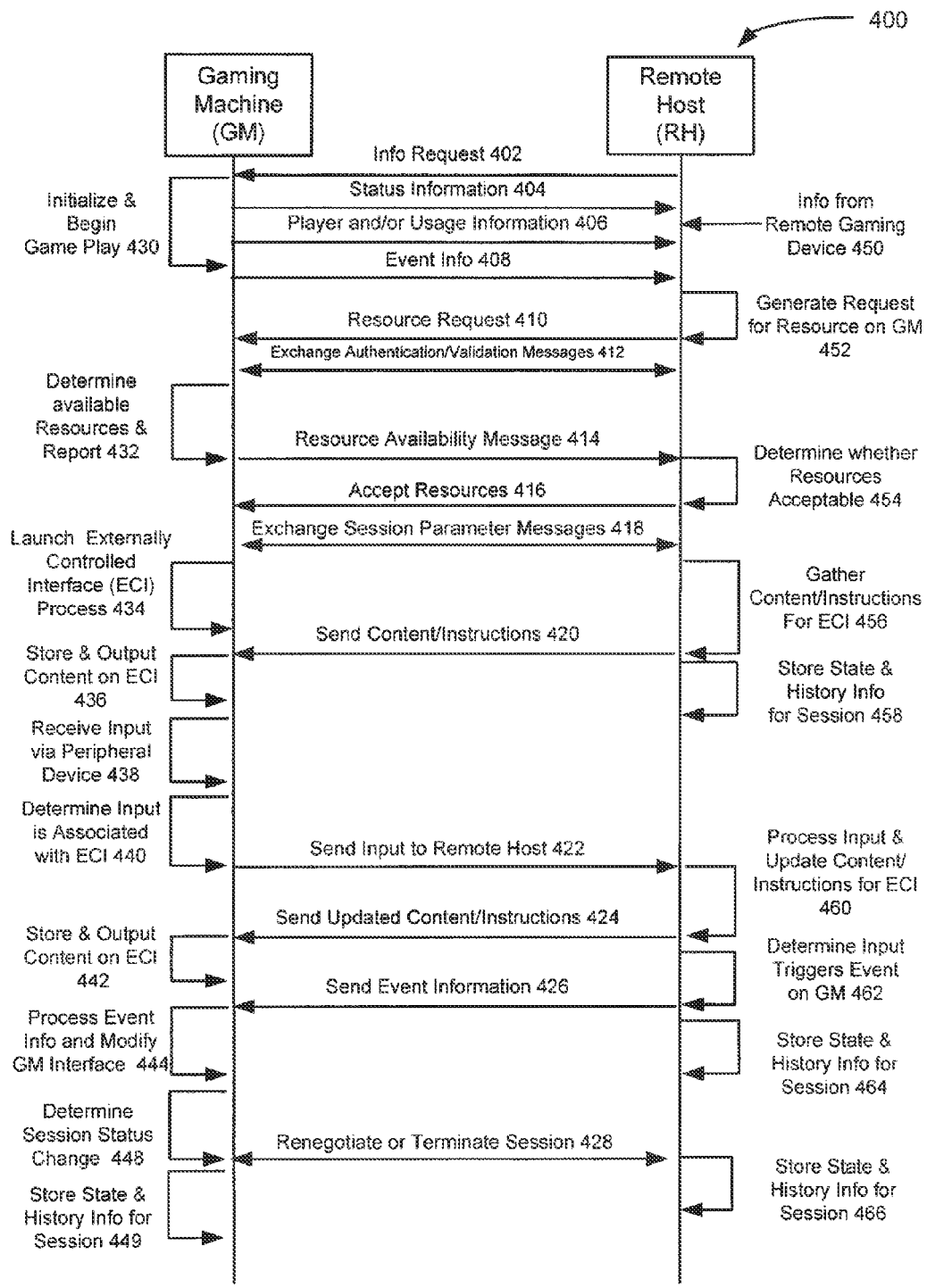
FIG. 4A is an interaction diagram between a host and gaming machine for at least one embodiment.

FIG. 4A is an interaction diagram 400 between a host and gaming machine for at least one embodiment. The gaming machine may be operable to provide access to resources that may be controlled by the remote host as part of an ECI described above with at least respect to FIGS. 1A to 3C. In 430, the gaming machine powers up and becomes available for game play. At some time, the gaming machine may establish a relationship with a remote host. For example, in one embodiment, as part of an initialization phase on the gaming machine, a communication link may be established between gaming machine and the remote host. When a communication link is established between the gaming machine and the remote host, the gaming machine and remote host may exchange authentication/validation messages 412 that enable both the gaming machine and the remote host to determine that the communications are from a valid source. This process may utilize methods known in the art, such as exchanging information encrypted or signed with public and private key pairs.

After a communication link is established between the remote host and the gaming machine, information may be exchanged between the devices that may be used to determine when to trigger an instantiation of an ECI on the gaming machine. In different embodiments, information requests may be initiated by remote host in 402 or may be initiated by the gaming machine. The information requests may be event driven, may occur at regular intervals as a result of polling messages initiated at the host, or they may occur according to an agreed upon schedule or combinations thereof.

Different types of information needed to determine when to instantiate an ECI may be communicated. For instance, in 404, the gaming machine may send status information regarding its current status, such as idle or active, to the remote host. As another example, in 406, the gaming machine may send player and/or usage information, such as coin-in and coin-out, to the remote host. In yet another example, the event information, such as a request for a game service on the gaming machine, may be sent to the remote host that triggers a launch of the ECI.

In particular embodiment, the remote host may receive useful information indirectly. For example, a player tracking session may be initiated on the gaming machine that causes a communication link to be established between the gaming machine and a player tracking server. In response, the gaming machine may send information indicating that a player tracking session has been initiated. In response, the remote host may contact the player tracking server and, in 450, receive information from the player tracking server, which is an example of remote gaming device. In another embodiment, after a communication link may be established with the gaming machine, the player tracking server may automatically contact the remote host and send information to the remote host in 450.

The information received from the player tracking server may be used to determine whether to launch an ECI on the gaming machine. Further, when the ECI is launched, the information received from the player tracking server and/or the gaming machine may be used to customize the content output by the ECI on the gaming machine. For example, the content may be customized according to known player preferences. In another example, the content may be customized according to a status of the player, which may be determined from their game play history. Further, the player tracking server may send or the remote host may store operator preferences regarding content or promotions that the operator wants to output via the ECI. The operator preferences may also be used to customize the ECI on the gaming machine.

In another embodiment, the gaming machine may send information to servers in which it does not have an established formal communication relationship. For example, when the gaming machine is idle, the gaming machine may broadcast its status to one or more remote hosts on a local area network. In response to the broadcast, one or more remote hosts may determine that they wish to output content on the gaming machine during the idle period and contact the gaming machine. In 402, the remote hosts may contact the gaming machines to request additional information, which may be publicly available to devices on the network or, in 410, the remote host may initiate a resource request 410 for control of resources on the gaming machine. Prior to exchanging information regarding parameters of the resource request, such as a status of resources that may be available for control by the remote host in 414, the gaming machine and remote host may exchange information used by each device for authentication and validation purposes. Further details of interactions between the remote host and the gaming machine are described in the figure for at least one embodiment.

In 454, the remote host may evaluate the resource limitations provided by the gaming machine and determine whether it can provide content that is suitable for the resource limitations available on the gaming machine. When the remote host determines the resource limitations are acceptable, in 416, it may send a message indicating it wishes to initiate a session between the remote host and the gaming machine.

In 418, after receiving this message, the remote host and the gaming machine may exchange one or more session parameter messages including information such as a time stamp, clock information so that their clocks may be synchronized, device identification etc. In one embodiment, the information in the one or more session parameter messages may be utilized to identify state information stored on the remote host pertaining to the session between the remote host and the gaming machine in a manner that allows the state of the gaming machine and the state of an ECI generally corresponding to the state of gaming at a particular time or during a particular event to be determined.

After a session between the gaming machine and the host is initiated, in 434, the gaming machine may load and execute an ECI process if it is not already executing and begin communication gaming machine transaction information to the remote host. The gaming machine transaction information may include information regarding a state of a game played on the game, player identification information, money handling information, etc. The gaming machine transaction information received from the gaming machine may dynamically affect the content the remote host sends to the gaming machine. Examples of gaming transaction information that may be transmitted are described in the G2S protocol approved by the Gaming Standards Association (Fremont, Calif.) although at least one embodiment described herein is not limited to communicating the information described in the protocol or in the format described by the protocol.

In particular embodiments, the remote host may be simultaneously in sessions with a plurality of gaming machines where each gaming machine is receiving content that is being dynamically adjusted by the remote host based on information received from the gaming machines, i.e., the content is customized for the particular game state of each gaming machine. Further, the remote host may be operable to customize content based upon a "group" state. In a group state, information received from a group of gaming machine may be combined to define a state of the group. The remote host may be operable to dynamically adjust content sent to one or more gaming machines in a group based upon a group state. Thus, at a particular time, the content sent from the remote host to the gaming machine may be 1) affected by the state of the gaming machine, 2) unaffected by the state of the gaming machine, 3) affected by the state of a group of gaming machine, 4) unaffected by the state of the group of gaming machines, 5) affected by the state of another gaming machine (e.g., in a tournament situation, the remote host may adjust its content to reflect that another, different gaming machine has won the tournament or another gaming machine has won a particular jackpot), 6) unaffected by the state of another gaming machine, or 7) combinations thereof.

In the preceding paragraph, a gaming machine to which the remote host is sending content may or may not provide information that affects a particular group state at a given time. For example, the remote host or another host may provide a progressive game with a progressive jackpot to a group of gaming machines. The gaming machine to which the remote host is sending content may be operable to play the progressive game but may not be currently participating in the progressive game at a particular time and thus not contributing to the jackpot, which in this example is one indicator of the group state of the gaming machine in the group. When the progressive jackpot reaches a certain level, the remote host may send information to the gaming machine to indicate that the jackpot has reached a certain threshold to entice a player on the gaming machine to join the progressive game. Thus, the remote host may dynamically adjust content sent to the gaming machine based upon a group state for a group of gaming machines that the gaming machine is currently not affecting.

In 456, the remote host may select its initial content to send to the gaming machine, including commands, instructions, and/or data that are already stored on the remote host to the gaming machine in 420. If needed, the remote host may generate all or a portion of the content to send to the gaming machine in real time. In a particular embodiment, the gaming machine may store content from previous interactions with the remote host or other remote hosts that were used by an ECI. In this case, the gaming machine may be operable to gather information on content stored on the gaming machine and send it to the remote host. The gaming machine or the remote host may initiate this interaction. If the gaming machine is storing content that is useful to the remote host, such as content it may need to send to the gaming machine in the absence of its presence on the gaming machine, the remote host may be operable to send only needed content without reduplicating the content it may use that is already stored on the gaming machine In 458, the remote host may store information regarding the state it is controlling on the ECI, which may be affected by the content it is sending. In 436, the gaming machine may store and/or output content via the ECI. In 438, the gaming machine may receive input from a peripheral device, such as a touch screen sensor or generate information that may affect the content provided by the remote host. In 440, the gaming machine may determine that this information is of interest to the remote host and/or to the ECI. In one embodiment, the information may be routed to the ECI for additional processing, which may then send the information to the remote host or in 422, the gaming machine send the information directly to remote host.

In 460, the remote host may process the information received from the gaming machine and send new content including commands, instructions and/or data to the gaming machine in 424. In 442, the gaming machine may store and/or output the new content via the ECI. In 462, the remote host determines that an event has been triggered, which may be related to the content it has sent in 424. For example, the event may be the award of a 2 times bonus and the content it sent in 424 may be a presentation for this award. Thus, in 426, event information may be sent to the gaming machine, such as instructions, to the master gaming controller to double an award for the current game and update the credit meter accordingly.

In 444, in response to the event information, the gaming machine may modify the gaming machine interface. For example, in the case of the 2 times bonus award described in the previous paragraph, the gaming machine may present a credit meter scrolling up in response to the award.

In 448, the gaming machine may determine that an event has occurred that may affect a status of the session. For instance, the gaming machine may have received a cash out command, a player may withdraw a player tracking card, the gaming machine may have reached zero credits, the gaming machine may have been idle for a period, the gaming machine may have received a request for resources from another remote host wishing to provide an ECI, the gaming machine may have received an input signal indicating a desire to close a window associate with the ECI provided by the remote, a malfunction may have occurred on the gaming machine, a tilt condition may have occurred on the gaming machine, and/or the resources available on the gaming machine may have changed.

In response to the particular event, in 428, the gaming machine may renegotiate or terminate the session. For example, when the gaming machine has been idle for a period, the gaming machine may terminate the current session with the host or the gaming machine may renegotiate the session parameters, such as to provide an attract feature on an ECI associated with the remote host. In 449 and 466, the gaming machine and the remote host may each respectively store state information, such as information indicating the session was terminated or was renegotiated.

The interaction diagram was provided for illustrative purposes only and various embodiments described herein are not to be limited by the types of interactions or order of interactions described in FIG. 4. Accordingly, it should be appreciated that in one embodiment, the present disclosure provides a gaming device including a primary game operable upon a wager by a player, at least one display device, at least one input device, and at least one local processor. The master gaming machine controller may be programmed to operate a remote host to enable the player to wager on a play of the primary game, generate or receive a primary game outcome for the play of the primary game, cause part of the display device to display the play of the primary game, and receive at least one request from the remote host to provide at least one remote controlled process on the display device. If at least one request to provide the remote controlled process is received, the local processor may be programmed to determine an availability of at least one gaming device resource. If the gaming device resource is available, the local processor may be programmed to accept the request to provide the remote controlled process; and enable the remote host to cause a portion of the display device to display the remote controlled process, wherein the remote controlled process will not affect the integrity of the play of the primary game and the remote controlled process may be displayed simultaneously with the play of the primary game and generated concurrently by the master gaming controller on the gaming machine. If the gaming device resource is not available, the local processor may be programmed to reject the request to provide the remote controlled process. It should be appreciated that maintaining the integrity of the play of the primary game includes, but is not limited to: ensuring that the game play speed of the primary game remains the same or substantially the same, ensuring that the quality of graphics of the primary game remains the same or substantially the same, ensuring that the quality of the audio of the primary game remains the same or substantially the same, ensuring that no corrupt images are displayed in association with the play of the primary game, ensuring that the correct outcomes are provided to the player in association with the play of the primary game, and/or ensuring that the functionality of the primary game remains the same or substantially the same.

In one such embodiment, if the externally controlled process is authorized by the master gaming controller, then the externally controlled process may provide (a) one or more services to the player; (b) one or more enhanced functions or features of the gaming machine to the player; (c) one or more outcomes to a player; or (d) a combination of such services, functions and outcomes to a player, wherein the externally controlled process is based, at least in part, on one or more aspects of the locally controlled games. In other embodiments, if the externally controlled process is authorized by the master gaming controller, then independent of the locally controlled games, the externally controlled process may provide (a) one or more services to the player; (b) one or more enhanced functions or features of the gaming machine to the player; (c) one or more outcomes to a player; or (d) a combination of such services, functions and outcomes to a player.

In one embodiment, the services provided to the player via the externally controlled process may include, but are not limited to one or more of the following (and/or combinations thereof):

- enabling a player to order food, drinks or coffee from the gaming machine (possibly to be delivered to the player at the gaming machine);
- enabling a player at a gaming machine to communicate with a person at another gaming machine;
- enabling a person at a gaming machine to communicate with a gaming establishment concierge,
- enabling a player to learn information about various hotels, gaming establishments, restaurants, entertainment and/or travel services;
- enabling a player to make reservations, such as at a restaurant or for an event, from the gaming machine;
- enabling a player to transfer funds or manage a monetary account from the gaming machine;
- enabling a player to purchase a lottery ticket at the gaming machine;
- enabling a player to obtain change at a gaming machine;
- enabling a player to make a wager on an event or other unknown outcome, such as a sporting event, to monitor events, to receive results and to cash out a winning event ticket at the gaming machine;
- enabling a player to send and receive electronic messages, such as e-mails, at the gaming machine;
- enabling a player to purchase various vending items at the gaming machine;
- enabling a player to access internet enabled services;
- enabling a player to check and redeem player tracking points for merchandise, entertainment or services;
- enabling a player to receive information related to upcoming tournaments or other gaming establishment promotions;
- enabling a player to watch television or a movie at the gaming machine;
- enabling a player to listen to music at the gaming machine;
- enabling a player to access the player's gaming establishment account;
- enabling a player to view promotions available to that player;
- etc.

In one embodiment, the enhanced functions or features of the gaming machine provided to the player via the externally controlled process include, but are not limited to one or more of the following (and/or combinations thereof):

- displaying information relating to one or more aspects of the player's gaming experience;
- providing personalized audio and/or video content at the gaming machine;
- enabling a player to pick a game to play from a plurality of available games;
- enabling a player to place one or more side-bets;
- enabling a player to play for one or more progressive awards;
- enabling a player to participate in a gaming tournament;
- providing a virtual ATM at the gaming machine;
- providing a virtual entertainment center at the gaming machine;
- providing a virtual lottery machine at the gaming machine;
- providing a virtual change machine at the gaming machine;
- providing a virtual sports book at the gaming machine;
- providing a virtual communication center at the gaming machine;
- providing a virtual concierge at the gaming machine;
- providing a virtual vending machine at the gaming machine;
- providing a virtual internet kiosk at the gaming machine;
- enabling a player to customize one or more aspects of the content displayed on the display device;
- enabling a player to customize one or more aspects of gaming machine interface;
- enabling a player to enroll in a player tracking system;
- enabling a player to play a plurality of games simultaneously or substantially simultaneously at the gaming machine;
- enabling a player to access personal settings at the gaming machine;
- enabling a player to access a score card of accomplished events (such as which poker game outcomes has the player obtained and which poker game outcomes has the player not yet obtained);
- enabling a player to access a tournament leader board;
- enabling a player to select a favorite type of award to play for;
- etc.

In one embodiment, the outcomes provided to the player via the externally controlled process may include, but are not limited to one or more of the following (and/or combinations thereof):

- a value;
- a modifier;
- an entry in an award drawing;
- an entry in a tournament;
- an additional player tracking point;
- a session surprise award;
- a modifier of any primary game awards for a set amount of time;
- a number of free or discounted spins or activations of a game;
- a prize;
- a progressive award;
- a retrigger to be utilized in a game;
- a wild symbol to be utilized in a game;
- an anti-terminator to be utilized in a game;
- a bonus or secondary game;
- a nudge of one or more reels in a reel game;
- a hold of one or more reels in a reel game;
- a scatter type pay;
- one or more additional paylines in a reel game;
- one or more additional ways to win in a reel game;
- one or more additional ways to trigger a secondary game;
- one or more available promotions;
- one or more surveys;
- one or more non-redeemable credits;
- etc.

Figure 4B:
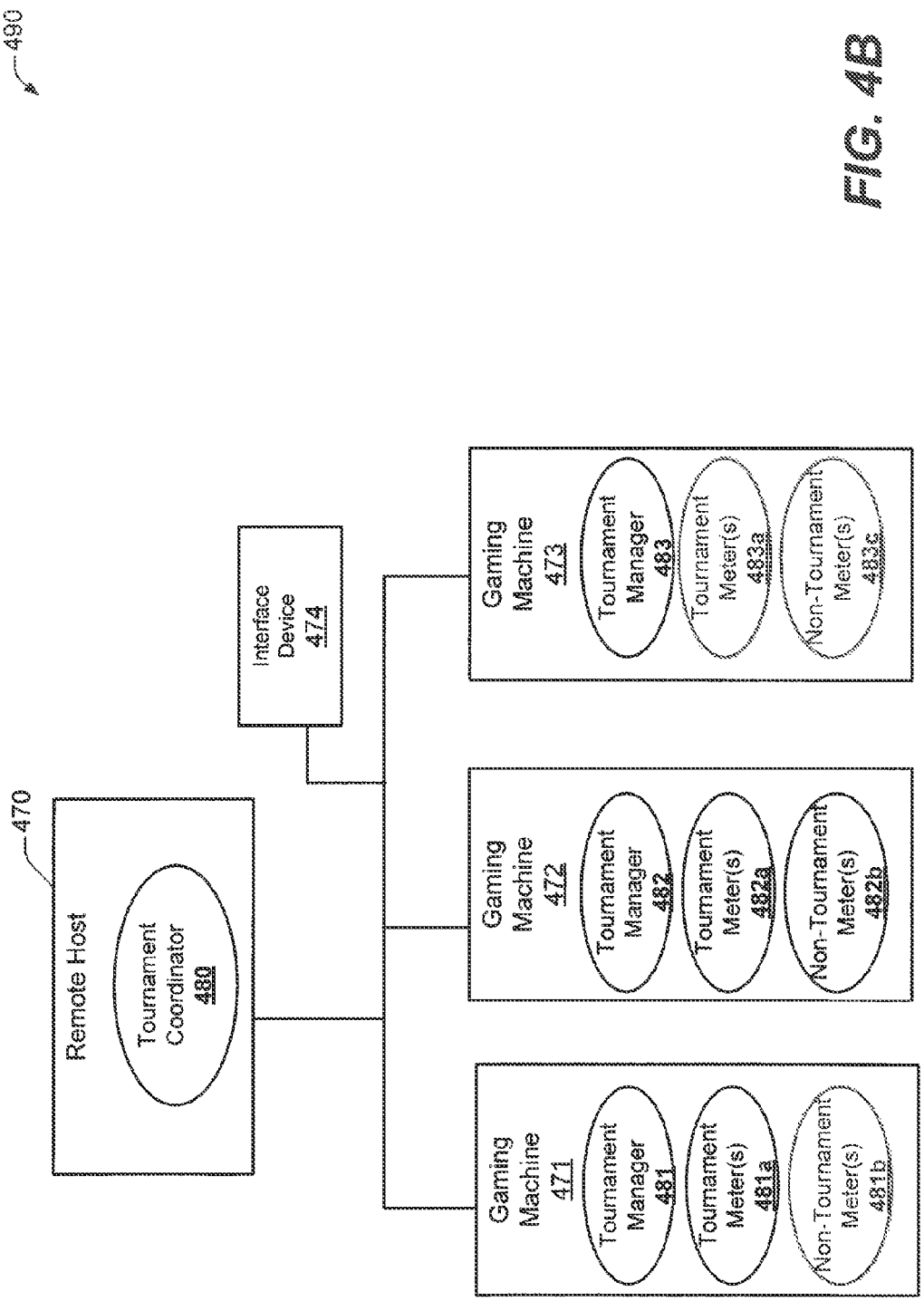
FIG. 4B is a block diagram of an example of a portion of a gaming system 490 which may be used for implementing tournament play.

FIG. 4B is a block diagram of an example of a portion of a gaming system 490 which may be used for implementing tournament play. In the example of FIG. 4B, gaming system 490 may include a plurality of gaming machines (e.g., 471, 472, 473), at least one interface device 474, and at least one remote host 470. In at least one embodiment, at least a portion of the gaming machines, interface device(s), and remote host(s) may be networked together to enable tournament game play among the various gaming machines. For illustrative purposes, 3 gaming machines are illustrated in the example of FIG. 4B. However, it will be appreciated that in other embodiments, any desired number of gaming machines may be network together for enabling tournament game play.

In at least one embodiment, the remote host 470 may be externally controlled interface (ECI) enabled, and connected to a plurality of gaming machines, 471, 472 and 473, which may also be ECI enabled. The remote host may also be connected to and operable to control a plurality of interface devices, such as 474. For instance, the remote host 470 may be operable to control overhead signage or other types of display devices near a bank of gaming machines to complement the content provide by an ECI on the gaming machines. In other embodiments, all (or at least a portion) of the gaming machines, remote host(s) and/or interface devices may not be ECI enabled, and may still be configured or designed to participate in tournament game play.

In particular embodiments, the gaming machines, 470, 471, 472, may be located proximate to one another, such as in a bank of gaming machines, at different locations in a gaming establishment or even located in different gaming establishments at different locations. In at least some embodiments, player stations (such as those available at table games) and/or signage near table games may also be ECI enabled such that utilization by the remote is allowed. Thus, in a particular embodiment, the remote host may be operable to provide ECI enabled services to players at table games and gaming machines, including shared games, that involve a mixture of players at table games and gaming machines, such as slot machines.

The remote host 470 via an ECI on each of the gaming machines may be able to coordinate content on two or more gaming machines, such as two or more of 472, 473 and 473. For instance, if two or more gaming machines share a similar theme it may be desirable to coordinate content on the two machines, such that a theme is matched. In another example, if two of more gaming machines are located in a similar location, where advertising or merchandising for a particular product or service is desirable, then the advertising or the merchandising on similarly located gaming machines may be coordinated, i.e., receive related content. In general, any content or activity that is described in relation to a single gaming device herein may be extended in a coordinated or targeted manner to a group of gaming devices.

In another embodiment, content on groups of gaming machines may be coordinated according to characteristics of the players at a group of gaming machines. For instance, the remote host may enable a group of friends and/or family to communicate with one another and play a shared game with their group while playing games on different gaming devices. For instance, the group may play a tournament game or a bonus game with each other. As another example, the remote host may provide ECIs that allow the group to receive related content that is of interest to the group, such as a notification for the group or a part of the group that a dinner reservation or some other activity is about to start.

In general, the players in a group may share some common interest and are not limited to being known to each other. When players have provided preference information in regards to preferences towards gaming activities and/or a gaming establishment has collected information in regards to a player's interests and gaming activities, then the remote host may provide content that is targeted toward a group of players with similar interests. As an example, when a group of players is playing on gaming devices that are ECI enabled and a subset of the group has shown an interest in tournament games, such as past participation in tournament games, then the remote host may only send tournament information to the subset of the group that it has determined may be interested in tournament games.

In another embodiment, the remote 470 may coordinate groups of ECIs to generate coordinated effects that span multiple gaming machines. For instance, gaming machines 471, 472 and 473 may be collocated (e.g., side-by-side), video displays on gaming machines 471, 472 and 473 may be utilized in a manner such that video content on the displays appears to span multiple gaming machines. For instance, a graphic may appear to move from a first gaming machine to a second gaming machine to a third gaming machine, in a sequential fashion, under control of the remote host via a ECIs on each gaming machine. If a peripheral interface device 474, such as an overhead sign, is employed, then the remote host may be also operable to move the graphic from the overhead sign to the gaming machines and vice versa.

In another example, the remote host may coordinate content on a group of gaming machines to provide an activity, such as a shared bonus game or a tournament. In this example, this example, the remote host may both coordinate and customize content. For instance, a tournament may involve a group of players playing a common game provided under control of ECIs receiving information from the remote host. Although a game with the same rules may be played by each player, the remote host may be operable to allow each player to customize content of the ECI, such as allowing each player to select a preferred type of game for the ECI-based tournament.

In yet other embodiments, coordinated and customized content may be generated simultaneously on a group of gaming machines. For instance, in the example in the preceding paragraph, the gaming machines may include primary and secondary displays that may each be utilized in conjunction with an ECI. On each of the primary displays, the remote host may affect the content via ECIs such that it varies with events (e.g., a particular player being identified or a particular game play event occurring, etc.). Thus, the content that is affected by the remote host may be different on each gaming machine. In conjunction to the ECIs provided on the primary displays, the remote host may control ECIs on each of the secondary displays to provide a shared bonus game played on each gaming machine. Thus, the remote host coordinates the content via the ECIs on the secondary displays to provide a shared bonus game. In this example, the gaming machines may be proximate to one another or at widely varying locations.

In the example in the preceding paragraph, the activities on one of the gaming machines participating in the shared bonus game may affect the content provided via the ECIs on the other gaming machines participating in the shared bonus game. For instance, the gaming machines, 471, 472 and 473, may all provide slot games where an outcome occurring on only one of the slot games may be communicated to the remote host 470. In response to this outcome, the content for the bonus game provided on each of the gaming machines may altered in some manner.

As illustrated in the example of FIG. 4B, each of the gaming machines 471, 472, 473 includes a respective tournament manager (e.g., 481, 482, 483) which is operable to facilitate its host gaming machine to participate in tournament game play activities and/or other tournament related activities. In at least one embodiment, at least some of the tournament managers 481, 482, 483 may be configured or designed to include at least a portion of functionalities similar to that described, for example, with respect to tournament manager 291 of FIG.

3C. Thus, for example, in at least some embodiments, the tournament manager (e.g., 481) associated with a particular gaming machine (e.g., 471) may be operable exert control over other selected processes running at that gaming machine in order, for example, to create a "tournament mode" which is transparent to the games (and/or game code) running at the gaming machine, and which allows such games to participate in tournament mode gaming activities without requiring modification of game code in order to enable such games to participate in tournament mode gaming activities. In some embodiments, a separate instance of a tournament manager may be associated with each gaming machine in the gaming system in order to facilitate its associated gaming machine to participate in tournament game play activities and/or other tournament related activities. In other embodiments, a given tournament manager may be associated with multiple gaming machines in the gaming system in order to facilitate its associated gaming machines to participate in tournament game play activities and/or other tournament related activities. Further, in at least some embodiments, a tournament manager associated with a selected gaming machine may reside locally at that gaming machine, while in other embodiments, the tournament manager associated with the selected gaming machine may reside at a remote system, which may be external to the gaming machine.

As illustrated in the example of FIG. 4B, each of the gaming machines 471, 472, 473 may also include one or more respective tournament meters (e.g., 481*a*, 482*a*, 483*a*). According to different embodiments, the tournament meters may be implemented via hardware, software and/or some combination thereof. Additionally, as illustrated in the example of FIG. 4B, each of the gaming machines 471, 472, 473 may also include one or more respective non-tournament meters (e.g., 481*b*, 482*b*, 483*b*). According to different embodiments, the non-tournament meters may be implemented via hardware, software and/or some combination thereof. In one embodiment, a gaming machine may include at least one meter which may be operable for use as both a non-tournament meter (e.g., during non-tournament enabled modes of operation at the gaming machine) and a tournament meter (e.g., during tournament-enabled modes of operation at the gaming machine). In other embodiments, a gaming machine may include separate tournament meters and non-tournament meters. Further, in at least one embodiment, at least a portion of the tournament meters and/or non-tournament meters of each gaming machine may be configured or designed as "smart meters" or "intelligent meters" which are capable of making decisions whether to accept and/or deny meter state change requests based on various criteria. In one embodiment, a separate modifier class may be used to change the state of selected meters at the gaming machine, and/or may be used to accept and/or deny meter state change requests.

In at least one embodiment, one or more of the remote hosts (e.g., 470) may include a tournament coordinator (e.g., 480) which may be operable to coordinate, manage, and/or control various types of tournament related activities, events and/or information which may occur at the gaming system 490. For example, in one embodiment, tournament coordinator 480 may be operable to manage and/or generate tournament game play statistics associated with an active tournament gaming session involving gaming machines 471, 472 and 473. In one embodiment, the tournament coordinator 480 may also be operable to control the display of tournament related activities, events, and/or information, which, for example, may be displayed on a remote display such as, for example, a display or marquee located at interface device 474. According to specific embodiments, tournament coordinator 480 may be operable to include other functionality such as, for example, one or more of the following (or combinations thereof):

provide updated player tracking information (e.g., related to tournament play) to a player tracking system;

organize new tournaments based on winners/losers, etc. from previous tournaments;

organize new tournaments based on player tracking information (e.g., played games, accumulated points, etc);

designate which machines will and/or will not be allowed to participate in tournaments;

create tournament "bonusing" features (e.g., related to more time/credits, better paytable, etc.) for selected players based on various criteria (such as, for example, player tracking info, etc.);

create and/or manage interstate/inter-casino managed tournaments;

create and/or manage tournaments in which all players use a common same paytable;

create and/or manage tournaments in which players can use different paytables and/or themes;

manage tournament information such as, for example, current tournament credits, wins, and or play time associated with selected gaming machines;

display selected tournament information one or more external displays (e.g., thereby eliminating the need for individual machines to be responsible for displaying this information);

display selected tournament information on the individual machine's display/displays using ECIs (e.g., thereby eliminating the need for individual machines to be responsible for displaying this information);

etc.

Figure 5A:
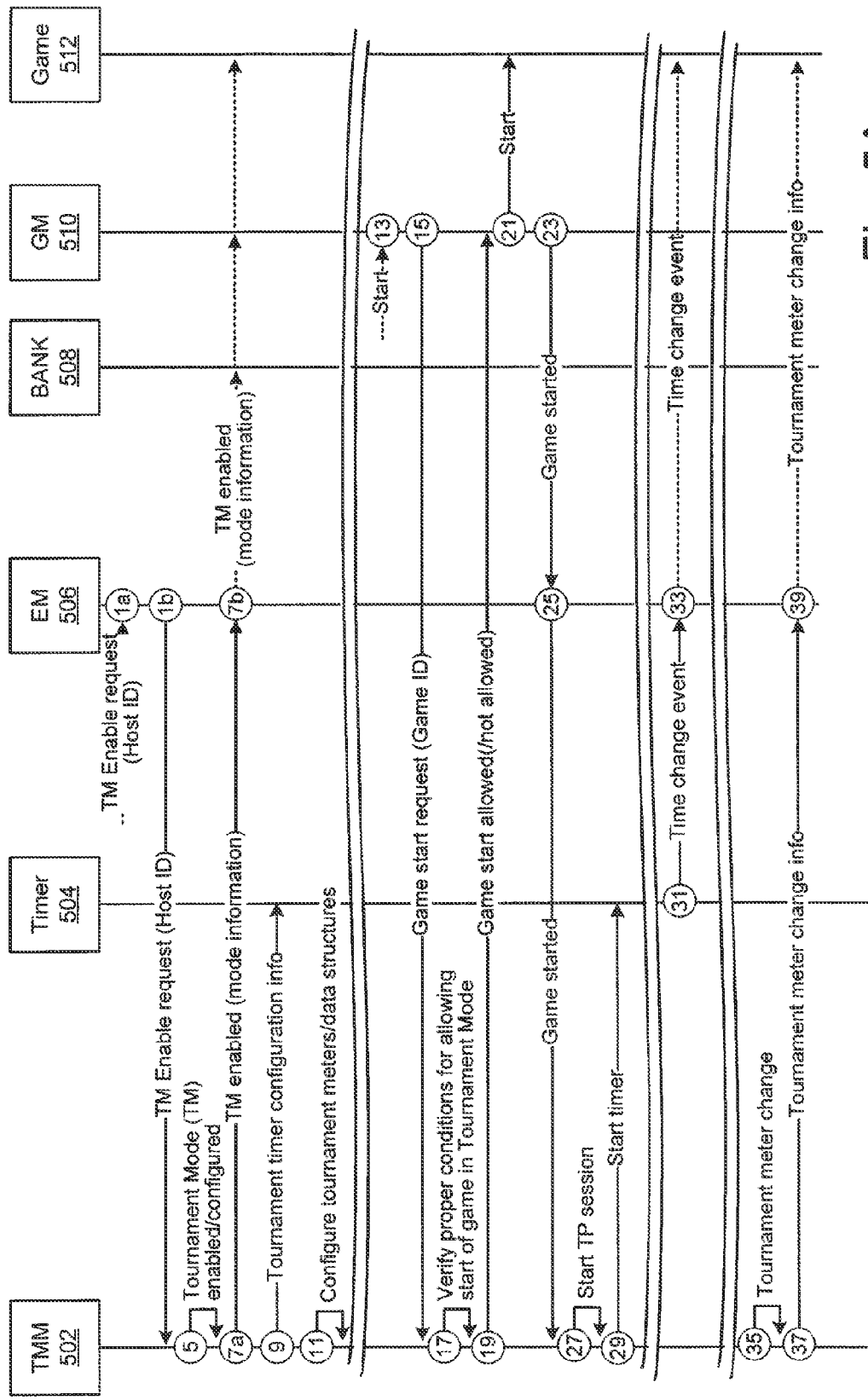
FIGS. 5A and 5B show example embodiments of interaction diagrams, illustrating various interactions which may take place among different processes, devices, and/or systems of a tournament-enabled gaming machine in accordance with a specific embodiment.
Figure 5B:
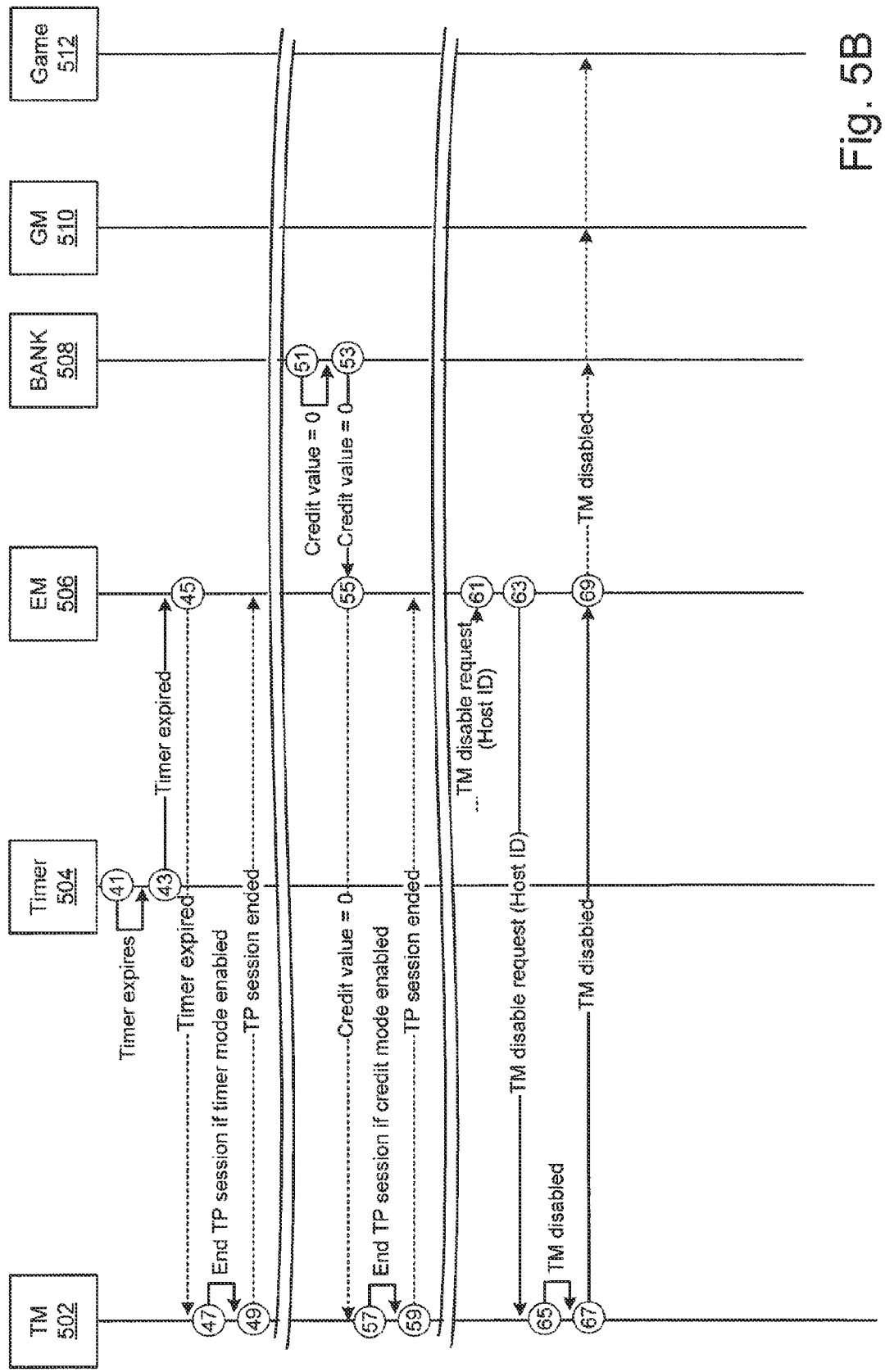

FIGS. 5A and 5B show a example embodiments of interaction diagrams, illustrating various interactions which may take place among different processes, devices, and/or systems of a tournament-enabled gaming machine in accordance with a specific embodiment.

In the example of FIGS. 5A and 5B, it is assumed that the tournament-enabled gaming machine includes a tournament manager (TMM) 502, a timer 504, an event manager 506, a bank manager 508, a game manager 510, and a game 502 (e.g., a wager-based game which is operable for play at the gaming machine). In at least one embodiment, the tournament manager may be remotely controlled via communications with the event manager.

In at least one embodiment, a process (e.g., a local process running at the gaming machine, or a remote process running at a remote system/device) may request that tournament mode be enabled at the gaming machine. For example, in one embodiment (as shown, for example, in FIG. 5A) a process may send (1*a*, 1*b*) a tournament mode enable request to the tournament manager via event manager 506. In at least one embodiment, the tournament mode enable request may include an identifier (e.g., Host ID) which may be used for determining the identity of the host for process which initiated or generated the tournament mode enable request.

In one embodiment, the tournament manager may be operable to store the Host ID associated with the tournament mode enable request, and may be operable to use the stored Host ID data during processing of subsequent requests (e.g., either from the same host or different hosts). For example, in one embodiment, the tournament manager may use the stored Host ID data to approve, deny, and/or block other tournament related requests from other hosts.

As shown at (5) the tournament manager 502 may process the tournament mode enable request, which, for example, may include determining whether conditions are proper for allowing/denying the tournament mode enable request. For example, in at least one embodiment, the tournament manager may be operable to deny the tournament mode enable request based upon the detection of one or more specific conditions and/or events, such as, for example, one or more of the following (or combinations thereof):

tournament mode currently enabled;
unrecognized or unauthorized Host ID;
network communication error detected;
current game still in progress (or not ended);
no tournament capable paytables detected;
selected player(s) not allowed to play in specified tournament(s);
etc.

In the example of FIG. 5A, it is assumed that conditions are proper for allowing tournament mode to be enabled at the gaming machine. Accordingly, as shown at (5), the tournament manager may enable tournament mode at the gaming machine. For example, in one embodiment, the tournament manager may enable (and/or disable) tournament mode at the gaming machine by changing or updating information in one or more fields of a data structure stored in the gaming machine memory. For example, in one embodiment, the gaming machine may include at least one data structure in shared memory (e.g., non-volatile RAM) of the gaming machine which includes at least one field (e.g., bit-field) used to indicate whether (or not) tournament mode is currently enabled at the gaming machine.

Additionally, in at least one embodiment, the tournament manager may configure the appropriate mode of tournament play. For example, in one embodiment, the tournament manager may post an event with the current tournament mode which includes tournament play mode information (e.g., via a bit-encoded data field) which may indicate one or more modes of tournament play which have been enabled. Examples of different modes of tournament play may include, but are not limited to, one or more of the following (or combinations thereof): credit mode, time mode, games mode (e.g., set number of games to play), etc. For example, in one embodiment, a bit-encoded data structure may be used to indicate one or more modes of tournament play, wherein a first bit of the data structure may be used to indicate whether tournament play time mode has been enabled/disabled, and wherein a second bit of the data structure may be used to indicate whether tournament play credit mode has been enabled/disabled. An example of such a data structure is illustrated in FIG. 9 of the drawings.

FIG. 9 shows an example embodiment of a tournament mode data structure 900 which may be used to indicate different modes of tournament play which have been enabled and/or disabled. In at least one embodiment, the tournament mode data structure may be stored in non-volatile memory such as, for example, in NV-RAM at the gaming machine.

In at least one embodiment, a first portion (e.g., 902) of the data structure may be populated with a value (e.g., Value C) which may be used to indicate whether a time mode of tournament play has been enabled/disabled. A second portion (e.g., 904) of the data structure may be populated with a value (e.g., Value D) which may be used to indicate whether a credit mode of tournament play has been enabled/disabled. For example, in one embodiment, data structure 900 may be implemented as a bit-encoded data field (e.g., comprising n bits) wherein the value of a second bit (e.g., 904) may be used to indicate whether a time mode of tournament play has been enabled/disabled. In other embodiments (not shown) at least one other portion of the tournament mode data structure may be populated with a value which may be used to indicate whether a "games mode" of tournament play has been enabled/disabled (e.g., wherein a player is permitted to play a fixed or predetermined number of games during the tournament session).

In at least one embodiment, a time mode of tournament play may include a time-based tournament session in which the ending of the tournament session (and/or the ending of tournament game play) is based upon a time-related event such as, for example: the expiration of a timer, a specified amount of time elapsing, a specified time value being reached, etc. Similarly, a credit mode of tournament play may include a credit-based tournament session in which the ending of the tournament session (and/or the ending of tournament game play) is based upon a credit-related event such as, for example, the current value of tournament credits available at the gaming machine being equal to (or less than) zero. In one embodiment, a games mode enabled session of tournament play may allow a player (e.g., at a given gaming machine) to play a maximum or predetermined number (n) of games (e.g., n=10) during the current tournament session. In one embodiment, the expiration of the games mode enabled tournament session may automatically occur when it is detected that the player has completed playing the allotted n games.

In at least one embodiment, credit and time mode of tournament play may be implemented as a combination of the credit and time modes. For example, in one embodiment, which ever expires first, credits or time, ends the current tournament session. In one embodiment, a time only mode of tournament play may occur when the time mode is enabled and the credit mode is disabled. Similarly, a credit only mode of tournament play may occur when the credit mode is enabled and the time mode is disabled.

A credit and time mode of tournament play may occur when both the time mode and credit mode are enabled during the same tournament session. According to one embodiment, this mode of tournament play may be referred to as time and credit mode. In at least one embodiment, the time and credit mode may be based on a combination of time only mode and credit only mode. Thus, for example, in one embodiment where time and credit mode is in effect, the end of a tournament play session (and/or end of an active tournament session) may occur upon the expiration of either time or credits, whichever occurs first.

According to different embodiments, different modes of tournament play may include, for example, a time only mode, a credit only mode, a games only mode, a credit and time mode, a credit and games mode, a time and games mode, a credit, time, and games modes, etc. In at least one embodiment, the tournament manager may determine the appropriate mode(s) of tournament play to enable/disable by accessing configuration information stored in memory at the gaming machine (and/or in memory at a remote system).

In at least one embodiment, information relating to the limitations and/or restrictions relating (e.g., time-based limitations, credit-based limitations, games-based limitations, etc.) to the duration of a given tournament play session may be stored at one or more other data structures in the gaming machine memory, such as for example, at least one data structure in the shared memory.

In at least one embodiment, the Tournament Manager may post events relating to the current mode of tournament play (e.g., time only mode, credit only mode, time and credit mode, games mode, etc.) which is in effect. In one embodiment, the Tournament Manager may access specific configuration data to determine the appropriate mode. In at least one embodiment, an event may be posted whenever the tournament mode is changed or updated.

Returning to the example of FIG. 5A, in at least one embodiment, the tournament manager may post (7*a*) a tournament mode enable event in order to notify (7*b*) (e.g., via event manager) other processes, devices and/or systems of the tournament mode enable event. According to specific embodiments, when a tournament mode enable event occurs at the gaming machine, different processes may be responsible for configuring various hardware and/or software components for tournament game play. For example, in one embodiment (e.g., where time mode is enabled), the tournament manager may be operable to configure (9) timer 504 to allow timer 504 to track the duration and/or expiration of a tournament session. In one embodiment, configuration of timer 504 may be implemented using tournament timer configuration information which, for example, may be stored in memory at the gaming machine (and/or in memory at a remote system). In at least some embodiments, (e.g., where credit mode is enabled), the bank manager 508 may be operable to configure selected credit meters (e.g., tournament credit meters) of the gaming machine with appropriate tournament credit data such as, for example, an initial value of tournament credits. In one embodiment, configuration of the credit meters may be implemented using tournament credit configuration information which, for example, may be stored in memory at the gaming machine (and/or in memory at a remote system).

For example, in one embodiment, bank manager 508 may be notified (e.g., 7*b*) of the tournament mode enable event, and may take appropriate action in response. An example of this is illustrated in FIG. 6A of the drawings.

Figure 6B:
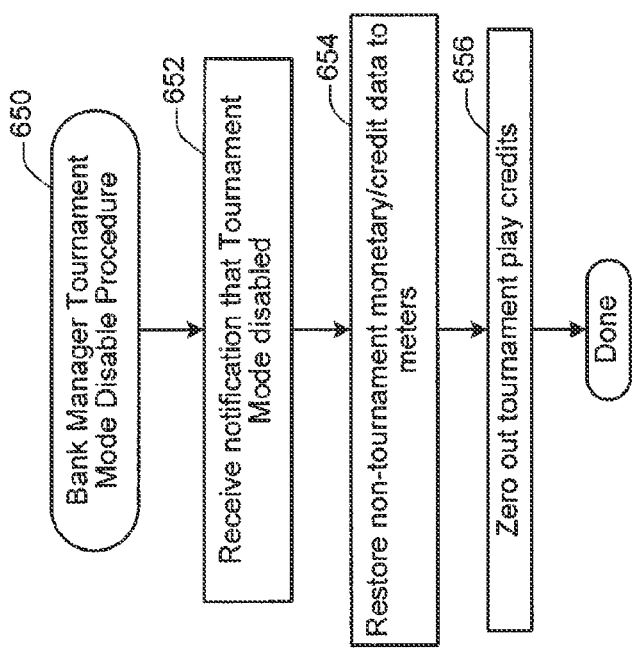
FIG. 6B shows a flow diagram of a Bank Manager Tournament Mode Disable Procedure 600 in accordance with a specific embodiment.
Figure 6A:
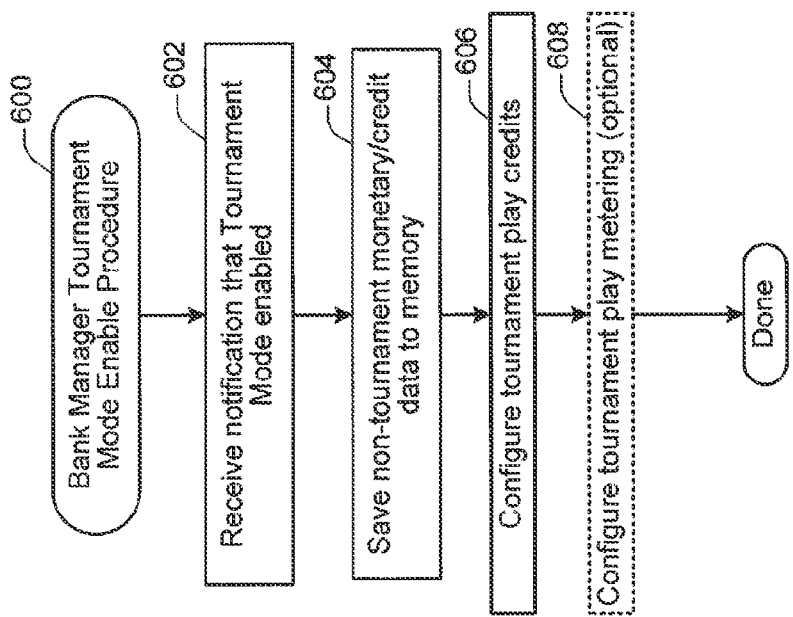
FIG. 6A shows a flow diagram of a Bank Manager Tournament Mode Enable Procedure 600 in accordance with a specific embodiment.

FIG. 6A shows a flow diagram of a Bank Manager Tournament Mode Enable Procedure 600 in accordance with a specific embodiment. In at least one embodiment, at least a portion of the Bank Manager Tournament Mode Enable Procedure may be implemented by a bank manager process, such as, for example, bank manager 293 of FIG. 3C. As illustrated in the example of FIG. 6A, when the bank manager detects or receives (602) notification of a tournament mode enable event, it may respond by saving (604) non-tournament monetary and/or credit data to memory (such as, for example, NV-RAM). In at least one embodiment, the non-tournament monetary and/or credit data may include current non-tournament play credits and/or other credit meter data associated with one or more credit meters at the gaming machine.

As shown at 606, the bank manager may also be operable to configure one or more credit meters with tournament credit data. For example, in one embodiment, the bank manager may also be operable to configure one or more tournament credit meters at the gaming machine with an initial amount of tournament credits to be used for tournament play during the current tournament session. Additionally, in at least some embodiments, the bank manager (and/or other hosts such as, for example, tournament manager) may be operable to configure (e.g., 608) other meters at the gaming machine such as, for example, one or more gaming machine meters described herein. In at least one embodiment, the bank manager (and/or tournament manager) may be operable to poll or access configuration attributes associated with one or more configuration files in order to determine proper configuration parameters to be used in configuring the various gaming machine meters.

Thus, for example, according to one embodiment, when going into tournament mode, the bank manager may store any current non-tournament credits (e.g., associated with the gaming machine and/or with a given player), and may configure a tournament credit meter with an initial value of tournament credits (e.g., to be used by a player at the gaming machine during the current session of tournament play). In at least one embodiment, when leaving tournament mode, the bank manager may restore the previous non-tournament credits (e.g., at the non-tournament credit meter(s)), and zero out the tournament credit meter(s). In at least one embodiment, at least a portion of the non-tournament credit meter data and/or tournament credit meter data may be stored in memory such as, for example, non-volatile RAM.

Returning to the example of FIG. 5A, at (9) the tournament manager may be operable to configure one or more timers (e.g., timer 504). For example, in one embodiment, the tournament manager may be operable to configure timer 504 for use in the current tournament session using tournament timer configuration information. In at least one embodiment, timer 504 may be implemented as a power hit tolerant system display timer that may be operable to utilize timer pulses and/or stopwatch functionality to update tournament timer data (e.g., hours, minutes and/or seconds of elapsed and/or remaining tournament play) which may be utilized by other components/devices/processes of the gaming machine and/or gaming system. In at least one embodiment, the timer may be operable to generate one or more timer events (e.g., upon reaching or exceeding specified timer values), which, for example, may be distributed to other components/devices/processes of the gaming machine and/or gaming system via event manager 506. According to specific embodiments, the timer may be started upon the occurrence of one or more specified events and/or conditions. For example, in at least one embodiment, the timer may be started when a player presses a start/spin button to start a game. In other embodiments, the timer may be automatically started after being configured by the tournament manager.

As shown at (11), the tournament manager may be operable to configure one or more meters and/or data structures which may be used during the current tournament session. For example, in at least one embodiment, the tournament manager may be operable to configure and/or manage one or more tournament-related meters which may be used for tracking various types of tournament-related information such as, for example, one or more of the following (or combinations thereof):

tournament mode/state;
tournament game;
games won in current tournament session;
games played in current tournament session;
credits wagered in current tournament session;
credits won in current tournament session;
remaining credits in current tournament session (e.g., in one embodiment, the tournament manager may use a configuration item value initially, and may subsequently use current tournament meter data such as that accessible from the bank or bank manager 293);
last game win;
last game wager;
session started (e.g., true or false);
session ended (e.g., true or false);
etc.

According to at least one embodiment, each meter (or selected meters) may have associated therewith a respective data structure which may be used to represent "freeze conditions" relating to various types of meter updates. For example, in one embodiment, information within the data structure may be used to block all or specific meter updates (e.g., associated with a given meter), depending upon various criteria such as, for example, the current mode of game play (e.g., tournament mode, non-tournament mode, etc) at the gaming machine.

FIG. 8 shows an example of a meter operation data structure 800 in accordance with the specific embodiment. In at least one embodiment, the meter operation data structure may be used to control specific meter updates associated with one or more meters. In one embodiment, the meter operation data structure 800 may be implemented as a bit-encoded data structure which, for example, may be stored at selected locations of the gaming machine memory (such as, for example, in shared non-volatile memory). In the example of FIG. 8, meter operation data structure 800 may include a first field (e.g., 802) which may be used for controlling specific meter updates based on a first criteria set, and may include a second field (e.g., 804) which may be used for controlling specific meter updates based on a second criteria set.

For example, in one embodiment, field 802 may be used to enable/disable meter updates while the gaming machine is in tournament mode, and/or field 804 may be used to enable/disable meter updates while the gaming machine is in non-tournament mode. Thus, for example, in one embodiment, a bit value of "1" in field 802 may result in the blocking of meter updates for a specified meter while the gaming machine is in tournament mode, whereas a bit value of "0" in field 802 may result in the allowing of meter updates for a specified meter while the gaming machine is in tournament mode. Similarly, a bit value of "1" in field 804 may result in the blocking of meter updates for the specified meter while the gaming machine is in non-tournament mode, and a bit value of "0" in field 804 may result in the allowing of meter updates for the specified meter while the gaming machine is in non-tournament mode.

In at least one embodiment, at least a portion of the gaming machine meters (e.g., non-tournament meters, tournament meters) may be implemented as "smart meters" or "intelligent meters" which are operable to accept and/or deny meter state change requests based on various criteria. Examples of such functionality are described in greater detail, for example, with respect to FIG. 7 of the drawings.

Returning to FIG. 5A, it is assumed at (13) that at least one condition or event has occurred to initiate a process of starting a new game (e.g., in tournament mode) at the gaming machine. For example, in at least one embodiment, such an event may include receiving user input (such as, for example, from a player, a casino employee, etc.) at the gaming machine via an I/O device. For example, in one embodiment, a player may push a button to initiate the start of a tournament game. In other embodiments, such an event may include receiving input from one or more processes/components of the gaming machine and/or gaming system.

In the example of FIG. 5A, it is assumed at (13) that the game manager (GM 510) has received a request to start a new game (e.g., corresponding to game 512) at the gaming machine.

In at least one embodiment, the tournament manager may be operable to control whether or not a new game is allowed to be started or initiated at the gaming machine. For example, in one embodiment, when the game manager (e.g., 510) receives input to start a new game at the gaming machine, the game manager first seeks approval from the tournament manager before taking appropriate action to start the requested game. According to specific embodiments, such approval from the tournament manager may be required for both tournament mode and non-tournament mode, or may be required only at times when tournament mode is enabled at the gaming machine.

Moreover, it will be appreciated that, in at least some embodiments, tournament and/or non-tournament game play may be implemented and controlled at the gaming machine in a manner which is transparent to the game code and/or game processes running at the gaming machine. As a result, tournament game play at the gaming machine may be enabled without requiring customization of the game code (e.g., for tournament play), and/or without requiring that the game(s) be aware of the current mode of operation (e.g., tournament mode, non-tournament mode) of the gaming machine.

As shown in the example of FIG. 5A, before initiating the start of a new game at the gaming machine, the game manager may send (15) a game start request to tournament manager 502. In at least one embodiment, the game start request may include game ID information relating to an identity of the game to be started (e.g., game 512).

At (17) the tournament manager may determine whether or not proper conditions currently exist for allowing the start of the new game. For example, according to specific embodiments, the tournament manager may be operable to consider one or more of the following criteria (and/or combinations thereof) when making a determination as to whether or not proper conditions currently exist for allowing the start of the new game:

- current mode of operation of the gaming machine (e.g., tournament mode, non-tournament mode, etc.);
- type of tournament mode(s) enabled/disabled (e.g., timer only mode, credit only mode, timer and credit mode, etc.);
- current tournament session status (e.g., locked, ended, etc.);
- credit meter value(s);
- timer value(s);
- game type restrictions;
- game theme restrictions;
- paytable restrictions;
- denomination restrictions;
- player identity;
- player tracking information;
- player account information;
- current time/date information;
- pending tournament key strokes;
- etc.

For example, according to one embodiment, if it is determined that the gaming machine is currently in non-tournament mode, the tournament manager may approve a game start request (e.g., relating to a specific game) so long as the current paytable (or paytable associated with the specific game) is not characterized as a "tournament only" paytable (e.g., a paytable which is restricted for use only during tournament play).

In other embodiments, if it is determined that the gaming machine is currently in tournament mode, the tournament manager may approve or deny a game start request depending upon whether specific criteria has (or has not) been satisfied. Examples of such criteria may include, but are not limited to, one or more of the following (or combination thereof):

- Paytable is (/is not) a tournament-capable paytable. For example, in one embodiment, the game start request may be denied if it is determined that the current paytable (or paytable associated with the game identified from the game start request message) is not allowed for use in tournament mode game play. According to different embodiments, a paytable may be implemented as a tournament-only paytable or a tournament-capable paytable (e.g., meaning either tournament or non-tournament play is allowed).

The game identified from the game start request message has a paytable which is (/is not) allowed for use in the current tournament session.

The current tournament session has not (/has) ended or expired.

The current tournament session is not (/is) locked.

Multi-condition criteria has not (/has) been satisfied (such as, for example, a possible tournament/system keystroke action is pending). For example, in one embodiment, a game start request may be denied if the start request may have been generated as part of a multi-event combination such as, for example, jackpot key turn and start button push. In one embodiment, this may be a valid combination (e.g., to initiate a tournament session reset) when both events occur within a defined duration or time interval.

Current player information is available which indicates that a player should (/should not) be allowed to participate or play in the current tournament session.

Etc.

In at least one embodiment, a "game" may be uniquely defined by its associated game theme, game type, and paytable. Additionally, in at least one embodiment, a game which is currently selected for play at a gaming machine may have associated therewith a current game theme, current game type, and current paytable.

In at least one embodiment, the locking or unlocking of a tournament session may be accomplished by posting events via the event manager. In some embodiments the locking or unlocking of a tournament session may be accomplished via the use of tournament enable request messages (e.g., tournament mode enable request message). For example, in at least one embodiment a tournament enable request message may specify that a tournament session be locked until specific criteria has been satisfied. For example, in one embodiment, a tournament session may be locked until an appropriate start session request has been received (which, for example, may be initiated in response to a player pushing an appropriate button, may be initiated in response to instructions received from a local process, may be initiated in response to instructions received from a remote process/system, etc.), at which point the tournament session may be automatically unlocked. In at least one embodiment the tournament manager may be operable to control the locking and/or unlocking of the tournament session. For example, in one embodiment, a tournament lock flag may be used to indicate that all game start requests should be denied (e.g., while the tournament lock flag is set). In one embodiment, the tournament lock flag may be implemented as a bit encoded field that is considered "locked" when the value of the bit field corresponds to a specified value or range of values (e.g., when the value of the bit field is non-zero). In at least some embodiments, various conditions may be checked before locking and/or unlocking a given tournament session. For example, in one embodiment, the tournament manager may be locked for conditions and/or criteria such as, for example, one or more of the following (or combinations thereof):

WAITING_FOR_START_SESSION_EVENT conditions/criteria (e.g., (optional) field in tournament enable event to lock, tournament start session request event to clear);

WAITING_FOR_TOURNAMENT_RESUME conditions/criteria (e.g., pause tournament request event to lock, resume tournament request event to clear);

etc.

For example, in some embodiments the locking or unlocking of a tournament session may be accomplished via the use of tournament pause request messages. For example, in one embodiment, a tournament pause request message may request that a tournament session be locked (or suspended) until specific criteria has been satisfied. In one embodiment, the unlocking of the tournament session may occur in response to receiving a resume tournament request message.

In the example of FIG. 5A it is assumed that proper conditions exist for allowing the start of the new game. Accordingly, as shown at (19), the tournament manager 502 may respond to the game start request by notifying the game manager 510 that the game start request has been allowed or approved. In response, the game manager may facilitate and/or initiate the start (21) of the new game 512. In other situations where it is determined that proper conditions do not exist for allowing the start of the new game, the tournament manager may respond to the game start request by notifying the game manager 510 that the game start request has been denied.

In at least one embodiment, the game manager may notify (23) the tournament manager (and/or other processes/components/systems) of the start of game 512. In one embodiment, such notification may be provided (25) via the event manager 506.

At (27) the tournament manager may initiate starting of a tournament (or tournament play) session. In at least one embodiment, the tournament play (TP) session may be initiated or started in response to receiving notification of the start of tournament play for a selected game (e.g., game 512). In other embodiments, the tournament play (TP) session may be started in response to player input, such as, for example, the pushing of a "game start" button. In at least one embodiment, an active tournament session may correspond to the period in which a player is allowed to participate in tournament game play. For example, in time only mode, the length of a tournament session may be determined by the amount of time which has been allotted for tournament play (e.g., for a particular gaming machine, a particular player, and/or a particular tournament). According to different embodiments, the tournament timer (e.g., 504) may be started (29) upon the start of the tournament play session, and/or may be started upon the occurrence of other events/conditions such as, for example, one or more of the following (or combinations thereof): player input event (e.g., player pushes "start game" button), tournament session unlock event, process/device/system initiated event, and/or other desired triggering events/conditions.

For example, in one embodiment, the timer may be started when a player presses a start/spin button to start a game. In another embodiment, the timer may be set to start immediately upon start of the tournament play session. In one embodiment where timer only mode is enabled, the player may play as many games as possible within the configured time duration. When the time runs out, an event may be posted (e.g., by the system display timer) and detected by the Tournament Manager. Assuming conditions are proper, the Tournament Manager may take action to end the tournament session. This may include setting a flag indicating that the tournament session has finished. In at least one embodiment, before any game is started in tournament mode, the Game Manager may send a message to the Tournament Manager requesting permission to start a game. If the tournament session end flag is set, and/or if the game indicated in the request message doesn't match the current, configured tournament game, the Tournament Manager may respond by denying permission to start the requested game.

Alternatively, in credit only mode, the length of a tournament session may be determined by the amount of tournament credits available at a given gaming machine (and/or available to a given player). For example, in one embodiment, a credit meter at the gaming machine may be configured with an initial amount of tournament credits for use during the tournament session. In one embodiment, the tournament session may remain active/enabled at that particular gaming machine so long as the available tournament credits at the gaming machine is greater than zero. The tournament session may end or expire when the available tournament credits at the gaming machine reaches zero.

Returning to the example of FIG. 5A, if a time change event has occurred (e.g., at timer 504) which relates to an active tournament play session, the timer may generate (31) a time change event notification message, which, for example, may be posted (33) to other processes/components/systems via event manager 506. Examples of different time change events may include, but are not limited to, one or more of the following (or combination thereof): suspension of timer updates (e.g., timer functionality temporarily suspended); resumption of timer updates (e.g., timer functionality resumed/restored); change/update of timer value(s); timer reset event; timer configuration event; timer started; timer expired; etc.

In at least one embodiment, the tournament manager may be operable to manage and/or to periodically update state information (and/or other data) relating to one or more tournament meters during a given tournament session. Additionally, other hosts (such as, for example, Game Manager, Bank Manager, etc.) may be operable to manage and/or to periodically update state information (and/or other data) relating to one or more tournament meters.

Returning to the example of FIG. 5A, if a tournament meter change event has occurred (35) (e.g., at a gaming machine meter) which relates to an active tournament play session, the tournament manager (and/or other entity) may generate (37) a tournament meter change event notification message, which, for example, may be posted (39) to other processes/components/systems via event manager 506. Examples of different tournament meter change events may include, but are not limited to, one or more of the following (or combination thereof): suspension of meter updates (e.g., meter functionality temporarily suspended); resumption of meter updates (e.g., meter functionality resumed/restored); change/update of meter value(s); meter reset event; meter configuration event; zero meter/credit value; etc.

FIG. 5B shows an example embodiment of an interaction diagram, illustrating various interactions which may take place among different processes, devices, and/or systems of a tournament-enabled gaming machine in accordance with a specific embodiment. For purposes of illustration it may be assumed that the interaction diagram of FIG. 5B represents a continuation of the interaction diagram of FIG. 5A.

According to one embodiment, when a timer expiration event occurs (41) at timer 504, the timer may generate (43) a timer expiration event notification message, which, for example, may be posted (45) to other processes/components/systems (e.g., tournament manager 502) via event manager 506. In other embodiments, the timer may communicate with the tournament manager directly to notify the tournament manager of the timer expiration event.

In at least one embodiment, when the tournament manager receives notification of a tournament timer expiration event, it may respond by ending (47) or closing the active or current tournament play session, when appropriate. Such action(s) may be appropriate, for example, during time only mode tournament session(s) and/or during time and credit mode tournament session(s). Additionally, in at least one embodiment, the tournament manager may post (49) notification of the ending of a tournament session, for example, via the event manager.

Additionally, according to specific embodiments, as illustrated, for example, in FIG. 5B, when a zero credit condition occurs at a tournament credit meter, and/or when the bank manager 508 determines (51) that the value of the tournament credit meter (e.g., at a specified gaming machine) is zero, the bank manager may generate and/or post (53, 55) notification of the zero tournament credit condition to other processes/components/systems (such as, for example, to tournament manager 502) via event manager 506. In other embodiments, the bank manager may communicate with the tournament manager directly to notify the tournament manager of the zero tournament credit condition.

In other embodiments the tournament manager may be operable to track the status and/or values of one or more credit meters. and may be further operable generate and/or post notification of tournament meter status information (e.g., zero tournament credit condition) to other processes/components/systems (e.g., via event manager 506). In some embodiments, the tournament manager may be operable to track the status and/or values of one or more credit meters at the gaming machine, and take appropriate action in response to the tracked information. For example, in one embodiment, the tournament manager may be operable to detect a zero tournament credit condition/event at a given tournament credit meter, and may respond by ending or closing the active or current tournament play session, when appropriate. As illustrated in the embodiment of FIG. 5B, when the tournament manager receives notification of a zero tournament credit condition/event, it may respond by ending (57) or closing the active or current tournament play session, when appropriate. Such action(s) may be appropriate, for example, during credit only mode tournament session(s) and/or during time and credit mode tournament session(s). Additionally, in at least one embodiment, the tournament manager may post (59) notification of the ending of a tournament session, for example, via the event manager.

According to a specific embodiment, once the active tournament session has ended, tournament credits and/or other meter data at the gaming machine may be temporarily frozen. For example, in one embodiment, tournament credits and/or other meter data at the gaming machine may be temporarily frozen until the tournament manager determines that conditions are appropriate for allowing another game to be started at the gaming machine. Examples of different events/conditions which may be used to determine that conditions are appropriate for allowing another game to be started at the gaming machine may include, but are not limited to, one or more of the following (or combination thereof): tournament mode disabled; occurrence of gaming machine reset or exit event; notification from other processes, components, and/or systems of specific events/conditions; etc.

In the example of FIG. 5B, it is assumed that a process (e.g., a local process running at the gaming machine or a remote process running at a remote system/device) may request that tournament mode be disabled at the gaming machine. For example, in one embodiment (as shown, for example, in FIG. 5B) a process may send (61, 63) a tournament mode disable request to the tournament manager 502 via event manager 506. In at least one embodiment, the tournament mode disable request may include an identifier (e.g., Host ID) which may be used for determining the identity of the host for process which initiated or generated the tournament mode disable request.

In one embodiment, the tournament manager may be operable to store the Host ID associated with the tournament mode enable request, and may be operable to use the stored Host ID data during processing of subsequent requests (e.g., either from the same host or different hosts). For example, in one embodiment, the tournament manager may use the Host ID data to approve, deny, and/or block other tournament related requests from other hosts.

In at least one embodiment, the tournament manager 502 may process the tournament mode disable request, which, for example, may include determining whether conditions are proper for allowing/denying the tournament mode disable request. For example, in at least one embodiment, the tournament manager may be operable to deny the tournament mode disable request based upon the detection of one or more specific conditions and/or events, such as, for example, one or more of the following (or combinations thereof):

- tournament mode currently disabled;
- unrecognized or unauthorized Host ID;
- current game still in progress (or not ended);
- network communication error detected;
- tournament session currently active and/or has not yet expired;
- current game play sequence has not finished;
- etc.

In the example of FIG. 5B it is assumed that conditions are proper for allowing tournament mode to be disabled at the gaming machine. Accordingly, as shown at (65) the tournament manager may disable tournament mode at the gaming machine.

In at least one embodiment, the tournament manager may post (67) a tournament mode disable notification event in order to notify (69) (e.g., via event manager 506) other processes, devices and/or systems of the tournament mode disable event. According to specific embodiments, when a tournament mode disable event occurs at the gaming machine, different processes may be responsible for configuring various hardware and/or software components for non-tournament game play.

For example, in one embodiment, bank manager 508 may be notified of the tournament mode disable event, and may take appropriate action in response. An example of this is illustrated in FIG. 6B of the drawings.

FIG. 6B shows a flow diagram of a Bank Manager Tournament Mode Disable Procedure 600 in accordance with a specific embodiment. In at least one embodiment, at least a portion of the Bank Manager Tournament Mode Disable Procedure may be implemented by a bank manager process, such as, for example, bank manager 293 of FIG. 3C. As illustrated in the example of FIG. 6B, when the bank manager detects or receives (652) notification of a tournament mode disable event, it may respond by restoring (654) non-tournament monetary and/or credit data to one or more appropriate meters at the gaming machine. For example, in one embodiment, at least a portion of the stored non-tournament monetary and/or credit data (e.g., relating to non-tournament play credits) may be restored to one or more credit meters at the gaming machine. In at least one embodiment, the gaming machine and/or various components/processes associated therewith may be restored to their respective states as they existed at a time just prior to the enabling of tournament mode at the gaming machine. Additionally, as shown at 656, the bank manager may also be operable to zero out any remaining tournament credits at one or more credit meters. Thus, for example, according to one embodiment, when leaving tournament mode, the bank manager may be operable to restore the previous non-tournament credits (e.g., at the non-tournament credit meter(s)), and to zero out the tournament credit meter(s).

Smart Meters

Figure 7:
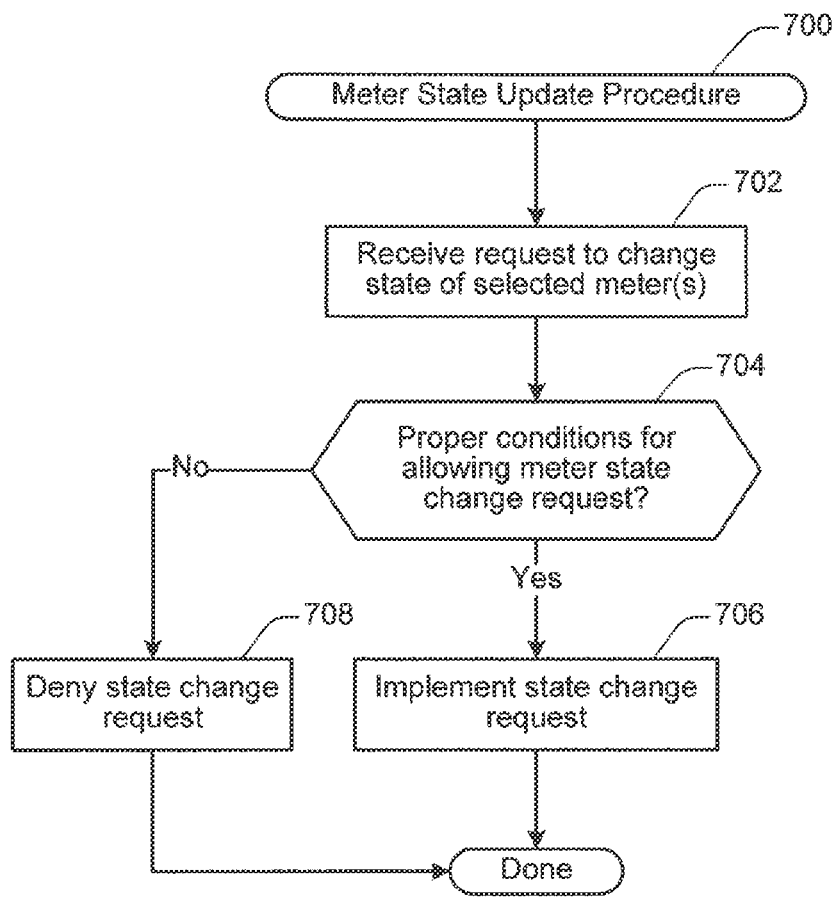
FIG. 7 shows a flow diagram of a Meter State Update Procedure in accordance with a specific embodiment.

FIG. 7 shows a flow diagram of a Meter State Update Procedure in accordance with a specific embodiment. In at least one embodiment, at least a portion of the Meter State Update Procedure may be implemented at one or more gaming machine meters, and/or may be implemented at other gaming machine hosts such as, for example, Tournament Manager, Bank Manager, Game Manager, etc. In one embodiment, a separate instance of the Meter State Update Procedure may be initiated at each meter (or selected meters) (e.g., tournament meters, non-tournament meters, etc.) of a gaming machine.

According to different embodiments, during play of a given gaming session, one or more processes, components and/or systems associated with a given gaming session may generate at least one meter state change request for changing and/or updating state information (and/or other parameters) associated with one or more meters.

As shown at 702 when a meter state change request is received or detected (e.g., by a given meter), a determination may be made as to whether proper conditions exist for allowing or implementing the meter state change request. If it is determined that proper conditions exist for allowing or implementing the meter state change request, the meter state change request may be allowed, and the appropriate actions may be performed to implement (706) the meter state change request. In at least one embodiment, this may result in a change of one or more states and/or data associated with the given meter. If it is determined that proper conditions do not exist for allowing or implementing the meter state change request, the meter state change request may be denied, thereby resulting in no change of state and/or data at the given meter. According to specific embodiments, examples of various types of criteria which may affect the determination as to whether proper conditions exist for allowing or authorizing the meter state change request may include, but are not limited to, one or more of the following (or combination thereof):

- meter freeze condition(s) which are/are not in effect (e.g., freeze in tournament mode, freeze in non-tournament mode, etc);
- tournament mode currently enabled/disabled;
- non-tournament mode currently enabled/disabled;
- Host ID associated with tournament meter state change request is/is not authorized;
- Host ID associated with tournament meter state change request is/is not recognized;
- approval of tournament meter state change request approved/not approved by other components/systems (e.g., bank manager, tournament manager, etc.);
- tournament session currently active/inactive;
- etc.

In one embodiment, selected shared memory location(s) (e.g., at the gaming machine memory) may be used to store information relating conditions and/or criteria which may be accessed by one or more meters and/or used to determine whether or not to allow or authorize a meter state change request. For example, in one embodiment, portion of shared memory may be allocated for use as a "tournament enabled" flag and/or as one or more meter operation data structures. In one embodiment, multiple different meter freeze and/or non-freeze conditions may be based on one or more common events, conditions (e.g., freeze in tournament mode and/or freeze in non-tournament mode "freeze conditions"), and/or other criteria, such as, for example, information stored in one or more shared-access data structures.

In at least one embodiment, at least a portion of the gaming machine meters (e.g., non-tournament meters, tournament meters) may be implemented as "smart meters" or "intelligent meters" which are operable to accept and/or deny meter state change requests based on various criteria. In at least one embodiment, each meter may have associated therewith a respective meter operation data structure (e.g., 800, FIG. 8) which may be used to control specific meter update activities associated with that meter. In other embodiments a meter operation data structure may be used to control specific meter update activities associated with one or more meters. According to one embodiment, when the meter receives a meter state change request, the meter may check a specified meter operation data structure to determine whether or not to implement the meter state change request. In at least one embodiment, the tournament manager may be operable to control or manage information stored in one or more meter operation data structures.

It will be appreciated that the various techniques described herein may be used to allow non-tournament games (e.g., games which have not been specifically configured or adapted for tournament play) to be played in tournament mode at the gaming machine without affecting non-tournament related meters at the gaming machine. Additionally, the various techniques described herein may allow for the play of games at a gaming machine (or gaming system) in either tournament mode or non-tournament mode in a manner which is transparent to such games. One advantage of such features is that it eliminates the necessity to write customized code for each game in order to allow play of that game to be supported in tournament mode. An additional advantage relates to the backward compatibility of the tournament play techniques described herein. For example, the transparent nature of the various tournament related techniques described herein allows for one or more non-customized games (e.g., games which have not been specifically configured or designed for tournament play) to be used for tournament game play at the gaming machine/gaming system, even in situations where the game has not been specifically configured or designed for tournament play.

For example, by way of illustration, it may be assumed that it is desired to play a conventional non-tournament game (e.g., Game A, which has not been specifically configured or adapted for play in tournament mode) at a selected gaming machine. In this example it is assumed that the gaming machine includes a first non-tournament (e.g., Meter A) and an associated meter operation data structure (e.g., Meter A data structure) for controlling specific meter update activities associated with the Meter A. It may further be assumed in this example that Game A has been configured or designed to cause Meter A to be updated during play of Game A at the gaming machine in non-tournament mode.

For example, in one implementation, Meter A may correspond to a non-tournament credit meter for tracking non-tournament gaming credits. Each time a new round of Game A is initiated at the gaming machine, Game A (and/or the Game Manager) may send instructions to Meter A to decrement its meter value. During play of Game A in non-tournament mode, it may be desirable to allow changes and/or updates to Meter A to be made in response to game play associated with Game A. However, in at least one embodiment, during play of Game A in tournament mode, it may be desirable to not allow changes and/or updates to Meter A to be made in response to game play associated with Game A. Accordingly, in one embodiment, when a tournament session is started at the gaming machine, the tournament manager may update one or more status data structure(s) (e.g., in shared memory) with appropriate information (e.g., tournament mode enabled/disabled), which may be used by Meter A to enforce conditions and/or restrictions specified at the Meter A data structure. Thus, for example, assuming that the Meter A data structure indicates a "freeze in tournament mode" restriction, no meter state or data changes will be allowed to be made at Meter A while tournament mode is enabled.

In at least one embodiment, during play of Game A in tournament mode, Game A (and/or the Game Manager, and/or other hosts) may send instructions to Meter A to update its meter value. In one embodiment, when Meter A receives the meter update request(s), it may check the Meter A data structure to determine whether any freeze or lock conditions/restrictions are in effect for Meter A, and may also check the status data structure(s) to determine whether the freeze or lock conditions should currently be enforced. Thus, for example, if the Meter A data structure indicates a "freeze in tournament mode" restriction, and the status data structure indicates that tournament mode is enabled, Meter A may respond by ignoring meter update request(s) (and/or meter state change request(s)) it receives. If the information in the status data structure is subsequently modified (e.g., by the tournament manager) to indicate that tournament mode is not enabled, Meter A may then respond by implementing meter update request(s) (and/or meter state change request(s)) which it receives.

Additionally, in at least one embodiment, at least a portion of the actions performed or not performed by Meter A (e.g., Meter A not implementing requested meter state/data changes) may be transparent to various components and/or hosts at the gaming machine (e.g., Game A, Game Manager, etc.) in a manner such that no error conditions are triggered or detected in response to Meter A failing to implement requested meter state/data changes.

Gaming Networks

Figure 10:
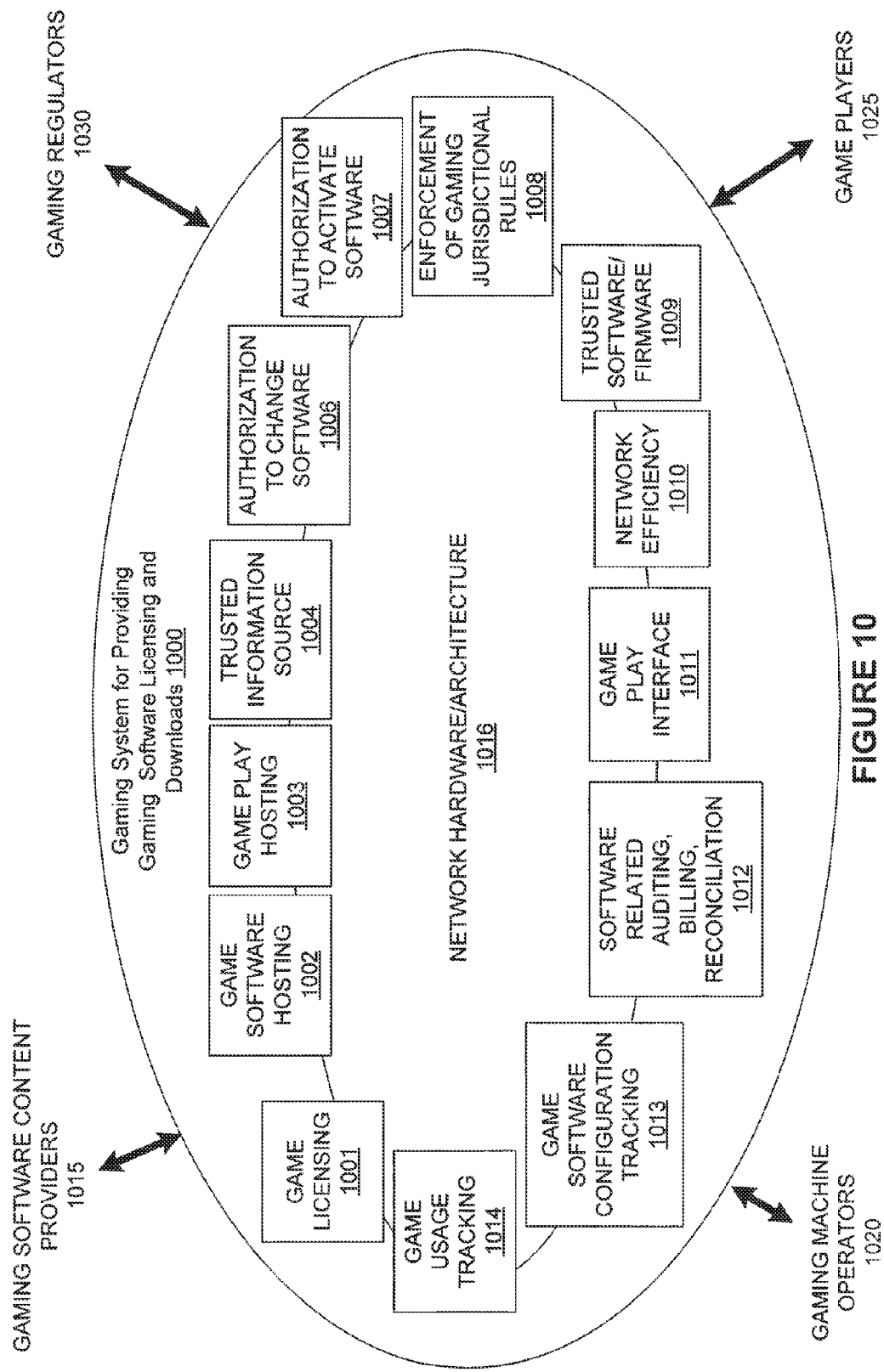
FIG. 10 shows a block diagram illustrating components of a gaming network 1000 which may be used for implementing various aspects of at least one embodiment described herein.

FIG. 10 shows a block diagram illustrating components of a gaming network 1000 which may be used for implementing various aspects of at least one embodiment described herein. In FIG. 10, the components of a gaming network 1000 for providing game software licensing and downloads are described functionally. The described functions may be instantiated in hardware, firmware and/or software and executed on a suitable device. In the system 1000, there may be many instances of the same function, such as multiple game play interfaces 1011. Nevertheless, in FIG. 10, only one instance of each function is shown. The functions of the components may be combined. For example, a single device may comprise the game play interface 1011 and include trusted memory devices or sources 1009. The described components and their functions may be incorporated various embodiments of the servers and clients described with respect to at least FIGS. 1A and 6.

The gaming network 1000 may receive inputs from different groups/entities and output various services and or information to these groups/entities. For example, game players 1025 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1000, receive revenue for the use of their software, and compensate the gaming machine operators. The gaming regulators 1030 may provide rules and regulations that must be applied to the gaming network and may receive reports and other information confirming that rules are being obeyed.

In the following paragraphs, details of each component and some of the interactions between the components are described with respect to FIG. 10. The game software license host 1001 may be a server connected to a number of remote gaming devices that provides licensing services to the remote gaming devices. For example, in other embodiments, the license host 1001 may 1) receive token requests for tokens used to activate software executed on the remote gaming devices, 2) send tokens to the remote gaming devices, 3) track token usage, and 4) grant and/or renew software licenses for software executed on the remote gaming devices. The token usage may be used in utility based licensing schemes, such as a pay-per-use scheme.

In another embodiment, a game usage-tracking host 1015 may track the usage of game software on a plurality of devices in communication with the host. The game usage-tracking host 1015 may be in communication with a plurality of game play hosts and gaming machines. From the game play hosts and gaming machines, the game usage tracking host 1015 may receive updates of an amount that each game available for play on the devices has been played and on amount that has been wagered per game. This information may be stored in a database and used for billing according to methods described in a utility based licensing agreement.

The game software host 1002 may provide game software downloads, such as downloads of game software or game firmware, to various devices in the game system 1000. For example, when the software to generate the game is not available on the game play interface 1011, the game software host 1002 may download software to generate a selected game of chance played on the game play interface. Further, the game software host 1002 may download new game content to a plurality of gaming machines via a request from a gaming machine operator.

In one embodiment, the game software host 1002 may also be a game software configuration-tracking host 1013. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with at least one embodiment are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1003 may be a host server connected to a plurality of remote clients that generates games of chance that are displayed on a plurality of remote game play interfaces 1011. For example, the game play host device 1003 may be a server that provides central determination for a bingo game play played on a plurality of connected game play interfaces 1011. As another example, the game play host device 1003 may generate games of chance, such as slot games or video card games, for display on a remote client. A game player using the remote client may be able to select from a number of games that are provided on the client by the host device 1003. The game play host device 1003 may receive game software management services, such as receiving downloads of new game software, from the game software host 1002 and may receive game software licensing services, such as the granting or renewing of software licenses for software executed on the device 1003, from the game license host 1001.

In particular embodiments, the game play interfaces or other gaming devices in the gaming network 1000 may be portable devices, such as electronic tokens, cell phones, smart cards, tablet PC's and PDA's. The portable devices may support wireless communications and thus, may be referred to as wireless mobile devices. The network hardware architecture 1016 may be enabled to support communications between wireless mobile devices and other gaming devices in gaming network. In one embodiment, the wireless mobile devices may be used to play games of chance.

The gaming network 1000 may use a number of trusted information sources. Trusted information sources 1004 may be devices, such as servers, that provide information used to authenticate/activate other pieces of information. CRC values used to authenticate software, license tokens used to enable the use of software or product activation codes used to activate to software are examples of trusted information that might be provided from a trusted information source 1004. Trusted information sources may be a memory device, such as an EPROM, that includes trusted information used to authenticate other information. For example, a game play interface 1011 may store a private encryption key in a trusted memory device that is used in a private key-public key encryption scheme to authenticate information from another gaming device.

When a trusted information source 1004 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming network 1000 of at least one embodiment may include devices 1006 that provide authorization to download software from a first device to a second device and devices 1007 that provide activation codes or information that enable downloaded software to be activated. The devices, 1006 and 1007, may be remote servers and may also be trusted information sources. One example of a method of providing product activation codes that may be used with at least one embodiment described herein is described in previously incorporated U.S. Pat. No. 6,264,561.

A device 1006 that monitors a plurality of gaming devices to determine adherence of the devices to gaming jurisdictional rules 1008 may be included in the system 1000. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1000 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In at least one embodiment, the devices may be connected by a network 1016 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in at least one embodiment, network efficient devices 1010 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in at least one embodiment may provide game software and game licensing related auditing, billing and reconciliation reports to server 1012. For example, a software licensing billing server may generate a bill for a gaming device operator based upon a usage of games over a time period on the gaming devices owned by the operator. In another example, a software auditing server may provide reports on game software downloads to various gaming devices in the gaming network 1000 and current configurations of the game software on these gaming devices.

At particular time intervals, the software auditing server 1012 may also request software configurations from a number of gaming devices in the gaming network. The server may then reconcile the software configuration on each gaming device. In one embodiment, the software auditing server 1012 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 10. Many of the interactions are coupled. For example, methods used for game licensing may affect methods used for game downloading and vice versa. For the purposes of explanation, details of a few possible interactions between the components of the system 1000 relating to software licensing and software downloads have been described. The descriptions are selected to illustrate particular interactions in the game system 1000. These descriptions are provided for the purposes of explanation only and are not intended to limit the scope of any embodiment described herein.

Gaming Network Configuration

As described above, at least one embodiment may be implemented in various configurations for gaming machines, including but not limited to: (1) a dedicated gaming machine, wherein the computerized instructions for controlling any games (which are provided by the gaming machine) are provided with the gaming machine prior to delivery to a gaming establishment; and (2) a changeable gaming machine, where the computerized instructions for controlling any games (which are provided by the gaming machine) are downloadable to the gaming machine through a data network when the gaming machine is in a gaming establishment. In another embodiment, the computerized instructions for controlling any games are communicated from the remote host, the central server or central controller to a gaming machine local processor and memory devices. In such a "thick client" embodiment, the gaming machine local processor executes the communicated computerized instructions to control any games (or other suitable interfaces) provided to a player.

In one alternative embodiment, the computerized instructions for controlling any games are executed by a remote host, a central server or central controller. In such a "thin client"

embodiment, the remote host remotely controls any games (or other suitable interfaces) and the gaming machine is utilized to display such games (or suitable interfaces) and receive one or more inputs or commands from a player. In one embodiment, one or more gaming machines in a gaming network may be thin client gaming machines and one or more gaming machines in the gaming network may be thick client gaming machines. In another embodiment, certain functions of the gaming machine are implemented in a thin client environment and certain other functions of the gaming machine are implemented in a thick client environment. In one such embodiment, computerized instructions for controlling any primary games are communicated from the remote host to the gaming machine in a thick client configuration and computerized instructions for controlling any secondary games or bonus functions are executed by a remote host in a thin client configuration. It should be appreciated that one, more or each of the functions of the remote host as disclosed herein may be performed by one or more gaming machine processors. It should be further appreciated that one, more or each of the functions of one or more gaming machine processors as disclosed herein may be performed by the remote host.

In one embodiment, the gaming machine randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In an alternative embodiment, the remote host maintains one or more predetermined pools or sets of predetermined game outcomes. In this embodiment, the remote host receives the game outcome request and independently selects a predetermined game outcome from a set or pool of game outcomes. The remote host flags or marks the selected game outcome as used. Once a game outcome is flagged as used, it is prevented from further selection from the set or pool and cannot be selected by the remote host upon another wager. The provided game outcome can include a primary game outcome, a secondary game outcome, primary and secondary game outcomes, or a series of game outcomes such as free games.

The remote host communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the remote host and communicated to the initiated gaming machine to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming machines based on the results of a bingo, keno or lottery game. In this embodiment, each individual gaming machine utilizes one or more bingo, keno or lottery games to determine the predetermined game outcome value provided to the player for the interactive game played at that gaming machine. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming machine is enrolled in the bingo game, such as upon an appropriate wager or engaging an input device, the enrolled gaming machine is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing or associating a different bingo card to each of a plurality of enrolled gaming machines, the remote host randomly selects or draws, one at a time, a plurality of the elements. As each element is selected, a determination is made for each gaming machine as to whether the selected element is present on the bingo card provided to that enrolled gaming machine. This determination can be made by the remote host, the gaming machine, a combination of the two, or in any other suitable manner. If the selected element is present on the bingo card provided to that enrolled gaming machine, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming machine requires the player to engage a daub button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome determined for each gaming machine enrolled in the bingo game is utilized by that gaming machine to determine the predetermined game outcome provided to the player. For example, a first gaming machine to have selected elements marked in a predetermined pattern is provided a first outcome of win $10 which will be provided to a first player regardless of how the first player plays in a first game and a second gaming machine to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above.

In another embodiment, the game outcome provided to the player is determined by a remote host and provided to the player at the gaming machine. In this embodiment, each of a plurality of such gaming machines are in communication with the remote host. Upon a player initiating game play at one of the gaming machines, the initiated gaming machine communicates a game outcome request to the remote host. In one embodiment, the remote host receives the game outcome request and randomly generates a game outcome for the primary game based on probability data. In another embodiment, the remote host randomly generates a game outcome for the secondary game based on probability data. In another embodiment, the remote host randomly generates a game outcome for both the primary game and the secondary game based on probability data. In this embodiment, the remote host is capable of storing and utilizing program code or other data similar to the processor and memory device of the gaming machine.

In another embodiment, one or more of the gaming machines are in communication with a remote host for monitoring purposes. That is, when not communicating with the remote host regarding any ECIs, each individual gaming machine randomly generates the game outcomes to be provided to the player and the remote host monitors the activities and events occurring on the plurality of gaming machines. In one embodiment, the gaming network includes a real-time or on-line accounting and gaming information system operably coupled to the remote host. The accounting and gaming information system of this embodiment includes a player database for storing player profiles, a player tracking module for tracking players and a credit system for providing automated casino transactions.

In another embodiment, a plurality of gaming machines at one or more gaming sites may be networked to the remote host in a progressive configuration, as known in the art, wherein a portion of each wager to initiate a base or primary game may be allocated to one or more progressive awards. In one embodiment, a progressive gaming network host site computer is coupled to a plurality of the remote hosts at a variety of mutually remote gaming sites for providing a multi-site linked progressive automated gaming network. In one embodiment, a progressive gaming network host site computer may serve gaming machines distributed throughout a number of properties at different geographical locations including, for example, different locations within a city or different cities within a state.

In one embodiment, the progressive gaming network host site computer is maintained for the overall operation and control of the progressive gaming network. In this embodiment, a progressive gaming network host site computer oversees the entire progressive gaming network and is the master for computing all progressive jackpots. All participating gaming sites report to, and receive information from, the progressive gaming network host site computer. Each remote host computer is responsible for all data communication between the gaming machine hardware and software and the progressive gaming network host site computer. In one embodiment, an individual gaming machine may trigger a progressive award win. In another embodiment, a remote host (or the progressive gaming network host site computer) determines when a progressive award win is triggered. In another embodiment, an individual gaming machine and a remote host (or progressive gaming network host site computer) work in conjunction with each other to determine when a progressive win is triggered, for example through an individual gaming machine meeting a predetermined requirement established by the remote host.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming machine is randomly or apparently randomly selected to provide a player of that gaming machine one or more progressive awards. In one such embodiment, the gaming machine does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming network, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, the gaming network maintains at least one progressive award by allocating a percentage of a player's wager into the player's own progressive award or pool (i.e., a personal progressive award). In this embodiment, upon the occurrence of an event (either associated with game play or independent of game play), the gaming network provides the player their personal progressive award. In one such embodiment, the gaming network displays, via one or more ECI's (as described above), information related to their personal progressive award.

In another embodiment, a plurality of players at a plurality of linked gaming machines in a gaming network participate in a group gaming environment. In one embodiment, a plurality of players at a plurality of linked gaming machines work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming machines compete against one another for one or more awards. In one such embodiment, a plurality of players at a plurality of linked gaming machines participate in a gaming tournament for one or more awards. In another embodiment, a plurality of players at a plurality of linked gaming machines play for one or more awards wherein an outcome generated by one gaming machine affects the outcomes generated by one or more linked gaming machines.

Although the foregoing present invention has been described in detail by way of illustration and example for purposes of clarity and understanding, it will be recognized that the above described present invention may be embodied in numerous other specific variations and embodiments without departing from the spirit or essential characteristics of at least one embodiment described herein. Certain changes and modifications may be practiced, and it is understood that various embodiments described herein are not to be limited by the foregoing details, but rather is to be defined by the scope of the appended claims.

Techniques and mechanisms described herein may sometimes be described in singular form for clarity. However, it should be noted that particular embodiments include multiple iterations of a technique or multiple instantiations of a mechanism unless noted otherwise.

Additional details relating to various aspects of gaming technology are described in:

U.S. application Ser. No. 11/595,798 naming Little, et al. as inventors, and titled, "REMOTE CONTENT MANAGEMENT AND RESOURCE SHARING ON A GAMING MACHINE AND METHOD OF IMPLEMENTING SAME," filed on Nov. 10, 2006, which is incorporated herein by reference and for all purposes; and U.S. patent application Ser. No. 11/595,774, entitled "Method And Apparatus for Integrating Remotely-Hosted and Locally Rendered Content on a Gaming Device" and filed on Nov. 10, 2006, which is incorporated herein by reference and for all purposes.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A gaming device in a casino gaming network, comprising:
   a master gaming controller configured to provide game play of a game, wherein the game is not designed for tournament play;
   at least one interface for communicating with at least one other device in the gaming network;
   a first meter; and
   a tournament manager configured to provide a tournament mode for the game without modifying a game code of the game;
   the gaming device configured to:
      control a wager-based game played on the gaming device;
      receive a request from an entity for initiating start of a first game at the gaming device;
      obtain approval from the tournament manager for starting the first game at the gaming device; and
      prevent the first game from starting at the gaming device in response to detecting that the tournament manager has not approved start of the first game at the gaming device.

2. The gaming device of claim 1, wherein the tournament manager is configured to:
   determine whether proper conditions exist for allowing start of the first game at the gaming device; and
   prevent the first game from starting in response to determining that proper conditions do not exist for allowing start of the first game at the gaming device.

3. The gaming device of claim 2, wherein determination includes:
   determine whether tournament mode is enabled;
   determine whether an unauthorized host in the casino gaming network is communicating with the gaming device;
   determine whether a game is in progress;
   determine whether a memory of the gaming device includes a tournament paytable; or
   determine whether a player of the gaming device is allowed to participate in a tournament.

4. The gaming device of claim 1, wherein the tournament manager is configured to:
   prevent the first game from starting at the gaming device while tournament mode is enabled at the gaming device.

5. The gaming device of claim 1, wherein the tournament manager is configured to:
   prevent the first game from starting at the gaming device while non-tournament mode is enabled at the gaming device.

6. The gaming device of claim 1, wherein the first meter is configured to:
   receive a first meter update request to change meter state information associated with the first meter;
   determine whether a condition exists in which the first meter update request is denied; and
   prevent execution of the first meter update request in response to a determination that the condition exists in which the first meter update is denied.

7. The gaming device of claim 6, wherein the determination includes:
   determine whether a non-tournament mode is enabled at the gaming device; and
   determine, when the gaming device is operating in the non-tournament mode, whether the condition exists at the gaming device in which meter updates at the first meter are to be prevented.

8. The gaming device of claim 6, wherein the determination includes:
  determine a tournament mode type when the gaming device is operating in tournament mode;
  determine a tournament status;
  determine a paytable type;
  determine restrictions associated with a game type;
  determine restrictions associated with a game theme; or
  determine whether a keystroke is pending at the gaming device.

9. A method for operating an electronic gaming machine of a casino gaming network, the electronic gaming machine including a master gaming controller, a player input, a display, a tournament manager, and a first meter, the electronic gaming machine controls a wager-based game played on the electronic gaming machine, the method comprising:
  receiving, by the electronic gaming machine, a request from an entity for initiating start of a first game at the electronic gaming machine, wherein the first game is not designed for tournament play;
  obtaining, by the electronic gaming machine, approval from the tournament manager for starting the first game at the electronic gaming machine, wherein the tournament manager is configured to provide a tournament mode for the game without modifying a game code of the game; and
  preventing, by the electronic gaming machine, the first game from starting at the electronic gaming machine in response to detecting that the tournament manager has not approved start of the first game at the electronic gaming machine.

10. The method of claim 9, further comprising:
  determining, by the electronic gaming machine, whether proper conditions exist for allowing start of the first game at the electronic gaming machine; and
  preventing, by the electronic gaming machine, the first game from starting in response to determining that proper conditions do not exist for allowing start of the first game at the electronic gaming machine;
  wherein at least a portion of said preventing is performed by the tournament manager.

11. The method of claim 10, wherein the determining includes:
  determining whether tournament mode is enabled;
  determining whether an unauthorized host in the casino gaming network is communicating with the electronic gaming machine;
  determining whether a game is in progress;
  determining whether a memory of the electronic gaming machine includes a tournament paytable; or
  determining whether a player of the electronic gaming machine is allowed to participate in a tournament.

12. The method of claim 9, further comprising:
  preventing, by the electronic gaming machine, the first game from starting at the gaming device while tournament mode is enabled at the electronic gaming machine.

13. The method of claim 9, further comprising:
  preventing, by the electronic gaming machine, the first game from starting at the electronic gaming machine while non-tournament mode is enabled at the electronic gaming machine.

14. The method of claim 9, further comprising:
  receiving, at the master gaming controller, a first meter update request to change meter state information associated with the first meter;
  determining, at the master gaming controller, whether a condition exists in which the first meter update request is denied; and
  preventing, by the master gaming controller, execution of the first meter update request in response to a determination that the condition exists in which the first meter update is denied.

15. The method of claim 14, wherein the determining includes:
  determine a tournament mode type when the electronic gaming machine is operating in tournament mode;
  determine a tournament status;
  determine a paytable type;
  determine restrictions associated with a game type;
  determine restrictions associated with a game theme; or
  determine whether a keystroke is pending at the gaming device.

16. The method of claim 14, wherein the preventing execution of the first meter update request is performed by the first meter.

17. A gaming system, the gaming system comprising:
  a remote host including a tournament coordinator;
  a gaming device configured to provide game play of a game, wherein the game is not designed for tournament play, the gaming device including:
    a tournament manager configured to provide a tournament mode for the game without modifying a game code of the game,
    a first meter, and
    a network interface configured to communicate with the remote host; and
  a network configured to provide communication between the remote host and the gaming device via the network interface;
  the gaming device configured to:
    receive a request from an entity for initiating start of a first game at the gaming device,
    obtain approval from the tournament manager for starting the first game at the gaming device, and
    prevent the first game from starting at the gaming device in response to detecting that the tournament manager has not approved start of the first game at the gaming device.

18. The gaming system of claim 17, wherein the tournament coordinator is configured to manage tournament activities and information, wherein management includes:
  control information displayed on a display of the gaming device,
  provide player tracking information to a player tracking system,
  organize tournaments, and
  create tournament bonus features.

19. The gaming system of claim 17, wherein the tournament manager is configured to:
  determine whether proper conditions exist for allowing start of the first game at the gaming device; and
  prevent the first game from starting in response to determining that proper conditions do not exist for allowing start of the first game at the gaming device.

20. The gaming system of claim 17, wherein the tournament manager is configured to:
  prevent the first game from starting at the gaming device while non-tournament mode is enabled at the gaming device.

* * * * *